(12) United States Patent
Jayawardene et al.

(10) Patent No.: US 11,515,919 B2
(45) Date of Patent: *Nov. 29, 2022

(54) COMMUNICATIONS METHODS AND APPARATUS USING MULTIPLE BEAMS

(71) Applicant: Charter Communications Operating, LLC, St. Louis, MO (US)

(72) Inventors: Diwelawatte Jayawardene, Aurora, CO (US); Pratik Das, Centennial, CO (US)

(73) Assignee: Charter Communications Operating, LLC, St. Louis, MO (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/182,204

(22) Filed: Feb. 22, 2021

(65) Prior Publication Data
US 2021/0175941 A1    Jun. 10, 2021

Related U.S. Application Data

(63) Continuation of application No. 16/524,151, filed on Jul. 28, 2019, now Pat. No. 10,931,356, which is a continuation of application No. 15/839,486, filed on Dec. 12, 2017, now Pat. No. 10,367,565.

(51) Int. Cl.
| | |
|---|---|
| *H04B 7/06* | (2006.01) |
| *H04W 72/10* | (2009.01) |
| *H04W 72/04* | (2009.01) |
| *H04B 7/0408* | (2017.01) |

(52) U.S. Cl.
CPC .......... *H04B 7/063* (2013.01); *H04B 7/0408* (2013.01); *H04B 7/0617* (2013.01); *H04B 7/0632* (2013.01); *H04W 72/046* (2013.01); *H04W 72/10* (2013.01)

(58) Field of Classification Search
CPC .. H04B 7/0413; H04B 7/0617; H04B 7/0456; H04B 7/0417; H04B 7/0639
USPC ........................................................ 375/267
See application file for complete search history.

(56) References Cited

U.S. PATENT DOCUMENTS

| | | | |
|---|---|---|---|
| 10,230,447 B2 | 3/2019 | Nagaraja et al. | |
| 10,797,927 B2 | 10/2020 | Jayawardene et al. | |
| 2005/0181733 A1* | 8/2005 | Zangi | H04B 17/309 455/67.11 |

(Continued)

OTHER PUBLICATIONS

Extended European Search Report for European Patent Application No. 18887805.2, 7 pages, dated Jul. 23, 2021.

*Primary Examiner* — Sam K Ahn
*Assistant Examiner* — Gina M McKie
(74) *Attorney, Agent, or Firm* — Straub & Straub; Michael P. Straub; Stephen T. Straub

(57) ABSTRACT

Methods and apparatus for facilitating the use of a plurality of antenna beams for communications purposes are described. In at least some embodiments beam priority information is periodically exchanged. Multiple timers are used to ensure beam information is exchanged at intervals intended to facilitate reliable beam synchronization and to control switching to one or more alternative beams in a predictable manner in the event beam change information or beam synchronization information is lost. In some but not all embodiments a wideband beam is used to communicate beam synchronization information when synchronization using narrower beams used for normal data communication is lost.

16 Claims, 33 Drawing Sheets

(56) References Cited

U.S. PATENT DOCUMENTS

| | | |
|---|---|---|
| 2010/0190450 A1 | 7/2010 | Stirling-Gallacher |
| 2011/0032881 A1 | 2/2011 | Lee |
| 2013/0155847 A1* | 6/2013 | Li .................. H04W 76/10 |
| | | 370/225 |
| 2013/0331026 A1 | 12/2013 | O'Neill et al. |
| 2014/0055302 A1 | 2/2014 | Jia |
| 2016/0353510 A1* | 12/2016 | Zhang ................ H04L 43/16 |
| 2017/0207843 A1* | 7/2017 | Jung .................. H04B 7/063 |
| 2018/0176801 A1* | 6/2018 | Rune ................ H04B 7/0617 |
| 2018/0191418 A1 | 7/2018 | Xia et al. |

* cited by examiner

| FIGURE 14A |
| FIGURE 14B |
| FIGURE 14C |
| FIGURE 14D |

| FIGURE 20A | FIGURE 20B | FIGURE 20C | FIGURE 20D |

COMMUNICATIONS METHODS AND APPARATUS USING MULTIPLE BEAMS

RELATED APPLICATIONS

The present application is a continuation of U.S. patent application Ser. No. 16/524,151 filed Jul. 28, 2019 which published as U.S. patent publication US 2019-0349047 A1 on Nov. 14, 2019 and U.S. patent application Ser. No. 15/839,486 filed Dec. 12, 2017 which published as U.S. patent publication US-2019-0181932-A1 on Jun. 13, 2019 and which issued as U.S. Pat. No. 10,367,565 on Jul. 30, 2019 with each of the preceding patent applications and publications being hereby expressly incorporated by reference in their entirety.

FIELD

The present application relates to communications system, and more particularly, to methods and apparatus supporting communications systems which allows for multiple antennal beam patterns.

BACKGROUND

Beam forming offers the ability for a transmitter to more efficiently use the power available to it by concentrating the power in a beam rather than transmitting using an omni-directional antenna. The use of beams also have the potential advantage of reducing interference to devices which are not the intended recipient in a geographic location by reducing the coverage area into which transmissions are directed.

In order to take advantage of the potential advantages of beams, a transmitter device normally supports one or more beam patterns and chooses to use a beam pattern which is believed to be likely to provide a good communications channel for communicating with an intended transmission recipient.

The decision as to which beam to use to transmit to a target recipient may, and often does, rely on some form of communication from the target recipient which helps the transmitter device decide on what beam to use at a given time. The target device may then monitor for signals on the beam on which it expects to receive signals with other devices potentially being transmitted to using different beams.

Base stations are particularly well suited for using beam forming techniques to form different beams and to transmit on such beams. One reason beam forming approaches work well with base stations is because base stations often have multiple antenna elements which are spaced physically apart from one another or oriented in different directions which facilitates beam forming as compared to cases where antenna elements are physically close to each other which is more likely to be the case on user equipment devices such as cell phones which may be, and often are, handheld devices.

Beam forming solutions are expected to be more commonplace in pre-NR and more so on NR solutions for both mobility and fixed wireless applications.

The triggers for changes in the beam could be a multitude of reasons—ranging from mobility, to the environmental impact on specific frequencies being used. Such changes in the serving beam could be in the order of 100 s of micro seconds to tens of milliseconds.

A problem with beam forming is that the transmitting device and receiving, e.g., target device to which a transmission is sent, may have a different understanding as to which beam will be used for the transmission to the receiving device. Such a miss-understanding may be the result of the transmitting device failing to receive a signal from the receiving device indicating that a change to anther beam is to be made, switching by the transmitter and/or receiver in a manner that is not synchronized between the transmitter and receiver, e.g., due to the beam which was being used to communicate being blocked or subject to interference, or for other reasons.

While devices which lose a radio connection due to a miss-understanding at the beam to be used or for other reasons, may trigger a radio connection reestablishment procedure, radio connection reestablishment is often a relatively time consuming processes and may result in the temporary loss of service while the reconnection process takes places. Thus it is desirable if methods could be developed which can support use of beams while minimizing or reducing the risk of having to go through a radio connection re-establishment process when the beam in use is no longer viable or a miss-understanding as to what beam is to be used occurs due to a lost beam change message.

SUMMARY

The methods and apparatus of the present invention are well suited for use in systems where one or more devices, e.g., bases stations and/or user equipment devices (UEs) support an active antenna system which allows for one or more antenna beam patterns to be supported with different beams being used to transmit to the same or different devices, e.g., at the same or different times. While active antenna systems which support beam forming, maybe and often are used in base stations, they can also be used in user equipment devices (UEs) such as cell phones, customer premises equipment (CPE) devices, vehicles, laptops with wireless capability, etc. Thus it should be appreciated that beam forming methods and apparatus in accordance with the present invention can be used on various wireless communications devices whether they be base stations or UE devices.

In various embodiments a second communications devices, e.g., a user equipment device, measures signals, e.g., pilot or other signals transmitted by a first communications device, e.g., a base station, which supports the use of multiple different beams, e.g., antenna beams, for transmission purposes. The signals in some cases transmitted by the base station are pilot signals or other signals transmitted at a known power level. The transmitted signal may, and sometimes does, include a beam ID or is transmitted in association with a signal indicating the beam to which the pilot signal corresponds, e.g., at a predetermined time following transmission of the beam identifier signal so that a device receiving the pilot knows the beam to which the pilot corresponds. The second communications device measures the received signals corresponding to different beams and ranks the beams, e.g., based on received signal strength and/or other information including interference information which can be used to determine an such SNR ratio for each beam and/or other channel quality information. Based on the determined channel quality information, e.g., RSSI and/or SNR, the different transmit beams for which signals are detected by the second communications device are ranked. In some embodiments the pilot or other signals used for beam ranking are transmitted in what is sometimes referred to as a beam prioritization interval. In embodiments where a beam prioritization interval is used the first communications device transmits a reference signal, e.g., pilot signal or other signal, on one, more all a supported beams, e.g., sequentially one beam at a time. The devices, e.g. UE devices in the case where the first communications device is a base station, within the transmission range of the second communications device receive and measure the reference signals and note the beam on which they were received. The receiving devices then rank the beams based on the received signals to produce information, e.g., an ordered list, of preferred beams. Given that different UEs will be at different locations, different sets of beam preference information may be, and often are, generated by each device to which the first communications device transmits. The transmission of the reference signals can occur quickly and use relatively few resources since the reference signal may be a simple pilot or beam identifier signal transmitted, e.g., at a known power level.

While the initial ranking of beams supported by a transmitter device, e.g., base station, is made by a receiving device, e.g., UE device, based on the reference signals transmitted in a single time interval, e.g., beam prioritization interval, the ranking of beams made based on signals received during subsequent beam prioritization intervals may be, and sometimes is based on the signals received during a current beam prioritization interval as well as the signals received in one or more previous beam prioritization intervals. In at least some embodiments the ranking is based on the channel quality information generated during a current beam interval being combined with the channel quality information generated for the same beam generated based on a signal received in a previous beam prioritization interval. The ranking may be, and sometimes is, generated based on a weighted average with the current channel quality estimate corresponding to a beam being weighted more heavily than a channel quality estimate for the same beam generated during an earlier beam prioritization interval. Thus beam prioritization may be, and sometimes is, time dependent with more recent channel quality estimates contributing to beam ranking more heavily than older channel quality estimates. By considering time as a function very short term transient conditions, such as the affect of leaves of trees moving due to blowing in the wind may be discounted somewhat with longer term affects on a channel such as a car obstructing a beam will contribute more heavily to beam selection since the longer term channel obstruction is likely to be present for multiple beam prioritization intervals.

The second communications devices reports the determined beam priority information, e.g., ranked beam list to the first communications device. In the case where the first communications device is a base station it will receive beam priority information from each of the UEs, e.g., fixed or mobile customer devices, to which it provides service. The first communications device stores the beam priority information, e.g., ranked list of beams indicating the receiving device's order of beam preference, in memory to be used on a per device basis, e.g., with individual, e.g., different, beam priority lists being maintained for each UE by a base station.

The reporting of the beam priority information may and sometimes does occur in what is sometimes referred to as a beam information sync period in which the receiving devices report their determined beam preference information to the first communications device.

Multiple timers are used to ensure beam information is exchanged at intervals intended to facilitate reliable beam synchronization and to control switching to one or more alternative beams in a predictable manner in the event beam change information or beam synchronization information is lost. In some but not all embodiments a wideband beam is used to communicate beam synchronization information when synchronization using narrower beams used for normal data communication is lost.

An exemplary method of operating a first wireless communications device, e.g. a device, such as a base station, supporting an active antenna system capable of forming and/or using a plurality of different antenna beam patterns, in accordance with some embodiments, comprises: receiving first beam prioritization information, e.g. a prioritized beam list, from a second wireless communications device, e.g., a first UE to which the BS transmits; transmitting to the second wireless communications device using a highest priority beam indicated by the first beam prioritization information; and starting a first beam confirmation timer. In some such embodiments, the exemplary method further comprises: determining if the first beam confirmation timer has expired without receipt of a signal, indicating a transmitter beam to be used for transmission to the second wireless communications device, having been received from the second wireless communications device; and switching to an alternative beam for transmissions to the second wireless communications device when it is determined that the first beam confirmation timer has expired without receipt of a signal indicating the transmitter beam to be used for transmission to the second wireless communications device.

An exemplary method of operating a second wireless communications device in communications with a first wireless communications device which uses multiple beams for transmission, in accordance with some embodiments, comprises: receiving signals, e.g., pilot signals, from the first wireless communications device, said signals being transmitted by the first wireless communications device on a plurality different beams; generating for each of the different beams on which a signal is received, a channel quality indicator; prioritizing the beams; and transmitting to the first wireless communications device beam priority information.

It should be appreciated that not all embodiments include all features and numerous variations and variations will be apparent in view of the additional discussion included in the detailed description which follows.

DETAILED DESCRIPTION

Figure 1:
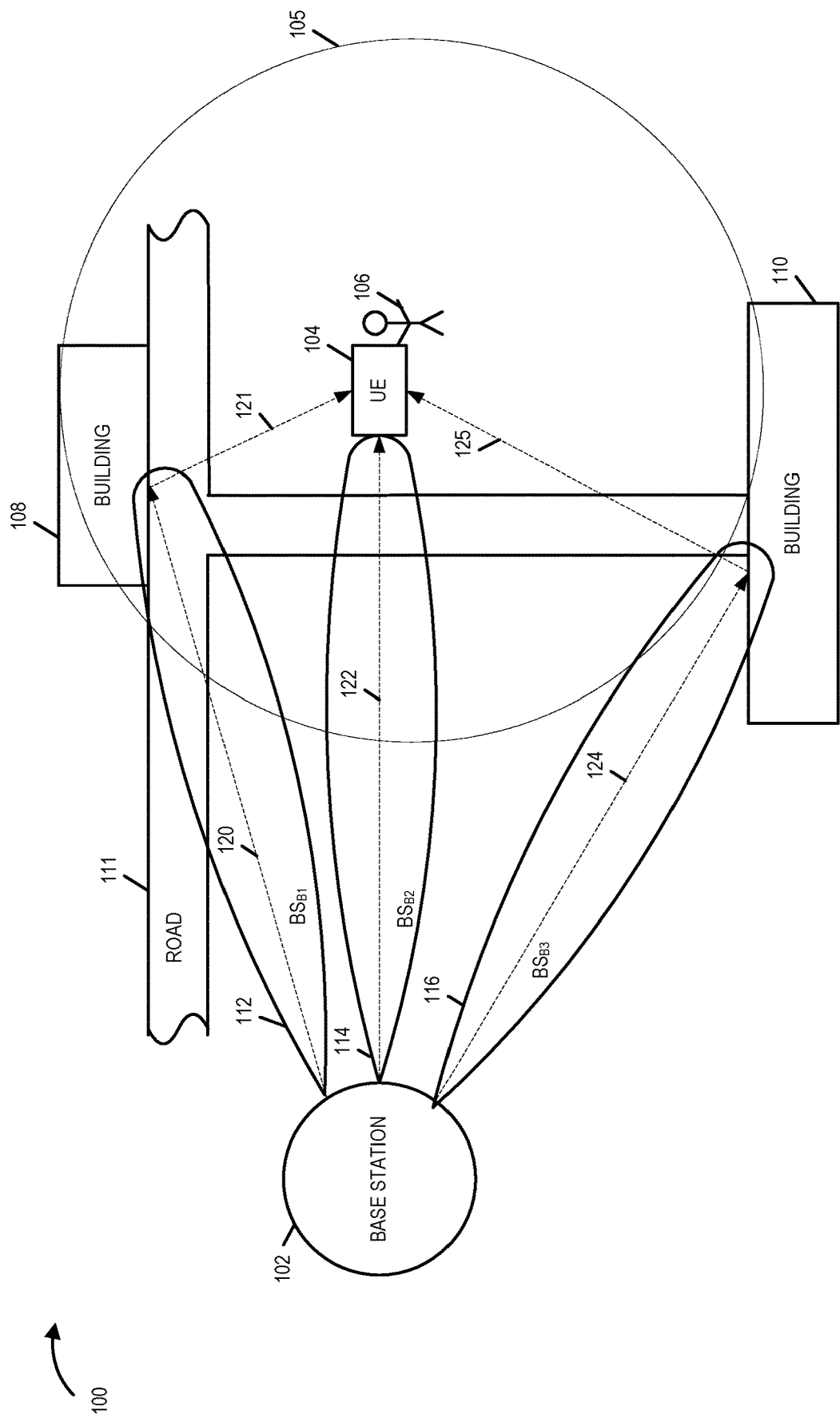
FIG. 1 is a drawing illustrating an exemplary base station supporting an active antenna system capable of forming and/or using a plurality of different antenna beam patterns, an exemplary user equipment (UE) device, and exemplary base station (BS) transmission beams in accordance with an exemplary embodiment.

FIG. 1 is a drawing 100 illustrating an exemplary base station 102 supporting an active antenna system capable of forming and/or using a plurality of different antenna beam patterns, an exemplary user equipment (UE) device 104, and exemplary base station (BS) transmission beams (BSB1 112, BSB2 114, BSB3 116) in accordance with an exemplary embodiment. Drawing 100 further illustrates an exemplary environment in which the BS 102 and UE 104 are situated, e.g., at first exemplary time T1. The environment includes buildings 108, 110 and road 111. UE device 104 is a handheld mobile device which is held by user 106. Exemplary UE 1 104 has an omni-directional receiver, e.g., a receiver with an omni-directional antenna pattern, as indicated by circle 105.

BS 102 transmits signals, e.g., reference signals such as pilot signals on beam BSB1 112, which are communicated to UE 104 via signaling path 120, 121. UE 1 104 measures the received signals from transmit beam BSB1 112 and determines channel quality information corresponding to beam 1, e.g., an RSSI, SNR or some other channel quality metric for transmit beam 1. While RSSI will be used in explaining the exemplary generation and use of channel quality information in various examples, the methods and apparatus are not limited to the use of RSSI information and a variety of different types of channel quality information, e.g., SNR, bit error rate, packet error rate, etc, can be used for ranking different beams and/or determining the quality of a channel for ranking purposes. Accordingly it should be appreciated that the methods and apparatus are not limited to RSSI or the particular examples in which RSSI is used to explain the invention.

BS 102 transmits signals, e.g., reference signals such as pilot signals on beam BSB2 114, which are communicated to UE 104 via signaling path 122. UE 1 104 measures the received signals from transmit beam BSB2 114 and determines an RSSI for transmit beam 2.

BS 102 transmits signals, e.g., reference signals such as pilot signals on beam BSB3 116, which are communicated to UE 104 via signaling path 124, 125. UE 1 104 measures the received signals from transmit beam BSB3 116 and determines an RSSI for transmit beam 3.

UE 1 104 ranks the transmit beams based on received RSSI, generates a beam prioritization list, and sends the beam prioritization list to the BS 102 which receives the list. The BS 102 and UE 104 use the list, e.g., for a predetermined period of time, to make decisions as to which beam to transmit on and/or for beam switching decisions.

Figure 2:
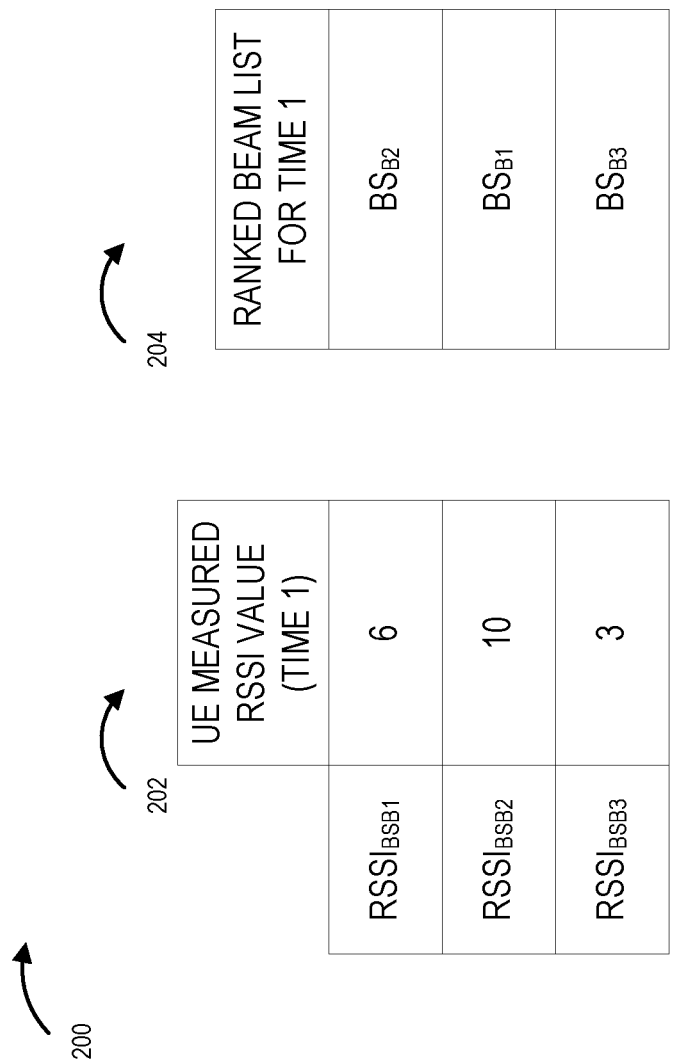
FIG. 2 illustrates an exemplary UE device RSSI measurement table and an exemplary base station transmission beam ranked list corresponding to the example of FIG. 1.

FIG. 2 illustrates drawing 200 which includes an exemplary UE device RSSI measurement table 202 and an exemplary base station transmission beam ranked list 204 corresponding to the example of FIG. 1. Table 202 indicates that: the UE 104 measured RSSI value for base station beam 1 112 is 6; the UE 104 measured RSSI value for base station beam 2 114 is 10, and UE 104 measured RSSI value for base station beam 3 116 is 3. Ranked base station transmission beam list 204 indicates that base station transmission beam 2 114 is the highest ranked, e.g., has the highest priority, followed by base station transmission beam 1 112, and base station transmission beam 3 116 is the lowest ranked. In the example of FIGS. 2, 4, 6 and 8, the exemplary RSSI scale runs between 0 and 10, with 10 representing the highest quality received signal and 0 representing poorest quality received signal.

Figure 3:
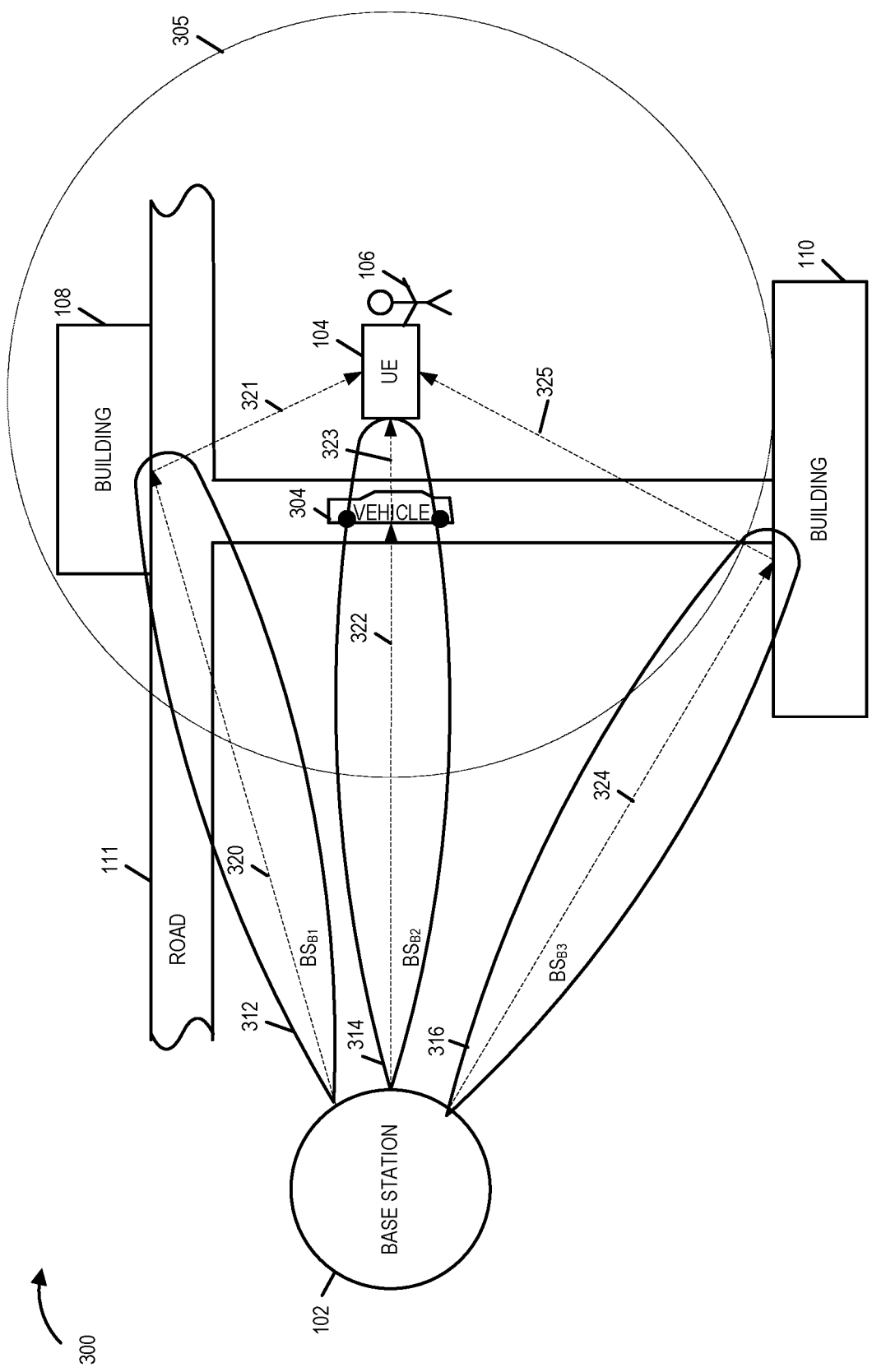
FIG. 3 is a drawing illustrating the exemplary base station supporting an active antenna system capable of forming and/or using a plurality of different antenna beam patterns and the exemplary user equipment (UE) device of FIG. 1, an exemplary obstruction to communications and exemplary base station (BS) transmission beams in accordance with an exemplary embodiment.

FIG. 3 is a drawing 300 illustrating the exemplary base station 102 supporting an active antenna system capable of forming and/or using a plurality of different antenna beam patterns, the exemplary user equipment (UE) device 104, and exemplary base station (BS) transmission beams (BSB1 312, BSB2 314, BSB3 316) in accordance with an exemplary embodiment. Drawing 300 further illustrates an exemplary environment in which the BS 102 and UE 104 are situated, e.g., at second exemplary time T2. The environment includes buildings 108, 110, road 111, and vehicle 304, which is an obstruction to beam 2 communications. UE device 104 is a handheld mobile device which is held by user 106. Exemplary UE 1 104 has an omni-directional receiver as indicated by circle 305.

BS 102 transmits signals, e.g., reference signals such as pilot signals on beam BSB1 312, which are communicated to UE 104 via signaling path 320, 321. UE 1 104 measures the received signals from transmit beam BSB1 312 and determines an RSSI for transmit beam 1.

BS 102 transmits signals, e.g., reference signals such as pilot signals on beam BSB2 314, which are communicated to UE 104 via signaling path 322, 323. UE 1 104 measures the received signals from transmit beam BSB2 314 and determines an RSSI for transmit beam 2.

BS 102 transmits signals, e.g., reference signals such as pilot signals on beam BSB3 316, which are communicated to UE 104 via signaling path 324, 325. UE 1 104 measures the received signals from transmit beam BSB3 316 and determines an RSSI for transmit beam 3.

UE 1 104 ranks the transmit beams based on received RSSI, generates a beam prioritization list, and sends the beam prioritization list to the BS 102 which receives the list. The BS 102 and UE 104 use the list, e.g., for a predetermined period of time, to make decisions as to which beam to transmit on and/or for beam switching decisions.

Figure 4:
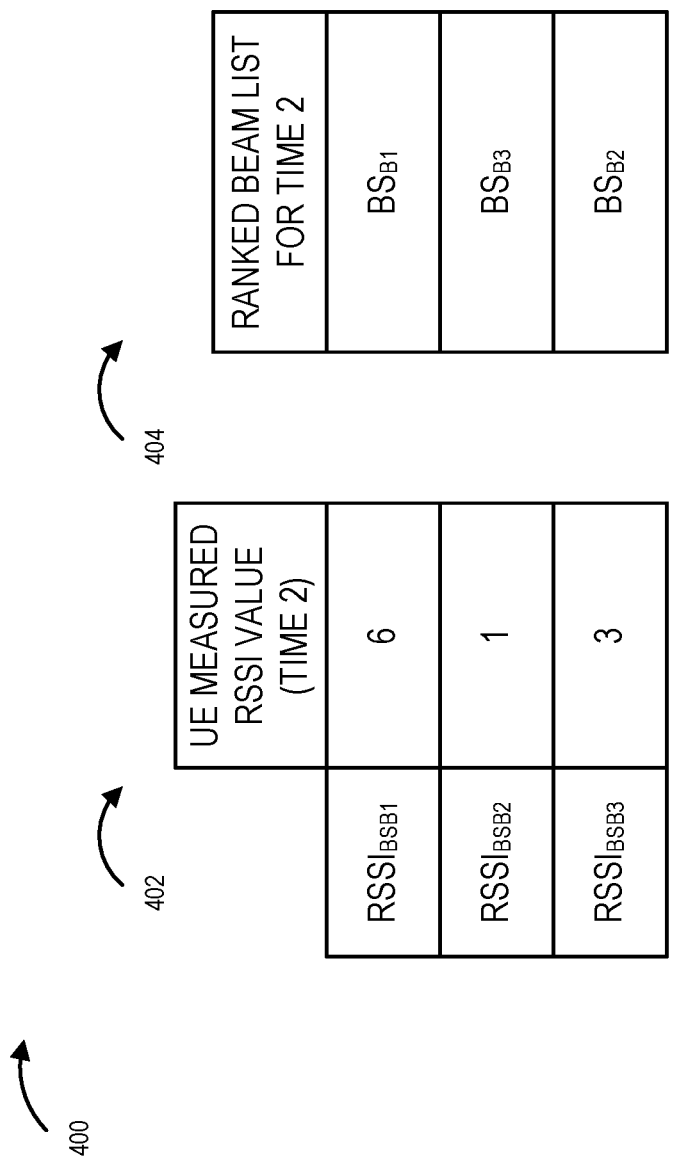
FIG. 4 illustrates an exemplary UE device RSSI measurement table and an exemplary base station transmission beam ranked list corresponding to the example of FIG. 3.

FIG. 4 illustrates drawing 400 which includes an exemplary UE device RSSI measurement table 402 and an exemplary base station transmission beam ranked list 404 corresponding to the example of FIG. 3. Table 402 indicates that: the UE 104 measured RSSI value for base station beam 1 312 is 6; the UE 104 measured RSSI value for base station beam 2 314 is 1, and UE 104 measured RSSI value for base station beam 3 316 is 3. Ranked base station transmission beam list 404 indicates that base station transmission beam 1 312 is the highest ranked, e.g., has the highest priority, followed by base station transmission beam 3 316, and base station transmission beam 2 314 is the lowest ranked.

Figure 5:
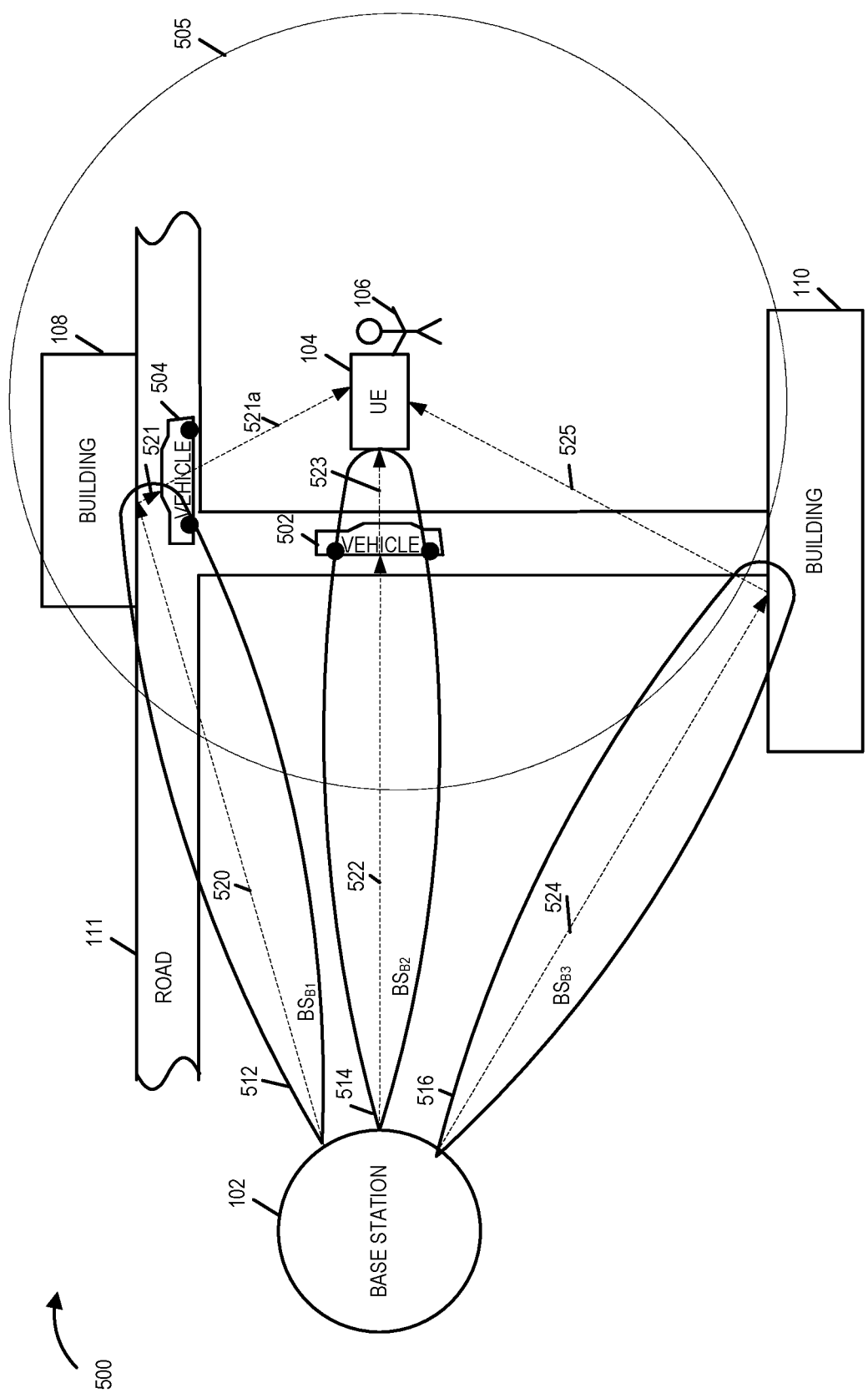
FIG. 5 is a drawing illustrating the exemplary base station supporting an active antenna system capable of forming and/or using a plurality of different antenna beam patterns and the exemplary user equipment (UE) device of FIG. 1, exemplary obstructions to communications and exemplary base station (BS) transmission beams in accordance with an exemplary embodiment.

FIG. 5 is a drawing 500 illustrating the exemplary base station 102 supporting an active antenna system capable of forming and/or using a plurality of different antenna beam patterns, the exemplary user equipment (UE) device 104, and exemplary base station (BS) transmission beams (BSB1 512, BSB2 514, BSB3 516) in accordance with an exemplary embodiment. Drawing 500 further illustrates an exemplary environment in which the BS 102 and UE 104 are situated, e.g., at third exemplary time T3. The environment includes buildings 108, 110, road 111, vehicle 504, which is an obstruction to beam 1 communications, and vehicle 502 which is an obstruction to beam 2 communications. UE device 104 is a handheld mobile device which is held by user 106. Exemplary UE 1 104 has an omni-directional receiver as indicated by circle 505.

BS 102 transmits signals, e.g., reference signals such as pilot signals on beam BSB1 512, which are communicated to UE 104 via signaling path 520, 521, 521*a*. UE 1 104 measures the received signals from transmit beam BSB1 512 and determines an RSSI for transmit beam 1.

BS 102 transmits signals, e.g., reference signals such as pilot signals on beam BSB2 514, which are communicated to UE 104 via signaling path 522, 523. UE 1 104 measures the received signals from transmit beam BSB2 514 and determines an RSSI for transmit beam 2.

BS 102 transmits signals, e.g., reference signals such as pilot signals on beam BSB3 516, which are communicated to UE 104 via signaling path 524, 525. UE 1 104 measures the received signals from transmit beam BSB3 516 and determines an RSSI for transmit beam 3.

UE 1 104 ranks the transmit beams based on received RSSI, generates a beam prioritization list, and sends the beam prioritization list to the BS 102 which receives the list. The BS 102 and UE 104 use the list, e.g., for a predetermined period of time, to make decisions as to which beam to transmit on and/or for beam switching decisions.

Figure 6:
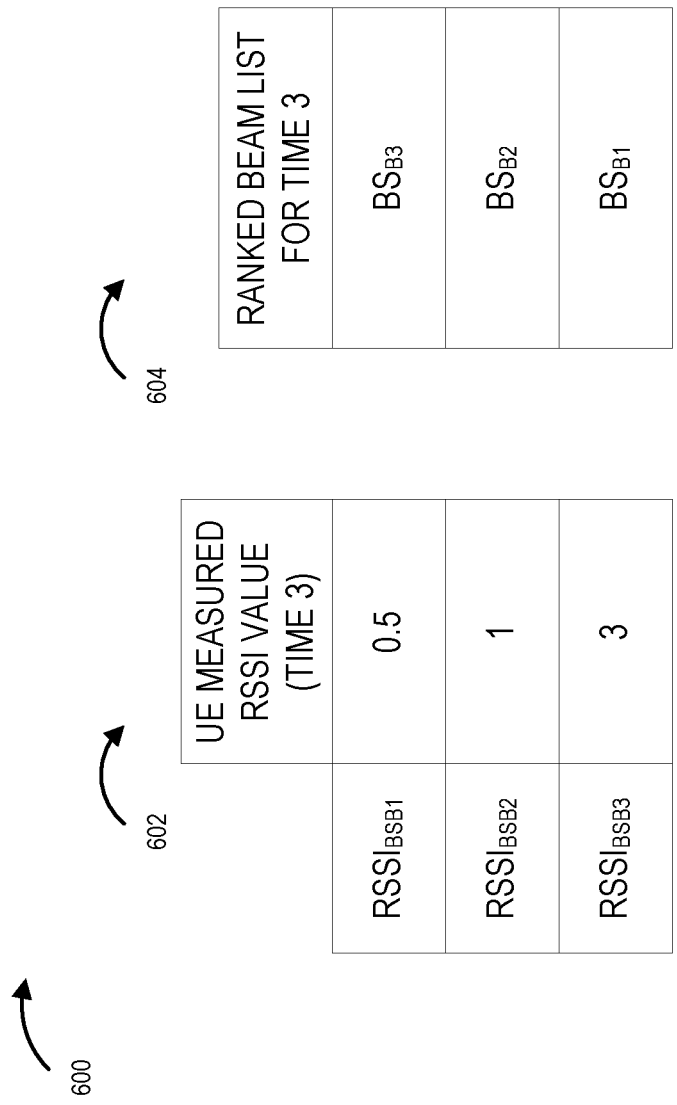
FIG. 6 illustrates an exemplary UE device RSSI measurement table and an exemplary base station transmission beam ranked list corresponding to the example of FIG. 5.

FIG. 6 illustrates drawing 600 which includes an exemplary UE device RSSI measurement table 602 and an exemplary base station transmission beam ranked list 604 corresponding to the example of FIG. 5. Table 602 indicates that: the UE 104 measured RSSI value for base station beam 1 512 is 0.5; the UE 104 measured RSSI value for base station beam 2 514 is 1, and UE 104 measured RSSI value for base station beam 3 516 is 3. Ranked base station transmission beam list 604 indicates that base station transmission beam 3 516 is the highest ranked, e.g., has the highest priority, followed by base station transmission beam 2 514, and base station transmission beam 1 512 is the lowest ranked.

Figure 7:
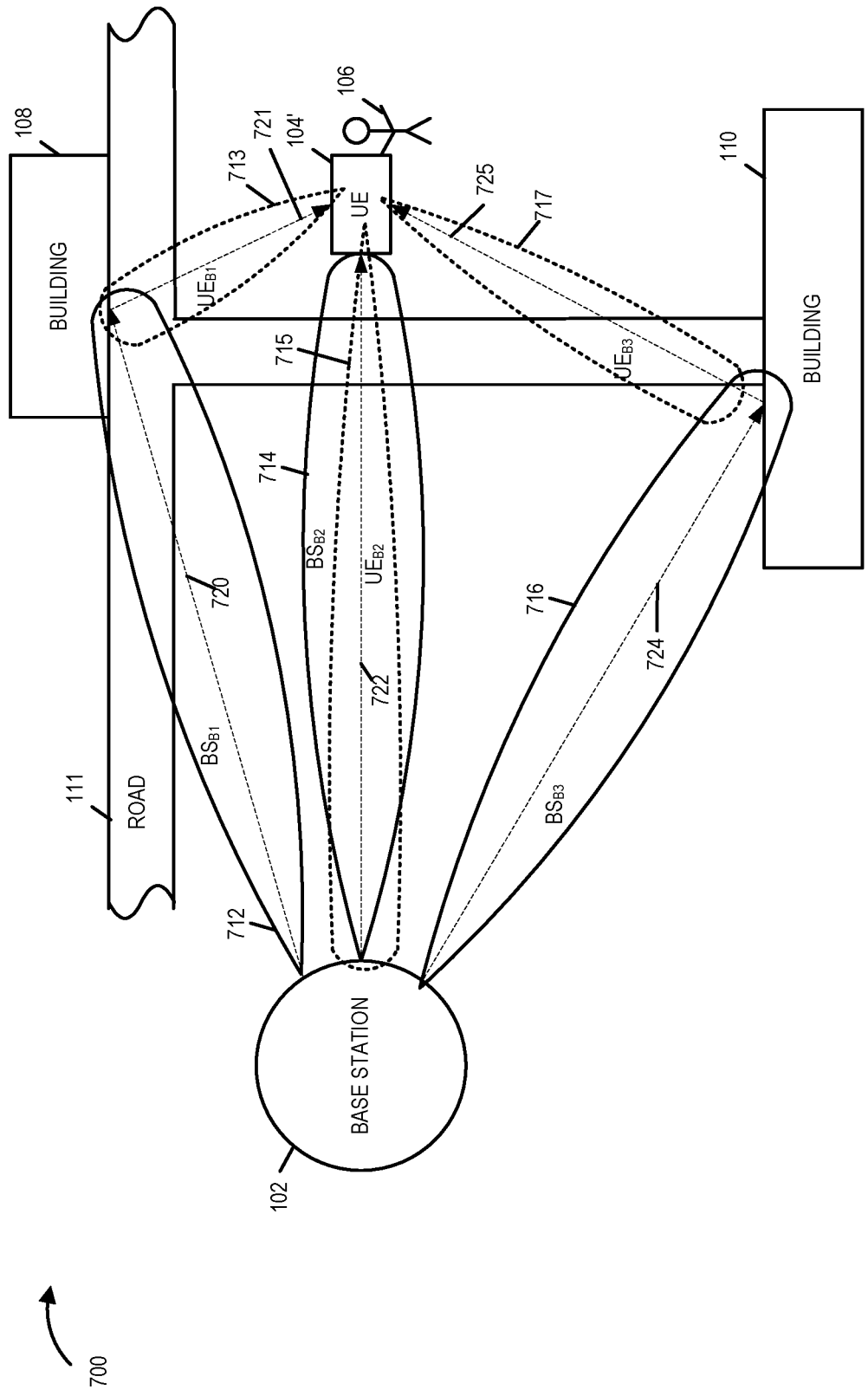
FIG. 7 is a drawing illustrating an exemplary base station supporting an active antenna system capable of forming and/or using a plurality of different antenna beam patterns, an exemplary user equipment (UE) device with receive beam forming capabilities, exemplary base station (BS) transmission beams and exemplary UE device receive beams in accordance with an exemplary embodiment.

FIG. 7 is a drawing 700 illustrating exemplary base station 102 supporting an active antenna system capable of forming and/or using a plurality of different antenna beam patterns, an exemplary user equipment (UE) device 104', and exemplary base station (BS) transmission beams (BSB1 712, BSB2 714, BSB3 716) in accordance with an exemplary embodiment. Drawing 700 further illustrates an exemplary environment in which the BS 102 and UE 104' are situated, e.g., at first exemplary time T1. The environment includes buildings 108, 110 and road 111. UE device 104' is a handheld mobile device which is held by user 106. Exemplary UE 1 104' includes a beam forming receiver as indicated by the plurality of receive beams (UE receive beam 1 (UEB1) 713, UE receive beam 2 (UEB2) 715, UE receive beam 3 (UEB3) 717). In some embodiments, the receiver in UE 104' can, and sometimes does, switch between different alternative receive beams.

BS 102 transmits signals, e.g., reference signals such as pilot signals on beam BSB1 712, which are communicated to UE 104', e.g., via signaling path 720, 721. UE 1 104' measures the received signals from transmit beam BSB1 712 using each of its alternative receive beams (UEB1 713, UEB2 715, UEB3 717), obtaining 3 RSSI values.

BS 102 transmits signals, e.g., reference signals such as pilot signals on beam BSB2 714, which are communicated to UE 104', e.g., via signaling path 722. UE 1 104' measures the received signals from transmit beam BSB2 714 using each of its alternative receive beams (UEB1 713, UEB2 715, UEB3 717), obtaining 3 RSSI values.

BS 102 transmits signals, e.g., reference signals such as pilot signals on beam BSB3 716, which are communicated to UE 104', e.g., via signaling path 724. 725. UE 1 104' measures the received signals from transmit beam BSB3 716 using each of its alternative receive beams (UEB1 713, UEB2 715, UEB3 717), obtaining 3 RSSI values.

UE 1 104' ranks the transmit beam/receive beam pairs based on received RSSI, generates a beam pair prioritization list, and sends the beam pair prioritization list or at least the beam transmit information in the beam pair prioritization list to the BS 102 which receives the list. The BS 102 and UE 104' use the list, e.g., for a predetermined period of time, to make decisions as to which beam to transmit on and/or for beam switching decisions.

Figure 8:
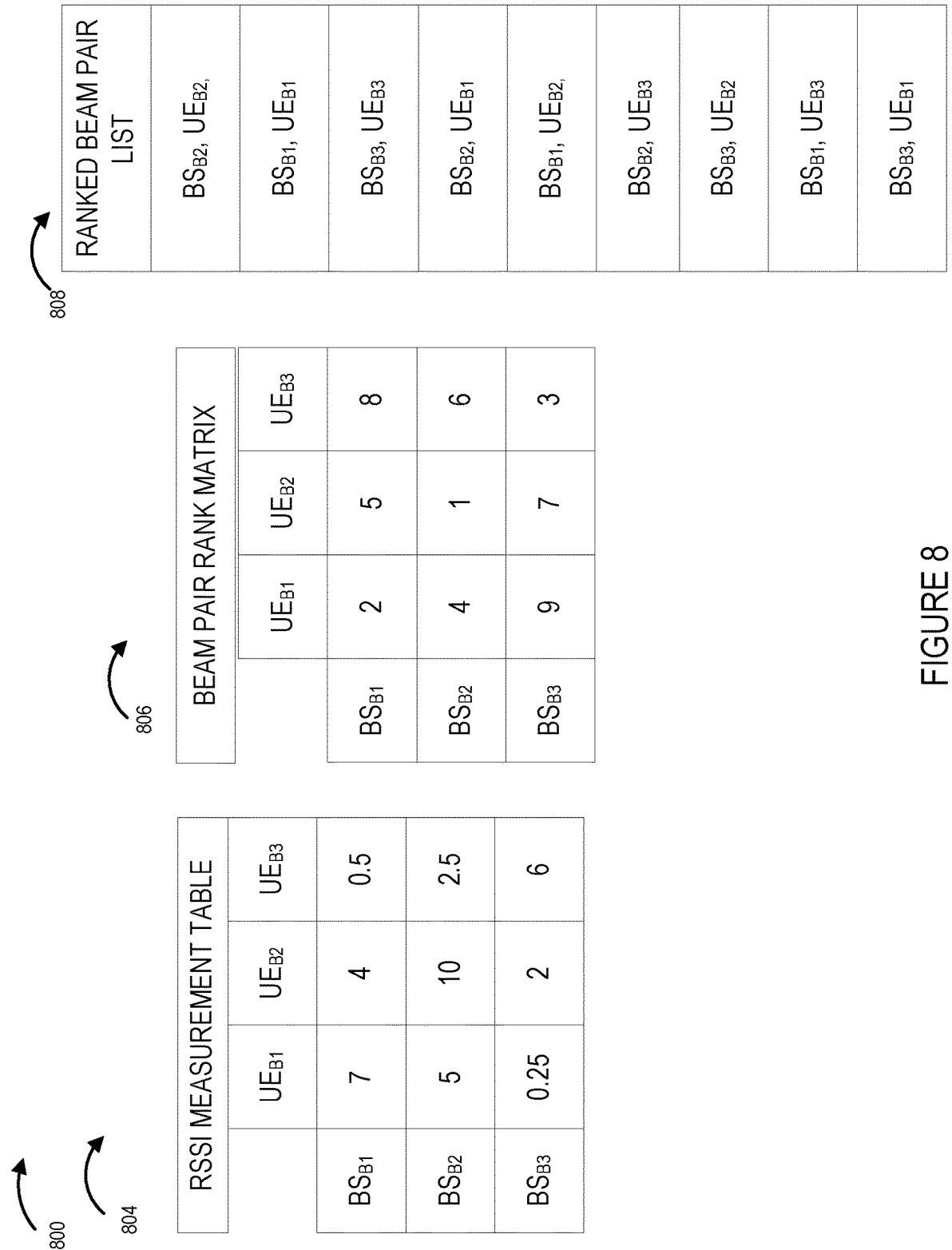
FIG. 8 illustrates an exemplary UE device RSSI measurement table, an exemplary base station transmission beam/UE receive beam pair ranked matrix, and an exemplary base station transmission beam/UE receive beam pair ranked list corresponding to the example of FIG. 7.

FIG. 8 illustrates drawing 800 which includes an exemplary UE device RSSI measurement table 804, an exemplary base station transmission beam/UE receive beam pair ranked matrix 806, and a base station transmission beam/UE receive beam ranked list 808 corresponding to the example of FIG. 7. RSSI measurement table 804 indicates that the RSSI measurement values for beam pairs (BSB1 712/UEB1 713, BSB1 712/UEB2 715, BSB1 712/UEB3 717, BSB2 714/UEB1 713, BSB2 714/UEB2 715, BSB2 714/UEB3 717, BSB3 716/UEB1 713, BSB3 716/UEB2 715, BSB3 716/UEB3 717) are (7, 4, 0.5, 5, 10, 2.5, 0.25, 2, 6), respectively. Beam pair ranked matrix 806 indicates that the ranking numbers for beam pairs (BSB1 712/UEB1 713, BSB1 712/UEB2 715, BSB1 712/UEB3 717, BSB2 714/UEB1 713, BSB2 714/UEB2 715, BSB2 714/UEB3 717, BSB3 716/UEB1 713, BSB3 716/UEB2 715, BSB3 716/UEB3 717) are (2, 5, 8, 4, 1, 6, 9, 7, 3), respectively, with a ranking number of 1 indicating the highest ranked, e.g., best received signal and a ranking number of 10 indicating the worst received signal. Ranked beam pair list 808 is an ordered listing the highest ranked beam pair at the top of the list and the lowest ranked beam pair at the bottom on the list, e.g., the combination of base station transmit beam BSB2 714 and UE receive beam UE B2 715 is ranked highest, e.g., best received signal indication, the next highest is the combination of base station transmit beam BSB1 712 and UE receive beam UE B1 713, and the next highest is the combination of BSB3 716 and receive beam UEB3 717, etc.

It should be appreciated that the RSSI measurements, beam pair ranking, and ranked beam pair list may be expected to change, e.g., during another measurement time interval in which path obstructions, e.g., vehicles, people, animals, leaves, etc., may interfere with the communications between the base station 102 and the UE 104', e.g., similar to the examples of FIGS. 3 and 5.

Figure 9:
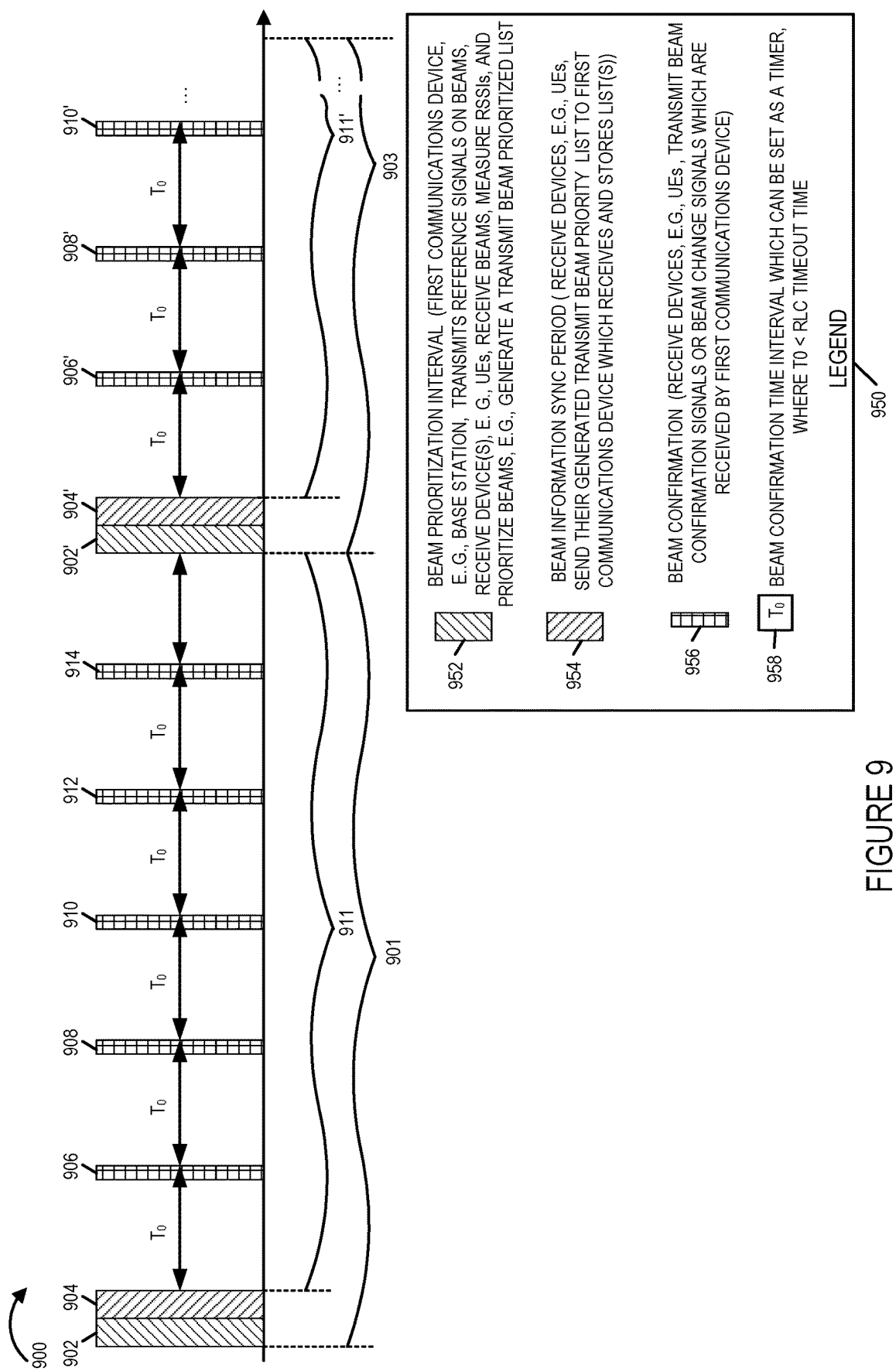
FIG. 9 shows an exemplary timing sequence including recurring beam prioritization intervals, beam information sync periods, and beam selection and utilization time periods, in accordance with an exemplary embodiment.

FIG. 9 shows an exemplary timing sequence 900 which has a periodic nature to it and thus continues to extend beyond the time period shown in FIG. 9 with the pattern shown in FIG. 9 repeating over time. FIG. 9 further includes legend 950, which indicates that: left to right ascending line shading 950 indicates a beam prioritization time interval, left to right descending line shading 954 indicates a beam information sync period, crosshatch shading 956 indicates a beam confirmation interval, and T0 958 indicates a beam confirmation time interval.

The exemplary timing sequences 900 includes a first beam selection and utilization time period 901 and second beam selection and utilization time period 903. The first and second beam selection and utilization time periods 901, 903 have the same structure with primes being use in combination with a reference number to show a time period which is the same or similar to the time period with the same reference number but with the prime.

The first beam selection and utilization time period 901 includes a first beam prioritization interval 902 in which the first communications device, e.g., base station or other device which supports beams for transmission purposes, transmits reference signals which are received and measured by one or more receiving devices, e.g., UEs, serviced by the first base station. The beam selection and utilization time period 901 also includes beam information sync period 904 in which the devices that receive the transmitted reference signals used to determine the channel quality corresponding to each beam, communicates beam priority information to the first communications device, e.g., base station, which transmitted the reference signals on the different beams. A data communications interval 911, 911' follows each beam information sync period (904. 904'). The data communications intervals may, and sometimes do include one or more beam confirmation intervals, 906, 908, 910, 912, 914 wherein the receiving devices, e.g., UEs, transmit a signal indicating the beam they are using, e.g., listening on at least once per beam confirmation time interval To. While the spacing of the beam confirmation time intervals is shown as being uniform in FIG. 9, this presumes no changes to the beam are requested by the receiving devices, e.g., UE and made by the first communications device, e.g., BS. In cases where the UE requests a beam change during a data transmission time interval, the start of the confirmation time interval To will be reset so that the BS will expect and the UE will send a beam confirmation signal within To seconds of the transmitted beam change signal. In this way the beam change signal can, like the sending of a beam confirmation signal, trigger the resetting of a time interval To in the base station which the base station uses to check to determine if a change to another beam should be made for a UE despite the lack of receipt of a beam change or confirmation signal within the time period T0 from the last beam change or confirmation signal.

If the base station does not receive a beam change or beam confirmation signal from a UE prior to the expiration of the beam confirmation time To corresponding to the UE, the base station will switch to the next beam in the BS maintained priority information for the UE from which a beam confirmation or beam change signal was not received before expiration of the To confirmation/change time corresponding to the UE.

The relationship between various timers can be understand as follows:

$To < RLC$ time out

Where To is max time threshold between confirmation or beam change signals.

T1> To where T1 is a max time a transmitter continues to stay on the last used beam for transmission purposes since the last beam confirmation or beam change signal was received; and where a receiver device, e.g., UE, uses a second time threshold T2 as a beam change confirmation time interval in which the receiver device expects to receive a beam change confirmation signal from the transmitter device, B.S., after transmission of a requested beam change signal to the BS.

By using the way the base station is able to confirm that it is still in communication with the UE and using the beam expected by the UE for communication purposes. If a UE specifics a beam during a confirmation interval other than the one the BS believes is being used to communicate to the UE, the base station will update information it stores indicating the beam to be used for the UE and change to the beam specified by the UE. If the UE indicates a beam during the beam confirmation interval which the same as the beam being used by the base station to communicate with the UE no change in the beam information corresponding to the UE will be made and the BS will continue to use the indicated beam previously in use.

In various embodiments the base station and UE switch from one beam to the next based on the beam ranking information.

When a UE detects a problem with a beam, e.g., it fails to receive information on a beam or detects a poor channel quality as indicated by errors in received data or a low signal to noise ratio on signals received on a beam the UE may and sometimes will signal to the BS that a change in beams is to be made. The UE will signal to the BS to use the next beam on the ordered beam list or specify a beam to be used. If the base station receives the change signal, it will switch to using the beam indicated by the received signal, e.g., the next beam on the beam priority list which will, in some cases, be a lower ranked beam than the one previously used but which has the potential to be a better channel for communications given the detected channel quality problem with the previously used beam.

If the base station receives the change signal from the UE it will switch to the new beam and confirm the switch. The UE may and often will switch automatically to looking for signals on the new beam after sending the change signal to the BS and expect to receive the change confirmation from the BS on the new beam. The change may involve a switch in receive antennas or a receive antenna configuration where the UE supports configurable or selectable receive antenna beams or patterns. Alternatively the switch may involve monitoring for data transmitted on a channel corresponding to the beam id of the beam to which the UE indicated a change was made.

The base station and UE are synchronized so that they have a common understanding of when beam prioritization information is to be generated and beam utilization is to be confirmed. During the data communications time intervals 911', the BS expects to receive from a UE at least one beam confirmation signal every To seconds. Thus To can be used as a confirmation timer and if a beam confirmation signal is not received with the To seconds of the last beam confirmation signal the BS can presume a beam synchronization error has occurred. While the base station relies on the beam confirmation time To, the UE uses a beam switch timeout timer However in other embodiments a dedicated interval is not used and instead pilot signals transmitted at other times, e.g., during data transmission time periods, are used for beam prioritization.

Figure 10:
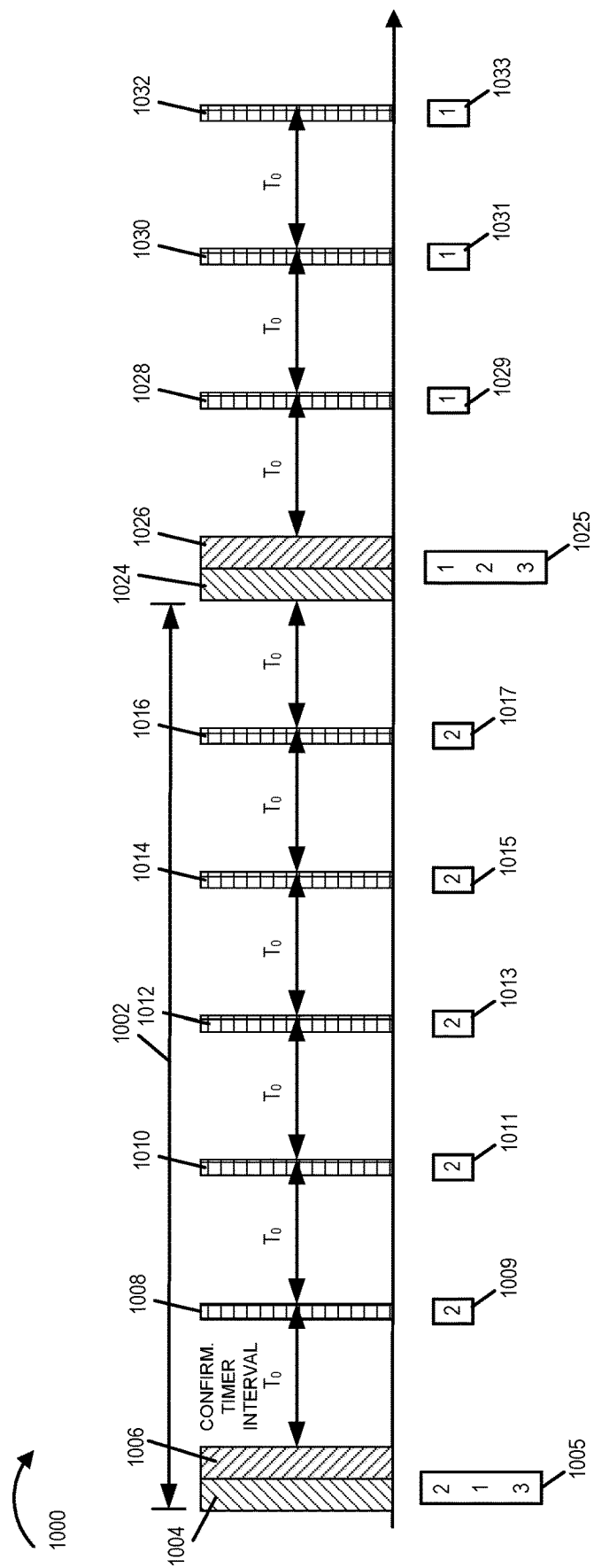
FIG. 10 illustrates an example in which a first wireless communications device transmits on the same beam to a second wireless communications device during the data communication interval of a beam selection and utilization time period, and the second wireless communications device sends beam confirmation signals to the first wireless communications device, in accordance with an exemplary embodiment.

FIG. 10 is a drawing 1000 illustrating an example in which a first wireless communications device transmits on the same beam to a second wireless communications device during the data communication interval of a beam selection and utilization time period, and the second wireless communications device sends beam confirmation signals to the first wireless communications device, in accordance with an exemplary embodiment.

Beam selection and utilization time period 1002 includes beam prioritization interval 1004 in which the first wireless communications device transmits pilot signals on a plurality of beams, the second wireless communications devices receives and measures the signals, and the second wireless communications device generates a transmit beam priority list 1005, with beam 2 having the highest priority and beam 3 being ranked to have the lowest priority. In beam information sync period 1006 the second communications device communicates the beam priority information 1005 to the first wireless communications device. Then the first wireless communications device starts transmitting to the second wireless communications device during a data communication interval using the highest priority beam which is beam 2. The second wireless communications device receives signals from the first wireless communications device, which are considered to be of an acceptable quality level, and the second wireless communications device periodically sends back beam confirmation signals (1008, 1010, 1012, 1014, 1016) which communicate an indicator (1009, 1011, 1013, 1015, 1017), respectively, each which confirms beam 2.

A subsequent beam selection and utilization time period includes beam prioritization interval 1024 in which the first wireless communications device transmits pilot signals on a plurality of beams, the second wireless communications devices receives and measures the signals, and the second wireless communications device generates a transmit beam priority list 1025, with beam 1 having the highest priority and beam 3 being ranked to have the lowest priority. In beam information sync period 1026 the second communications device communicates the beam priority information 1025 to the first wireless communications device. Then the first wireless communications device starts transmitting to the second wireless communications device during a data communication interval using the highest priority beam which is now beam 1. The second wireless communications device receives signals from the first wireless communications device, which are considered to be of an acceptable quality level, and the second wireless communications device periodically sends back beam confirmation signals (1028, 1030, 1032, . . . ) which communicate an indicator (1029, 1031, 1033), each which confirms beam 1.

Figure 11:
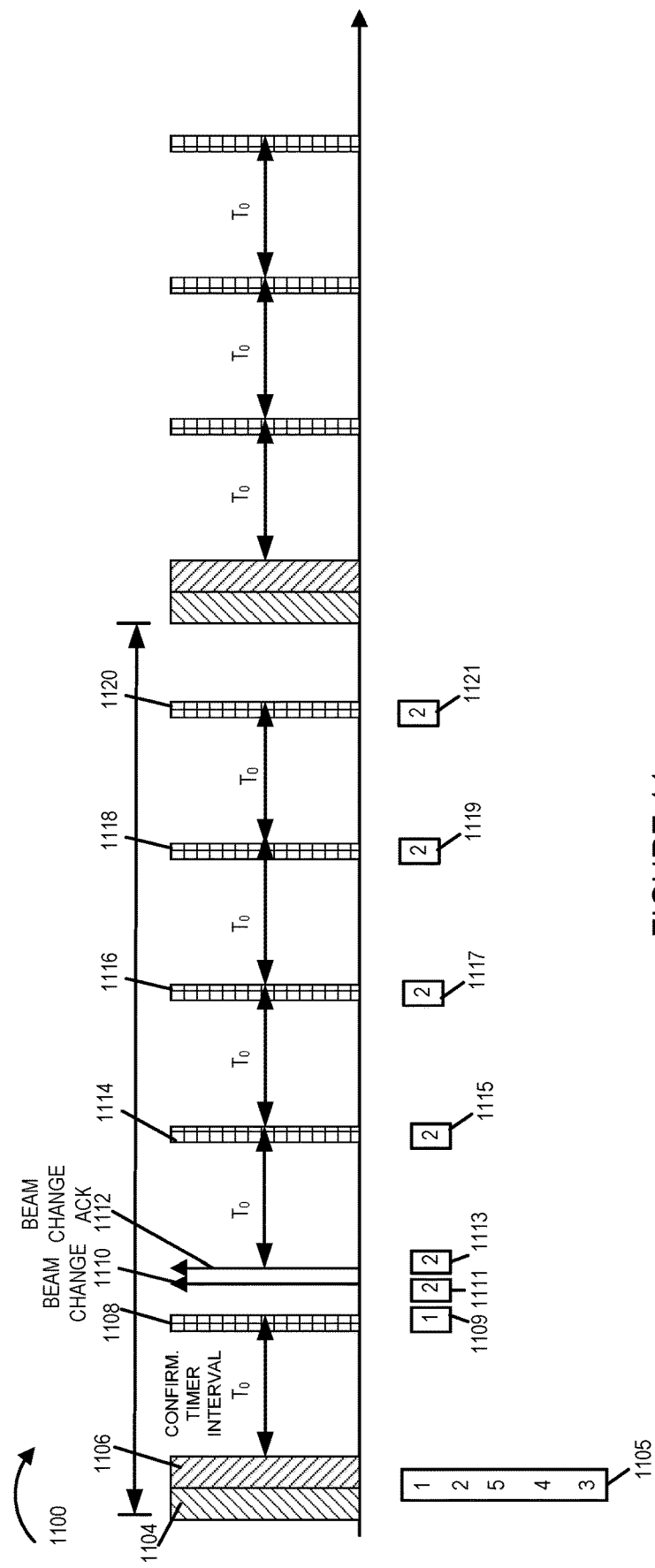
FIG. 11 illustrates an example in which a first wireless communications device switches from transmitting on a first beam to a second wireless communications device to transmitting on a second beam to the second wireless communications device during the data communication interval of a beam selection and utilization time period in response to a beam change signal from the second wireless communications device, in accordance with an exemplary embodiment.

FIG. 11 is a drawing 1100 illustrating an example in which a first wireless communications device switches from transmitting on a first beam to a second wireless communications device to transmitting on a second beam to the second wireless communications device during the data communication interval of a beam selection and utilization time period in response to a beam change signal from the second wireless communications device, in accordance with an exemplary embodiment.

Beam selection and utilization time period 1102 includes beam prioritization interval 1104 in which the first wireless communications device transmits pilot signals on a plurality of beams, e.g., 5 beams, the second wireless communications devices receives and measures the signals, and the second wireless communications device generates a transmit beam priority list 1105, with beam 1 having the highest priority and beam 3 being ranked to have the lowest priority. In beam information sync period 1006 the second communications device communicates the beam priority information 1105 to the first wireless communications device. Then the first wireless communications device starts transmitting to the second wireless communications device during a data communication interval using the highest priority beam which is beam 1. The second wireless communications device receives signals from the first wireless communications device, which are considered to be of an acceptable quality level, and the second wireless communications device sends back beam confirmation signals 1108, which communicate an indicator 1009, which confirms beam 1. The second wireless communications device determines that the receive quality for beam 1 is no longer acceptable. The second wireless communications device generates and sends beam change request signal 1110 communicating beam indicator 1111, which indicates beam 2. The first wireless communications devices receives the request and starts communicating to wireless communications device 2 on transmit beam 2, and the communications include the transmission of beam change acknowledgment signal 1112 communicating indicator 1113, which indicates beam 2. The second wireless communications device receives signals from the first wireless communications device, which are considered to be of an acceptable quality level, and the second wireless communications device periodically sends back beam confirmation signals (1114, 1116, 1118, 1120) which communicate an indicator (1115, 1117, 1119, 1121), each which confirms beam 2.

Figure 12:
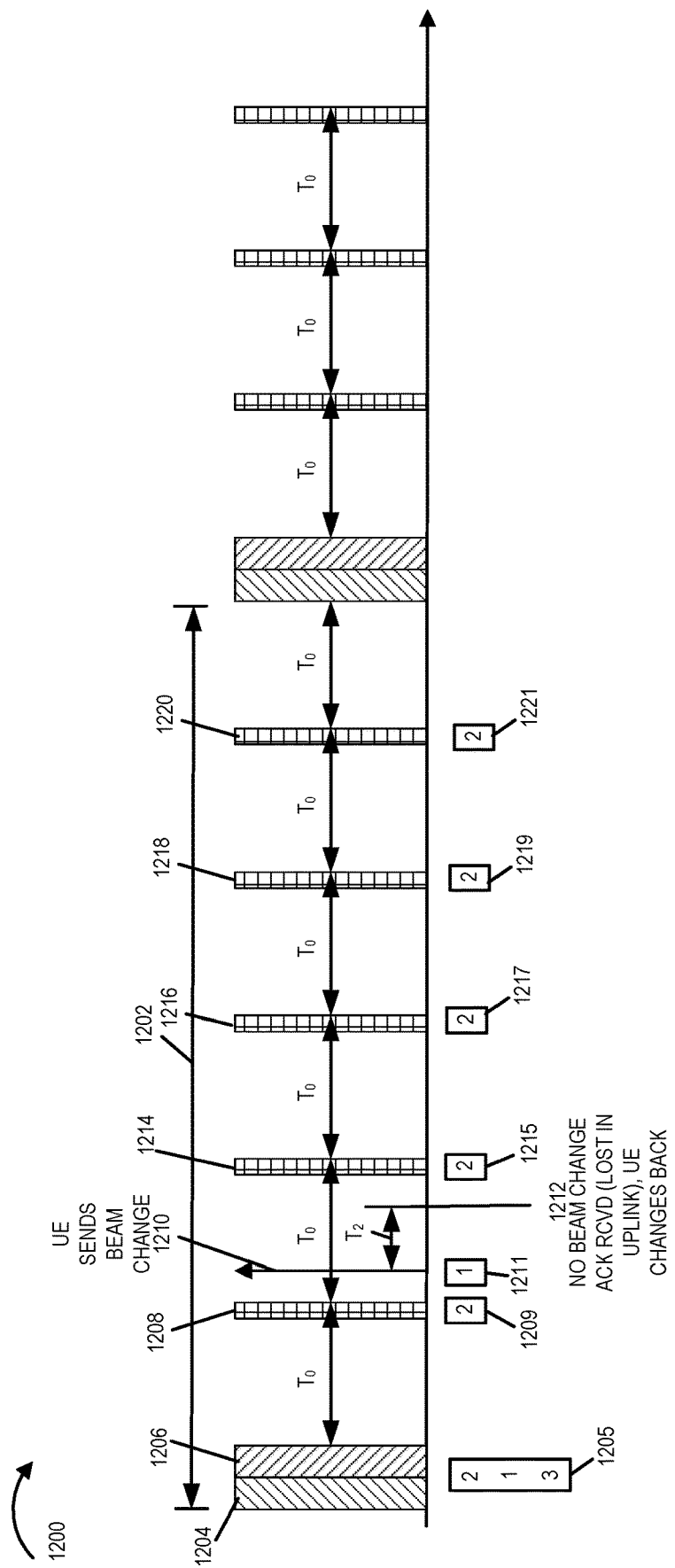
FIG. 12 illustrates an example in which a second wireless communications device requests a beam switch but the request is lost in the uplink, and the second wireless communications returns to receiving on the previous beam in accordance with an exemplary embodiment.

FIG. 12 is a drawing 1200 illustrating an example in which a second wireless communications device requests a beam switch but the request is lost in the uplink, and the second wireless communications returns to receiving on the previous beam in accordance with an exemplary embodiment.

Beam selection and utilization time period 1202 includes beam prioritization interval 1204 in which the first wireless communications device transmits pilot signals on a plurality of beams, the second wireless communications devices receives and measures the signals, and the second wireless communications device generates a transmit beam priority list 1205, with beam 2 having the highest priority and beam 3 being ranked to have the lowest priority. In beam information sync period 1206 the second communications device communicates the beam priority information 1205 to the first wireless communications device. Then the first wireless communications device starts transmitting to the second wireless communications device during a data communication interval using the highest priority beam which is beam 2. The second wireless communications device receives signals from the first wireless communications device, which are considered to be of an acceptable quality level, and the second wireless communications device sends back beam confirmation signals 1208 which communicate an indicator (1209, which confirms beam 2. Then, the second wireless communications devices determines that the quality on beam 2 is unacceptable, and the second wireless communications device generates and send beam change request signal 1210 including an indicator 1211 indicating that the first wireless communications device should transmit to the second wireless communications device on beam 1. However signal 1210 is lost in the uplink and the first wireless communications device never receives the change request, and thus continues to transmit to the second wireless communications device on beam 2. The second wireless communications device has switched to monitor beam 1, but does not receive a beam change acknowledgment. After time T2, the second wireless communications device switches back to the last beam which was beam 2. At this point in time the receive quality of beam 2 has improved and is now acceptable. The second wireless communications device subsequently sends beam confirmation signals (1214, 1216, 1218, 1220), each including an indicator (1215, 1217, 1219, 1221) confirming beam 2.

Figure 13:
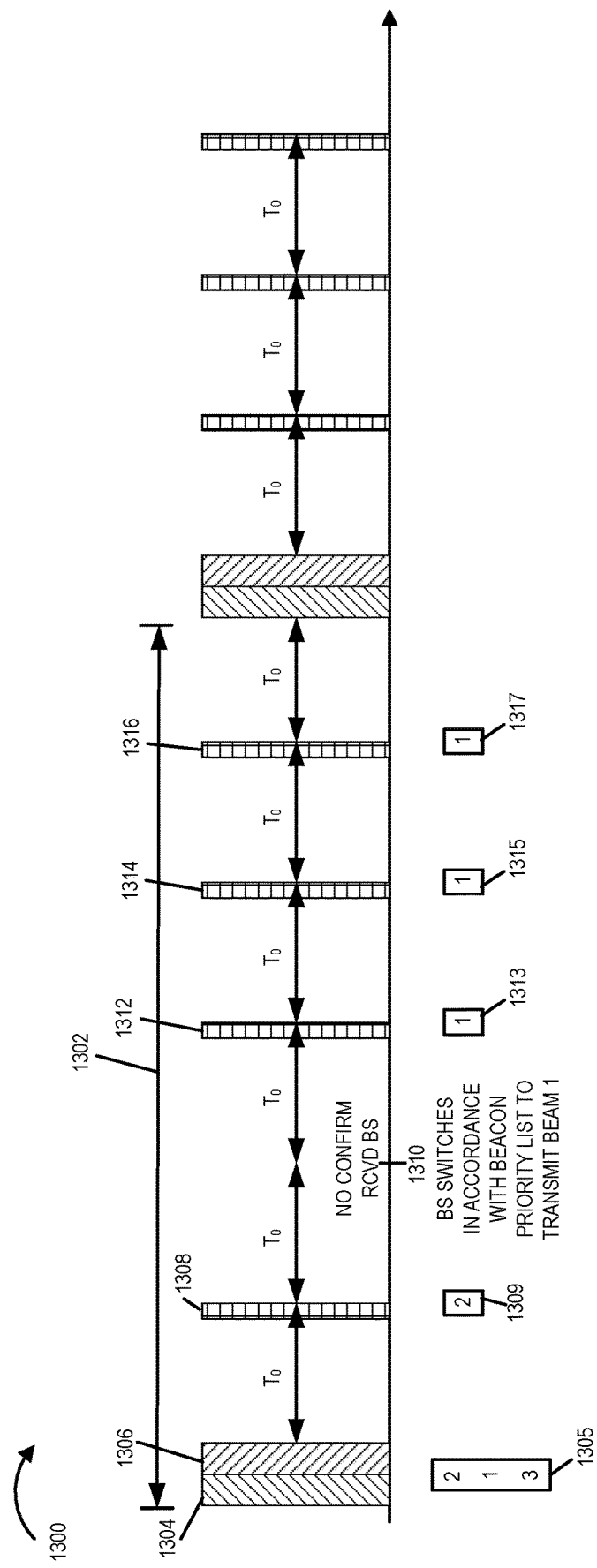
FIG. 13 illustrates an example in which the first wireless communications device fails to receive an expected beam confirmation signal and switches to a next beam in accordance with the beam priority information in accordance with an exemplary embodiment.

FIG. 13 is a drawing 1300 which illustrates an example in which the first wireless communications device fails to receive an expected beam confirmation signal and switches to a next beam in accordance with the beam priority information in accordance with an exemplary embodiment. Beam selection and utilization time period 1302 includes beam prioritization interval 1304 in which the first wireless communications device transmits pilot signals on a plurality of beams, the second wireless communications devices receives and measures the signals, and the second wireless communications device generates a transmit beam priority list 1305, with beam 2 having the highest priority and beam 3 being ranked to have the lowest priority. In beam information sync period 1306 the second communications device communicates the beam priority information 1305 to the first wireless communications device. Then the first wireless communications device starts transmitting to the second wireless communications device during a data communication interval using the highest priority beam which is beam 2. The second wireless communications device receives signals from the first wireless communications device, which are considered to be of an acceptable quality level, and the second wireless communications device sends back beam confirmation signals 1308 which communicates and indicator 1309 which confirms beam 2. At time 1310, the first wireless communications device fails to receive an expected beam confirmation signal from the second wireless communications device, and the first wireless communications device switches to transmit beam 1 in accordance with the transmit beam priority list 1305, e.g., selects the replacement beam for transmission to wireless device 2 which has the highest priority on the list after removing the beam which was not confirmed, e.g., beam 1 has the highest priority from the set of beams 1 and 3. The second wireless device, which also has priority list 1305 and knows the switching rules being used by the first wireless communications device, also switched to beam 1. The second wireless communications device receives signals communicated on beam 1 from the first wireless communications device, which are considered to be of an acceptable quality level, and the second wireless communications device sends back beam confirmation signals (1312, 1314, 1316), each which communicates and indicator (1313, 1315, 1317) which confirms beam 1.

Figure 14A:
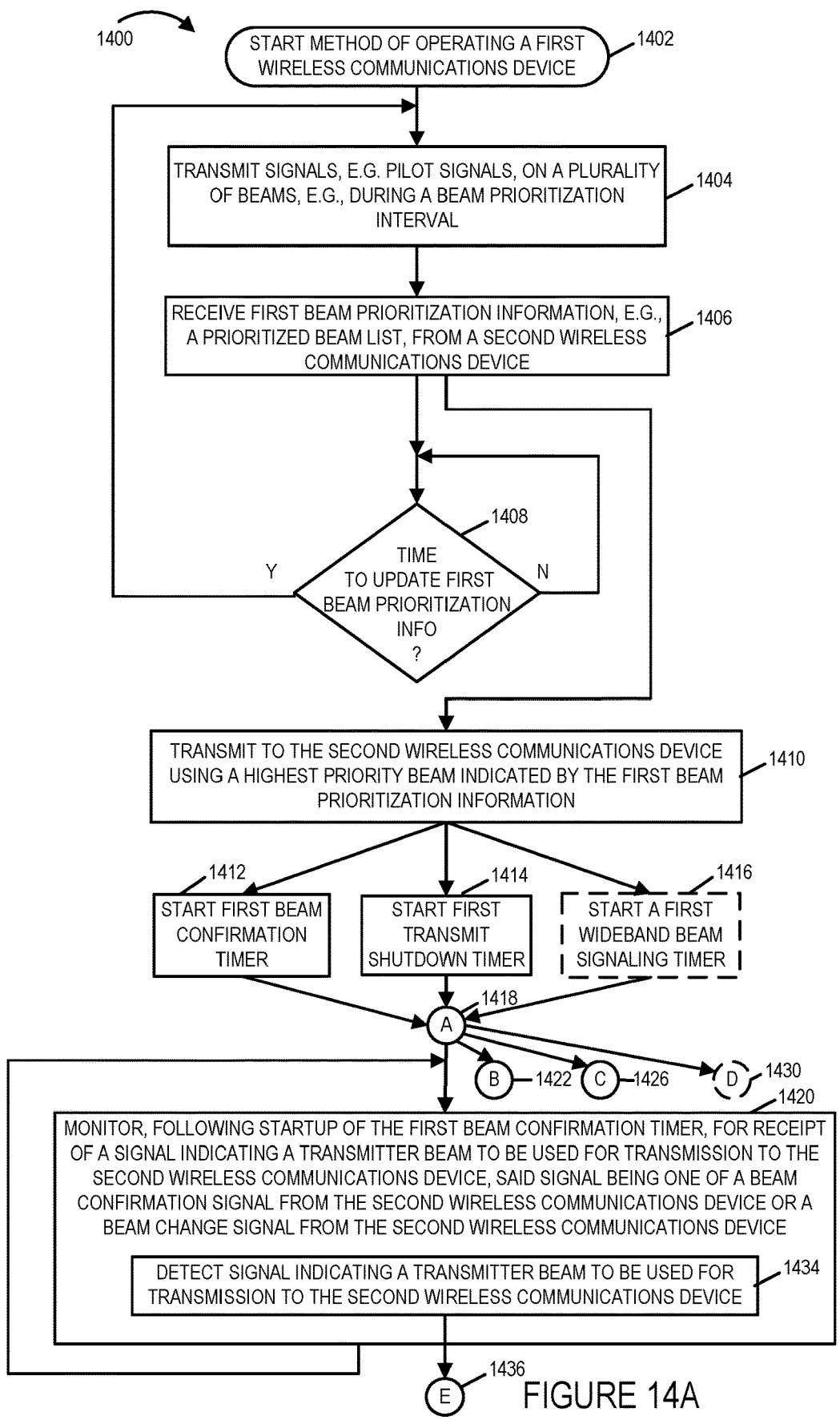
FIG. 14A is a first part of a flowchart of an exemplary method of operating a first wireless communications device, e.g., a device such as a base station supporting an active antenna system and/or using a plurality of different antenna beam patterns, in accordance with an exemplary embodiment.
Figure 14B:
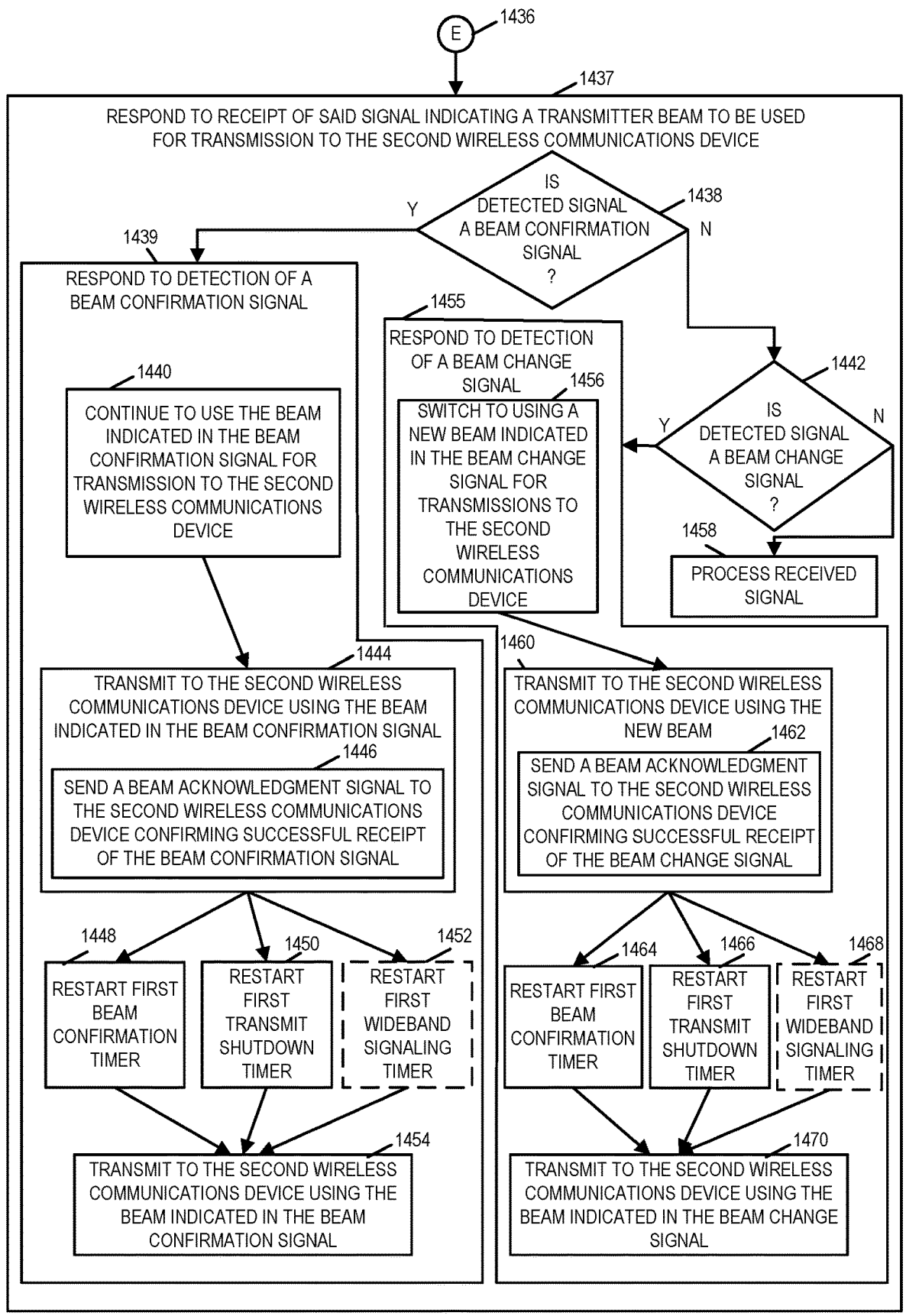
FIG. 14B is a second part of a flowchart of an exemplary method of operating a first wireless communications device, e.g., a device such as a base station supporting an active antenna system and/or using a plurality of different antenna beam patterns, in accordance with an exemplary embodiment.
Figure 14C:
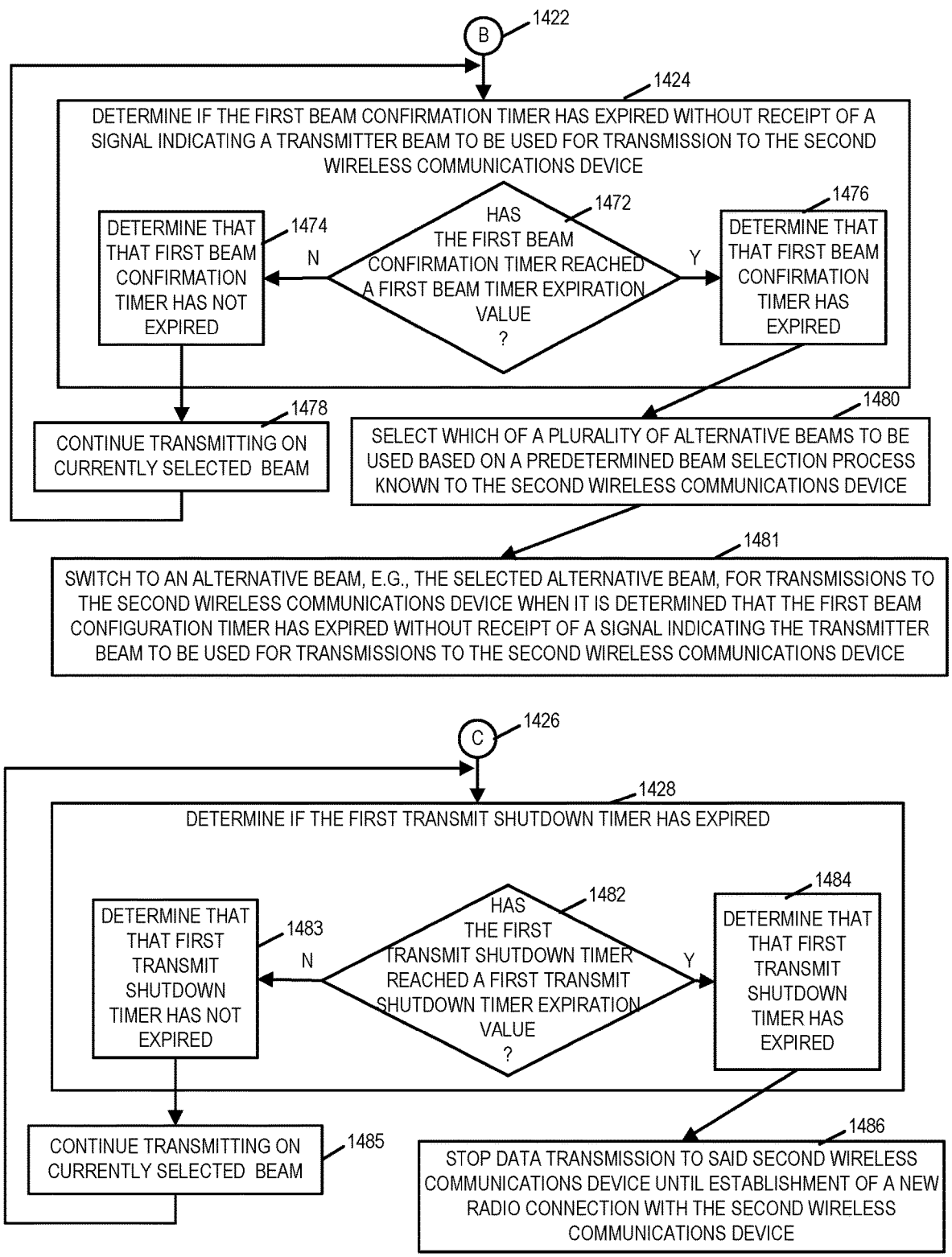
FIG. 14C is a third part of a flowchart of an exemplary method of operating a first wireless communications device, e.g., a device such as a base station supporting an active antenna system and/or using a plurality of different antenna beam patterns, in accordance with an exemplary embodiment.
Figures 14, 14D:
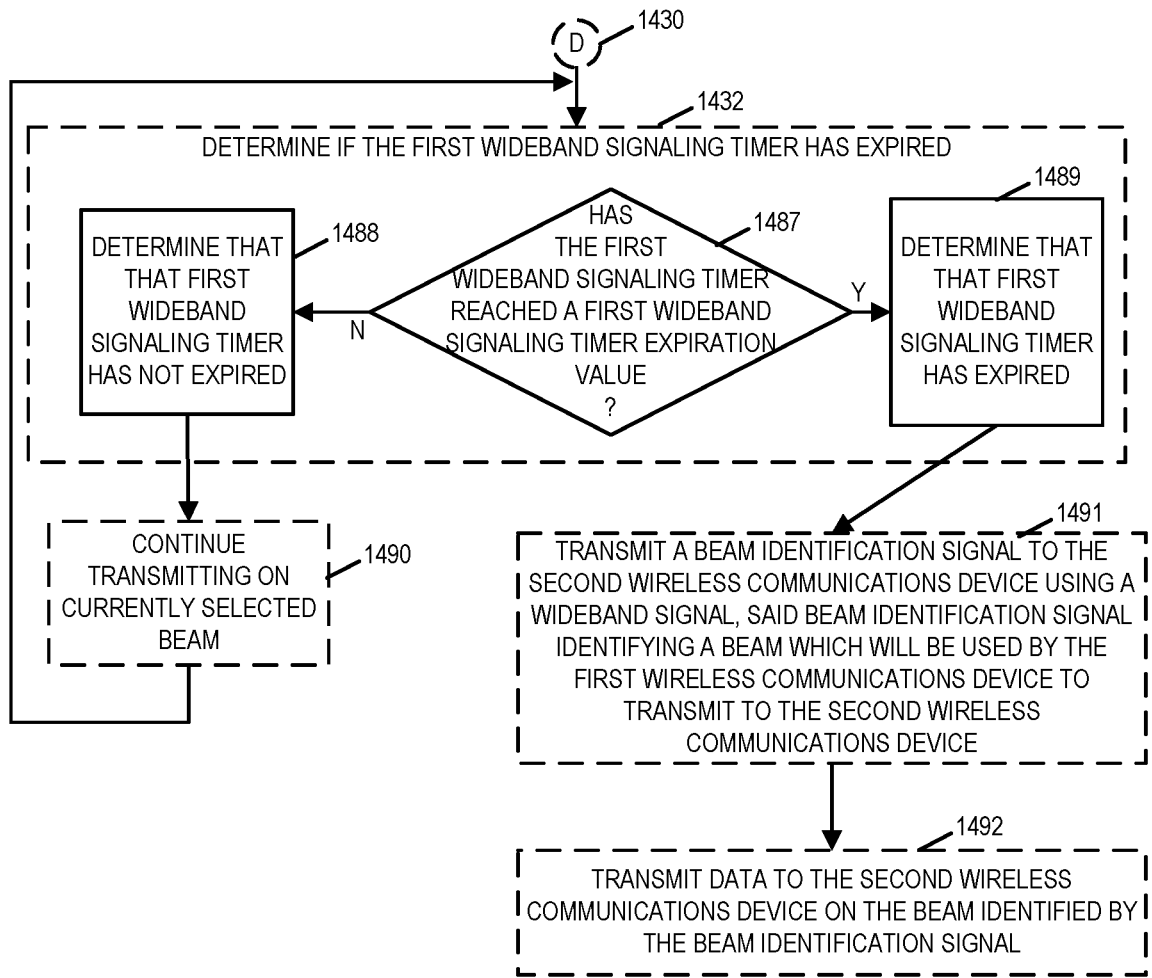
FIG. 14D is a fourth part of a flowchart of an exemplary method of operating a first wireless communications device, e.g., a device such as a base station supporting an active antenna system and/or using a plurality of different antenna beam patterns, in accordance with an exemplary embodiment.
FIG. 14 comprises the combination of FIG. 14A, FIG. 14B, FIG. 14C and FIG. 14D.

FIG. 14, comprising the combination of FIG. 14A, FIG. 14B, FIG. 14C, and FIG. 14D, is a flowchart 1400 of an exemplary method of operating a first wireless communications device, e.g., a device such as a base station supporting an active antenna system and/or using a plurality of different antenna beam patterns, in accordance with an exemplary embodiment. Operation starts in step 1402 in which the first wireless communications device is powered on and initialized. Operation proceeds from step 1402 to step 1404.

In step 1404 the first wireless communications device transmits signals, e.g., pilot signals, on a plurality of beams, e.g., during a beam prioritization interval. Operation proceeds from step 1404 to step 1406. In step 1406, the first wireless communications receives first beam prioritization information, e.g., a prioritized beam list, from a second wireless communications device, e.g., a first user equipment (UE) device to which the first wireless communications device, e.g., base station (BS), transmits. The first UE device may be a mobile device such as a cell phone or a fixed device such as a personal computer at a customer premises. Operation proceeds from step 1406 to step 1408 and step 1410.

In step 1408 the first wireless communications device decides if it is time to update the first beam prioritization information. In some embodiments, there is a known predetermined spacing between successive beam prioritization time intervals. If the first wireless communications device decides that it is time to update first beam prioritization information, then operation proceeds from step 1408 to step 1404 in which the first wireless communications device again transmits signals, e.g., pilot signal, on a plurality of beams, e.g., during another, e.g., the next successive scheduled, beam prioritization time interval. If the first wireless communications device decides in step 1408 that it is not time to update first beam prioritization information, then operation proceeds from step 1408 to the input of step 1408 to perform another check if it is time to update first beam prioritization information at a later point in time, e.g., after a predetermined delay.

Retuning to step 1410, in step 1410 the first wireless communications device transmits to the second wireless communications device using a highest priority beam indicated by the first beam prioritization information. Operation proceeds from step 1410 to steps 1412 and step 1414, and in some embodiments, to step 1416. In step 1412 the first wireless communications device starts a first beam confirmation timer. In step 1414 the first wireless communications device starts a first transmit shutdown timer. In step 1416 the first wireless communications device starts a first wideband signaling timer. Operation proceeds from step 1412, 1414 and 1416 to connecting node A 1418. Operation proceeds from connecting node A 1418 to step 1420, to step 1424 via connecting node B 1422, to step 1428 via connecting node C 1426, and in some embodiments, to step 1432 via connecting node D 1430.

In step 1420, the first wireless communications device monitors, following startup of the first beam confirmation timer, for receipt of a signal indicating a transmitter beam to be used for transmission to the second wireless communications device, said signal being one of a beam confirmation signal from the second wireless communications device or a beam change signal from the second wireless communications device. Step 1420 is performed on a recurring basis. Step 1420 may, and sometimes does, include step 1434 in which the first wireless communications device detects a signal indicating a transmitter beam to be used for transmission to the second wireless communications device. Operation proceeds from step 1434, via connecting node E 1436, to step 1437.

In step 1437 the first wireless communications device responds to receipt of said signal indicating a transmitter beam to be used for transmission to the second wireless communications device. Step 1437 includes steps 1438, 1439, 1440, 1442, 1444, 1446, 1448, 1450, 1454, 1456, 1458, 1460, 1462, 1464, 1466, 1470 and in some embodiments, steps 1452 and 1468.

In step 1438 the first wireless communications devices determines if the detected signal, detected in step 1434, is a beam confirmation signal. If the first wireless communications device determines that the detected signal is a beam confirmation signal, then operation proceeds from step 1438 to step 1439; otherwise, operation proceeds from step 1438 to step 1442. In step 1439 the first wireless communications device responds to detection of a beam confirmation signal. Step 1439 includes steps 1440, 1444, 1446, 1448, 1450, 1454, and in some embodiments, step 1452. In step 1440 the first wireless communications device continues to use the beam indicated in the beam confirmation signal for transmission to the second wireless communications device. Operation proceeds from step 1440 to step 1444. In step 1444 the first wireless communications device transmits to the second wireless communications device using the beam indicated in the beam confirmation signal. In various embodiments, step 1444 includes step 1446 in which the first wireless communications device sends, e.g. on the old beam, a beam acknowledgment signal to second wireless communications device confirming successful receipt of the beam confirmation signal. Operation proceeds from step 1444 to steps 1448, 1450, and in some embodiments, to step 1452. In step 1448 the first wireless communications device restarts the first beam confirmation timer. In step 1450 the first wireless communications device restart the first transmit shutdown timer. In step 1452 the first wireless communications device restart the first wideband signaling timer. Operation proceeds from steps 1448, 1450 and 1452 to step 1454 in which the first wireless communications device transmits to the second wireless communications device using the beam indicated in the beam confirmation signal.

Returning to step 1442, in step 1442, the first wireless communications device determines if the detected signal, detected in step 1434, is a beam change signal. If the determination of step 1442 is that the detected signal is a beam change signal, then operation proceeds from step 1442 to step 1455; otherwise, operation proceeds to step 1458, in which the first wireless communications device processes the received signal.

Retuning to step 1455, in step 1455 the first wireless communications device responds to detection of a beam change signal. Step 1455 includes steps 1456, 1460, 1462, 1464, 1466, 1470, and in some embodiments, step 1468. In step 1456 the first wireless communications device switches to using a new beam indicated in the beam change signal for transmissions to the second wireless communications device. Operation proceeds from step 1456 to step 1460.

In step 1460 the first wireless communications device transmits to the second wireless communications device using the new beam indicated in the beam change signal. Step 1460 includes step 1462 in which the first wireless communications device sends, e.g., on the new beam, a beam acknowledgment signal to second wireless communications device confirming successful receipt of the beam change signal. Operation proceeds from step 1460 to steps 1464, 1466, and in some embodiments, to step 1468. In step 1464 the first wireless communications device restarts the first beam confirmation timer. In step 1466 the first wireless communications device restart the first transmit shutdown timer. In step 1468 the first wireless communications device restart the first wideband signaling timer. Operation proceeds from steps 1464, 1466 and 1468 to step 1470 in which the first wireless communications device transmits to the second wireless communications device using the beam indicated in the beam change signal.

Returning to step 1424, in step 1424 the first wireless communications device determines if the first beam confirmation timer has expired without receipt of a signal, e.g. a beam confirmation signal or a beam change signal, indicating a transmitter beam to be used for transmission to the second wireless communications device. Step 1424 includes steps 1472, 1474, and 1476. In step 1472 the first wireless communications device determines if the first beam confirmation timer has reached a first beam timer expiration value. If the determination is that that the first beam confirmation timer has reached the first beam timer expiration value, then operation proceeds from step 1472, to step 1476; otherwise, operation proceeds from step 1472 to step 1474. In step 1472 the first wireless communications device determines that the first beam confirmation timer has expired. Operation proceeds from step 1476 to step 1480. In step 1480 the first wireless communications device selects which of a plurality of alternative beams to be used based on a predetermined beam selection process known to the second wireless communications device. For example, if there was a good previous beam known to the base station and UE select to use the last good beam otherwise select to use the next highest priority beam indicated in the first beam prioritization information. Operation proceeds from step 1480 to step 1481.

In step 1481 the first wireless communications device switches to an alternative beam, e.g., the selected alternative beam, for transmission to the second wireless communications device when it is determined that the first beam configuration timer has expired without receipt of a signal indicating the transmission beam to be used for transmission to the second wireless communications device. In some embodiments, the beam to which the switch is made is one of the next priority beam indicated by the first beam prioritization information, e.g., next lowest priority beam, or a beam previously used for communicating with the second communications device.

Returning to step 1474, in step 1474 the first wireless communications device determines that the first beam configuration timer has not expired. Operation proceeds from step 1474 to strep 1478, in which the first wireless communications device continues transmitting on the currently selected beam. Operation proceeds from step 1478 to the input of step 1424.

Returning to step 1428, in step 1428 the first wireless communications device determines if the first transmit shutdown timer has expired, e.g., without receipt of a signal indicating a transmitter beam to be used for transmission to the second wireless communications device having been received. Step 1428 includes steps 1482, 1483, and 1484. In step 1482 the first wireless communications device determines if the first transmit shutdown timer has reached a first transmit shutdown timer expiration value. If the determination is that that the first transmit shutdown timer has reached the first transmit shutdown timer expiration value, then operation proceeds from step 1482, to step 1484; otherwise, operation proceeds from step 1482 to step 1483. In step 1484 the first wireless communications device determines that the first transmit shutdown timer has expired. Operation proceeds from step 1484 to step 1486. In step 1486 the first wireless communications device stops data transmission to said second wireless communications device until establishment of a new radio connection with the second wireless communications device.

Returning to step 1483, in step 1483 the first wireless communications device determines that the first transmit shutdown timer has not expired. Operation proceeds from step 1483 to strep 1485, in which the first wireless communications device continues transmitting on the currently selected beam. Operation proceeds from step 1485 to the input of step 1428.

Returning to step 1432, in step 1432 the first wireless communications device determines if the first wideband signaling timer has expired, e.g., without receipt of a signal indicating a transmitter beam to be used for transmission to the second wireless communications device having been received. Step 1432 includes steps 1487, 1488, and 1489. In step 1487 the first wireless communications device determines if the first wideband signaling timer has reached a first wideband signaling timer expiration value. If the determination is that that the first wideband signaling timer has reached the first wideband signaling timer expiration value, then operation proceeds from step 1487, to step 1489; otherwise, operation proceeds from step 1487 to step 1488. In step 1489 the first wireless communications device determines that the first wideband signaling timer has expired. Operation proceeds from step 1489 to step 1491. In step 1491 the first wireless communications device transmits a beam identification signal to the second wireless communications device using a wideband beam, said beam identification signal identifying, e.g., indicating, a beam which will be used by the first wireless communications device to transmit to the second wireless communications device. In various embodiments, the wideband beam is abeam which spans an area covered by multiple different beams indicated in said first beam prioritization information and which uses the same frequency band used by the beams listed in the first beam prioritization information. In some such embodiments, the wideband beam covers the area of at least the last beam used to communicate with the second wireless communications device and two physically adjacent beams, e.g., a left beam and a right beam. Operation proceeds from step 1491 to step 1492. In step 1492 the first wireless communications device transmits data to the second wireless communications device on the beam identified by the beam identification signal.

Returning to step 1488, in step 1488 the first wireless communications device determines that the first wideband signaling timer has not expired. Operation proceeds from step 1488 to strep 1490, in which the first wireless communications device continues transmitting on the currently selected beam. Operation proceeds from step 1490 to the input of step 1432.

In some embodiments, the first beam confirmation time has a first duration Tc, said second beam shutdown time has a second duration Ts, and said first wideband signaling timer has a third duration Twbi, where Tc<Twbi<Ts.

Figure 16:
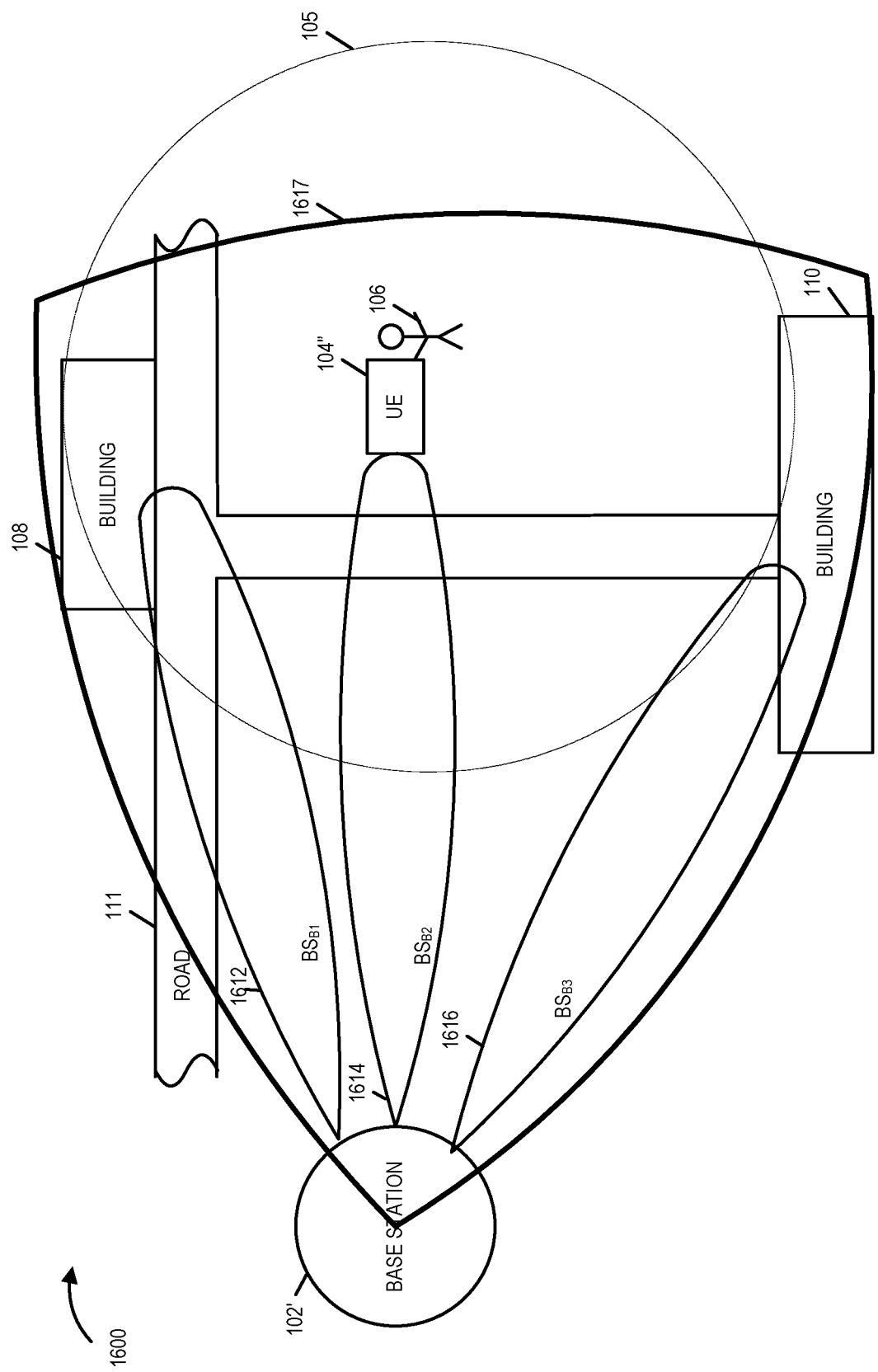
FIG. 16 is a drawing illustrating an exemplary base station supporting an active antenna system capable of forming and/or using a plurality of different antenna beam patterns, an exemplary user equipment (UE) device, and exemplary base station (BS) transmission beams including directed beams and a wideband beam in accordance with an exemplary embodiment.
Figure 17:
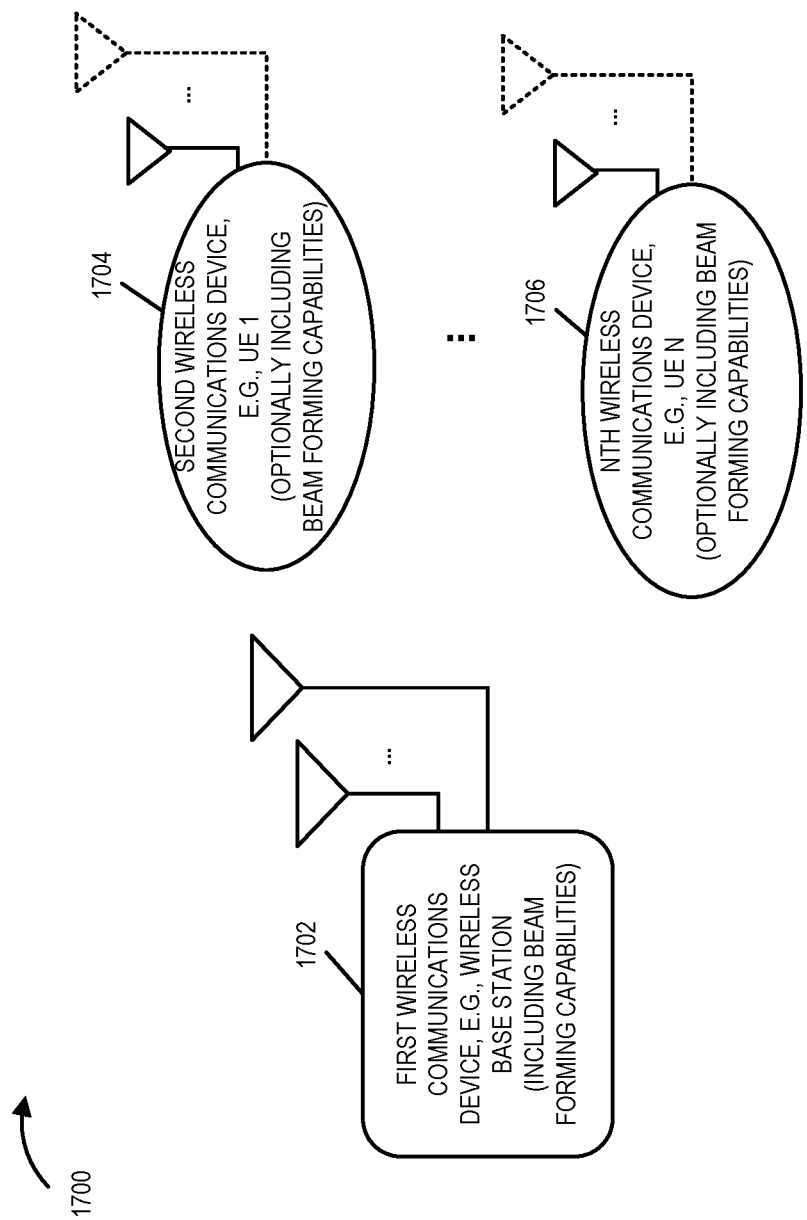
FIG. 17 is a drawing of an exemplary communications system in accordance with an exemplary embodiment.
Figure 18:
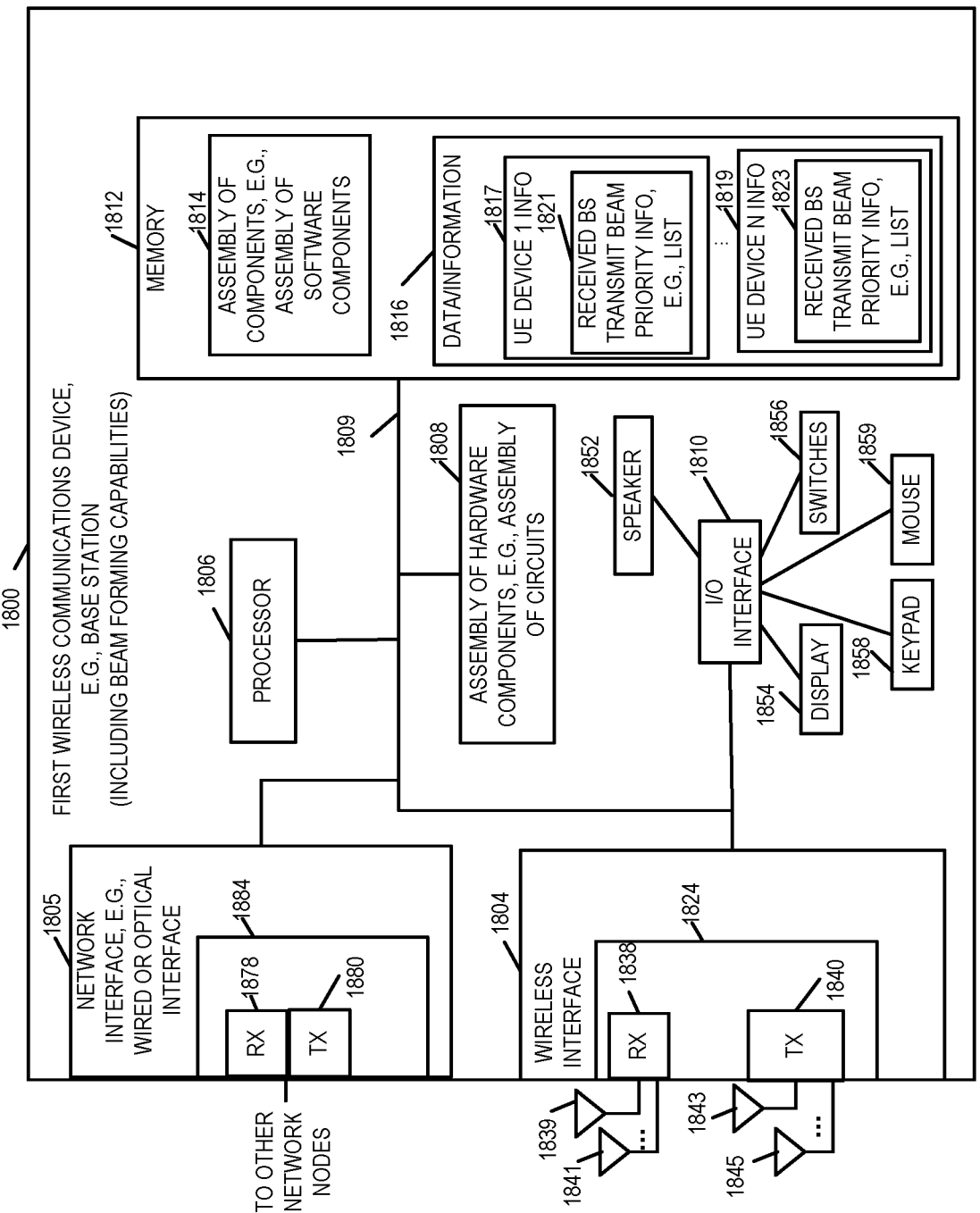
FIG. 18 is a drawing of an exemplary first wireless communications device, e.g., exemplary base station in accordance with an exemplary embodiment.

The method of flowchart 1400 of FIG. 14 is implemented by, e.g., any of devices: base station 102 of FIGS. 1, 3, 5 and 7, 102' of FIG. 16, and first wireless communications device 1702 of FIG. 17, first wireless communications device 1800 of FIG. 18.

Figure 15A:
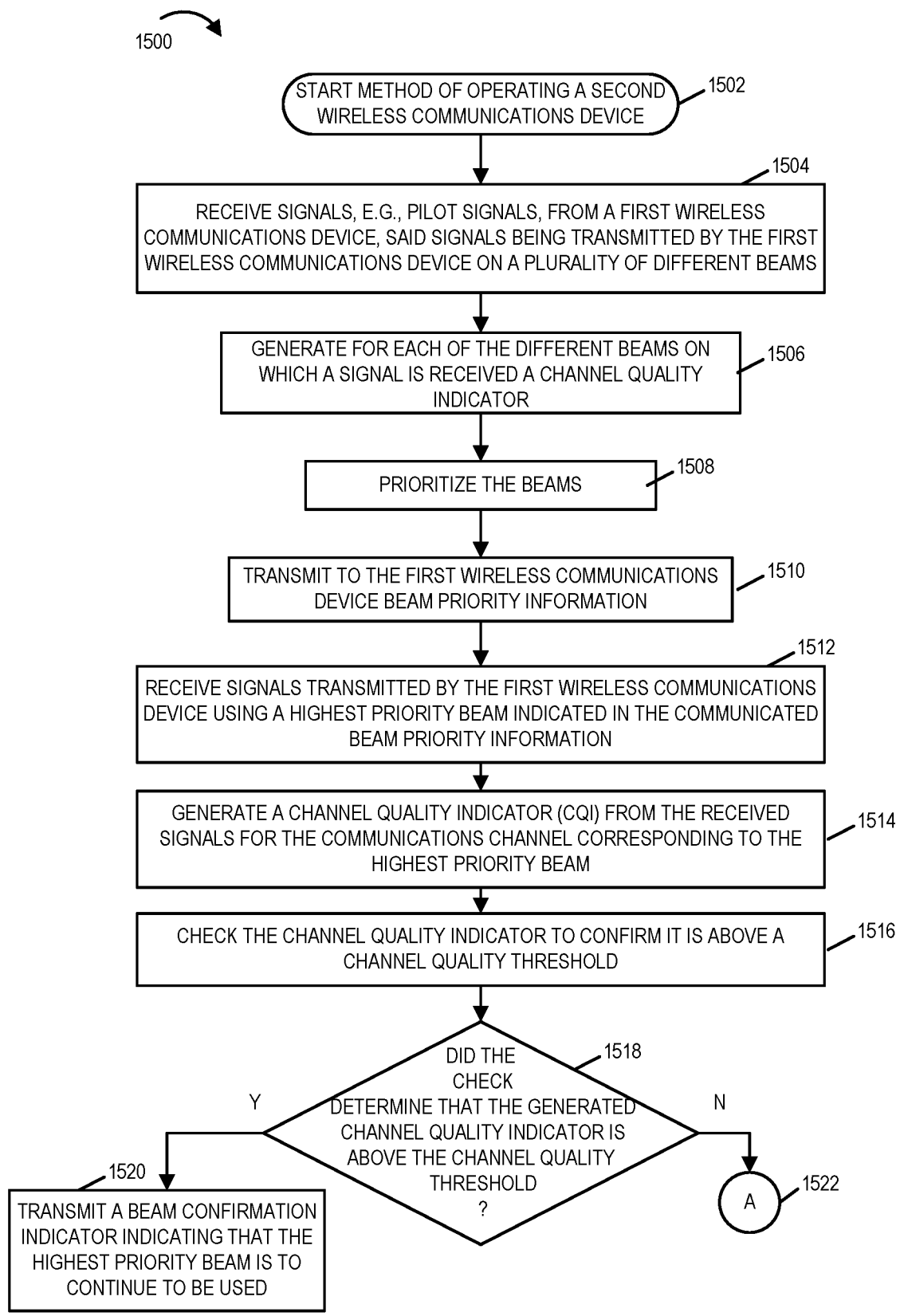
FIG. 15A is a first part of a flowchart of an exemplary method of operating a second wireless communications device in communications with a first wireless communications device, which uses multiple beams for transmission, in accordance with an exemplary embodiment.
Figure 15B:
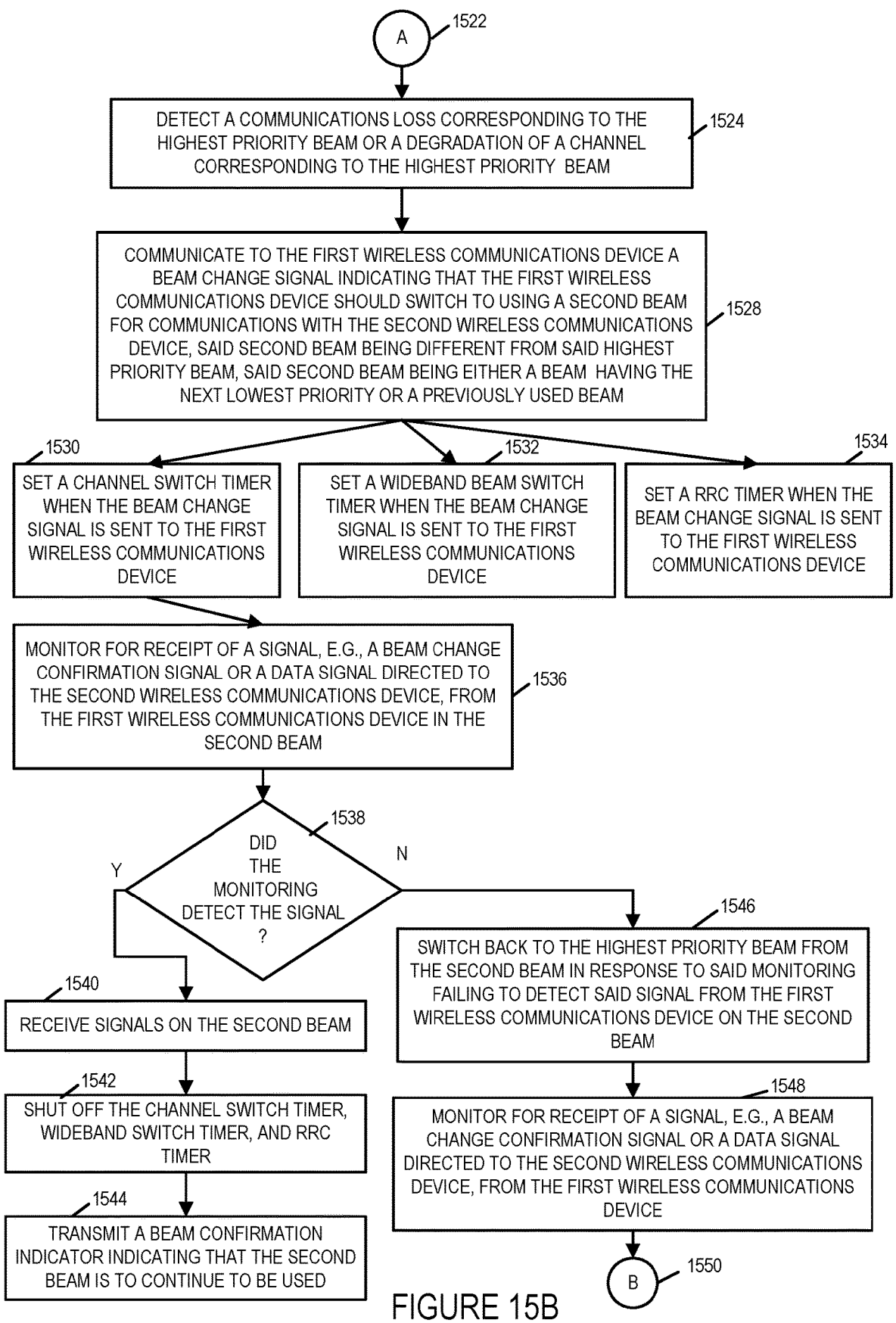
FIG. 15B is a second part of a flowchart of an exemplary method of operating a second wireless communications device in communications with a first wireless communications device, which uses multiple beams for transmission, in accordance with an exemplary embodiment.
Figures 15, 15A, 15B, 15C:
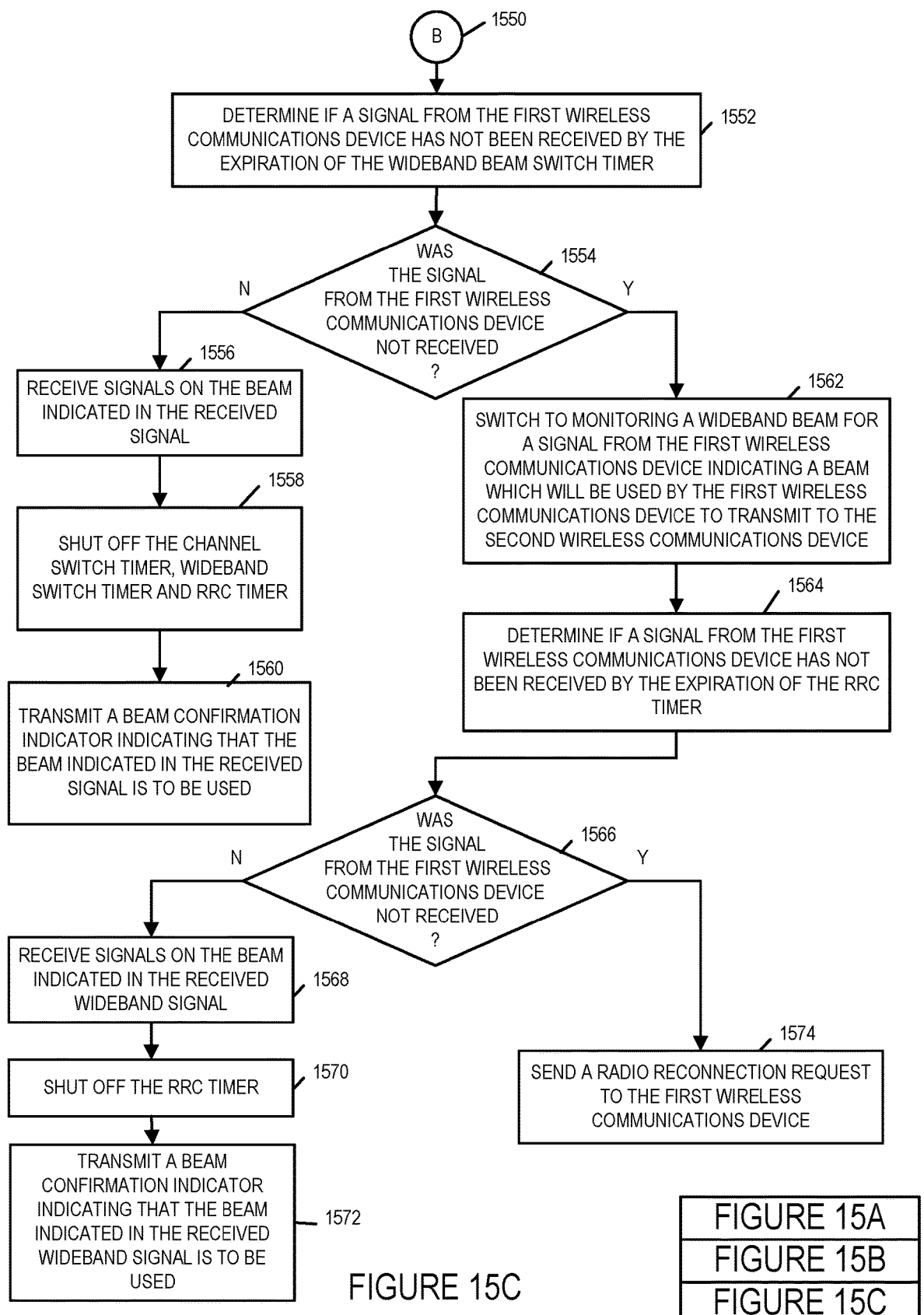
FIG. 15C is a third part of a flowchart of an exemplary method of operating a second wireless communications device in communications with a first wireless communications device, which uses multiple beams for transmission, in accordance with an exemplary embodiment.
FIG. 15 comprises the combination of FIG. 15A, FIG. 15B, and FIG. 15C.

FIG. 15, comprising the combination of FIG. 15A, FIG. 15B and FIG. 15C, is a flowchart 1500 of an exemplary method of operating a second wireless communications device in communications with a first wireless communications device, which uses multiple beams for transmission, in accordance with various exemplary embodiments. In one embodiment the first wireless communications device is, e.g., a device such as a base station supporting an active antenna system and/or using a plurality of different antenna beam patterns, and the second wireless communications device is, e.g., a first user equipment (UE) device to which the first wireless communications device, e.g., base station (BS), transmits. In step 1502 the second wireless communications device is powered on and initialized. Operation proceeds from step 1502 to step 1504.

In step 1504 the second wireless communications device receive signals, e.g., pilot signals, from the first wireless communications device, said signals being transmitted by the first wireless communications device in a plurality of different beams. Operation proceeds from step 1504 to step 1506.

In step 1506 the second wireless communications device generates for each of the different beams on which a signal is received a channel quality indicator. In some embodiments, the generated channel quality indicator (CQI) is in the form of an RSSI or SNR. In some embodiments, the channel quality indicator is based on both an RSSI and an SNR. Operation proceeds from step 1506 to step 1508. In step 1508 the second wireless communications device prioritizes the beams. Operation proceeds from step 1508 to step 1510.

In step 1510 the second wireless communications device transmits to the first wireless communications device beam priority information. In some embodiments, the bam priority information is a ranked list showing the second wireless communication devices's priority ordering of beams from which signals were received. Operation proceeds from step 1510 to step 1512.

In step 1512 the second wireless communications device receives signals transmitted by the first wireless communications device using a highest priority beam indicated in the communicated beam priority information. Operation proceeds from step 1512 to step 1514.

In step 1514 the second wireless communications device generates a channel quality indicator (CQI) from the received signals for the communications channel corresponding to the highest priority beam. Operation proceeds from step 1514 to step 1516.

In step 1516 the second wireless communications device checks the channel quality indicator to confirm it is above a channel quality threshold. Operation proceeds from step 1516 to step 1518. If the determination is that the check of the generated channel quality indicator is above the generated channel quality threshold, then operation proceeds from step 1518 to step 1520, where the second wireless communications device transmits a beam confirmation indicator indicating that the highest priority beam is to continue to be used. However, if the determination is that the check of the generated channel quality indicator is not above the generated channel quality threshold, then operation proceeds from step 1518, via connecting node A 1522, to step 1524.

In step 1524 the second communications device detects a communications loss corresponding to the highest priority beam, e.g., a failure to receive signals on the highest priority beam as may be indicated by a complete failure or packet loss, or a degradation of a channel corresponding to the highest priority beam, e.g., as indicated by an additional CQI generated from another received signal or a low SNR of the communications channel corresponding to the highest priority beam. Operation proceeds from step 1524 to step 1528.

In step 1528 the second wireless communications device communicates to the first wireless communications device a beam change signal indicating that the first wireless communications device should switch to using a second beam for communications with the second wireless communications device, said second beam being different from said highest priority beam, said second beam being either a beam having the next lowest priority or a previously used beam. Operation proceeds from step 1528 to steps 1530, 1532 and 1534. In step 1530 the second wireless communications device sets a channel switch timer when the beam change signal is sent to the first wireless communications device. In step 1532 the second wireless communications device sets a wideband beam switch timer when the beam change signal is sent to the first wireless communications device. In step 1534 the second wireless communications device sets a RRC timer when the beam change signal is sent to the first wireless communications device. Operation proceeds from step 1530 to step 1536.

In step 1536 the second wireless communications device monitors for receipt of a signal, e.g., a beam change confirmation signal or a data signal directed to the second wireless communications device, from the first wireless communications device in the second beam. Operation proceeds from step 1536 to step 1538. If the monitoring of step 1536 detects receipt of the signal in the second beam before the channel switch timer expires, then operation proceeds from step 1536 to step 1538 to step 1540, in response to the detection. In step 1540 the second wireless communications device receives signals of the second beam. Operation proceeds from step 1540 to step 1542. In step 1542, the second wireless communications device shuts off the channel switch timer, the wideband switch timer, and the RRC timer. Operation proceeds form step 1542 to step 1544. In step 1544 the second wireless communications device transmits a beam confirmation indicator indicating that the second beam is to continue to be used for transmission to the second wireless communications device.

If the monitoring of step 1536 fails to detect the signal on the second beam and the beam change timer expires, then operation proceeds from step 1538 to step 1546.

In step 1546 the second wireless communications device switches back to the highest priority beam from the second beam in response to said monitoring failing to detect said signal from the first wireless communications device on the second beam. Operation proceeds from step 1546 to step 1548.

In step 1548 the second wireless communications device monitors for receipt of a signal, e.g., a beam change confirmation signal or a data signal directed to the second wireless communications device, from the first wireless communications device. In some embodiments, during step 1548 the wireless communications device may, and sometimes does, monitor on multiple different beams in succession, e.g., each for a predetermined amount of time, e.g., an amount of time corresponding to the channel switch timer setting value. In some embodiments, the order of the search is based on the beam priority information. Operation proceeds from step 1548, via connecting node B 1550, to step 1552. In step 1552 the second wireless communications device determines if a signal from the first wireless communications device has not been detected by the expiration of the wideband beam switch timer. Operation proceeds from step 1552 to step 1554.

In step 1554 the second wireless communications device controls operation as a function of the determination if the signal from the first wireless communications device was not received by the expiration of the wideband beam switch timer. If the determination is that the signal being monitored for was not received from the wireless communications by the expiration of the wideband switch timer, then operation proceeds from step 1554 to step 1562. However, if the determination is that the signal being monitored for was received from the wireless communications before the expiration of the wideband switch timer, then operation proceeds from step 1554 to step 1566 in response to the detection of the signal.

In step 1556 the second wireless communications device receives signals of the beam indicated in the received signal. Operation proceeds from step 1556 to step 1558. In step 1558, the second wireless communications device shuts off the channel switch timer, the wideband switch timer, and the RRC timer. Operation proceeds form step 1558 to step 1560. In step 1560 the second wireless communications device transmits a beam confirmation indicator indicating that the beam indicated in the received signal is to be used for transmissions to the second wireless communications device.

Returning to step 1562, in step 1562 the second wireless communications device switches to monitoring a wideband beam for a signal from the first wireless communications device indicating a beam which will be used by the first wireless communications device to transmit to the second wireless communications device. Operation proceeds from step 1562 to step 1564.

In step 1564 the second wireless communications device determines if a signal from the first wireless communications device has not been received by the expiration of the RRC timer. Operation proceeds from step 1564 to step 1566.

In step 1566 the second wireless communications device controls operation as a function of the determination if the signal from the first wireless communications device was not received by the expiration of the RRC timer. If the determination is that the signal being monitored for was not received from the wireless communications by the expiration of the RRC timer, then operation proceeds from step 1566 to step 1574. However, if the determination is that the signal being monitored for was received from the wireless communications before the expiration of the RRC timer, then operation proceeds from step 1566 to step 1568 in response to the detection of the signal.

In step 1568 the second wireless communications device receives signals on the beam indicated in the received wideband signal. Operation proceeds from step 1568 to step 1570. In step 1570, the second wireless communications device shuts off the RRC timer. Operation proceeds form step 1570 to step 1572. In step 1572 the second wireless communications device transmits a beam confirmation indicator indicating that the beam indicated in the received wideband beam signal is to be used for transmissions to the second wireless communications device.

Retuning to step 1574, in step 1574 the second wireless communications device sends a radio reconfiguration request to the first wireless communications device.

The method of flowchart 1500 of FIG. 15 is implemented by, e.g., any of devices: UE 104 of FIGS. 1, 3 and 5, UE 104' of FIG. 7, 104" of FIG. 16, second wireless communications device 1704 of FIG. 17, Nth wireless communications device 1706 of FIG. 17, and second wireless communications device 1900 of FIG. 19.

FIG. 16 is a drawing 1600 illustrating an exemplary base station 102' supporting an active antenna system capable of forming and/or using a plurality of different antenna beam patterns, an exemplary user equipment (UE) device 104", and exemplary base station (BS) transmission beams including directed beams (BSB1 1612, BSB2 1614, BSB3 1616) and a wideband beam 1617 in accordance with an exemplary embodiment.

FIG. 17 is a drawing of an exemplary communications system 1700 in accordance with an exemplary embodiment. Exemplary communications system 1700 includes a first wireless communications device, e.g., a wireless base station 1702 including beam forming capabilities, and a plurality of additional wireless communications devices, e.g., user equipment devices (UE 1 1704, . . . UE N 1706) optionally including beam forming capabilities. First wireless communications device 1702 supports transmission to devices (1704, . . . , 1706) on multiple alternative beams. First wireless communications device is, e.g., device 1800 of FIG. 18 and implements the method of flowchart 1400 of FIG. 14. Second wireless communications device 1704 is, e.g., device 1900 of FIG. 19 and implements the method of flowchart 1500 of FIG. 15. Nth wireless communications device 1706 is, e.g., another device implemented as device 1900 of FIG. 19 and also implements the method of flowchart 1500 of FIG. 15.

In some embodiments, both the first wireless communications device 1702 and the second wireless communications device 1704 support beam forming with regard to their transmissions, respectively. In some such embodiments, device 1702 implements a method in accordance with flowchart 1400 of FIG. 14 regarding the downlink signaling and a method in accordance with flowchart 1500 of FIG. 15 regarding uplink signaling; and device 1704 implements a method in accordance with flowchart 1400 of FIG. 14 regarding the uplink signaling and a method in accordance with flowchart 1500 FIG. 15 regarding downlink signaling.

FIG. 18 is a drawing of an exemplary first wireless communications device 1800 including beam forming capabilities, e.g., a base station including beam forming capabilities in accordance with an exemplary embodiment. In some embodiments, exemplary base station 1800 is a first wireless communications device, e.g., the first wireless communications device implementing the method of flowchart 1400 of FIG. 14. Exemplary base station 1800 includes a wireless interface 1804, a network interface 1805, e.g., a wired or optical interface, a processor 1806, e.g., a CPU, an assembly of hardware components 1808, e.g., an assembly of circuits, and I/O interface 1810 and memory 1812 coupled together via a bus 1809 over which the various elements may interchange data and information. Base station 1800 further includes a speaker 1852, a display 1853, switches 1856, keypad 1858 and mouse 1859 coupled to I/O interface 1810, via which the various I/O devices (1852, 1854, 1856, 1858, 1859) may communicate with other elements (1804, 1806, 108, 1812) of the base station. Network interface 1805 includes a receiver 1878 and a transmitter 1880. In some embodiments, receiver 1878 and transmitter 1880 are part of a transceiver 1884. Wireless interface 1804 includes a wireless receiver 1838 and a wireless transmitter 1840. In some embodiments, receiver 1838 and transmitter 1840 are part of a transceiver 1842. In various embodiments, wireless interface 1904 includes a plurality of wireless receivers and a plurality of wireless transmitters. Wireless receiver 1838 is coupled to a plurality of receive antennas (receive antenna 1 1839, . . . , receive antenna M 1841), via which base station 1800 can receive wireless signal from other wireless communications devices including a second wireless communications device, e.g., a UE device. Received signals include, e.g., first beam prioritization information, e.g., a prioritized beam list from the second wireless communications device, a beam confirmation signal from the second wireless communications device, a beam change signal from the second wireless communications device, and a radio reconnection request signal from the second wireless communications device. Wireless transmitter is coupled to a plurality of wireless transmit antennas (transmit antenna 1 1843, . . . , transmit antenna N 1845) via which the base station 1800 can transmit signals to other wireless communications device including a second wireless communications device, e.g., a UE device. Transmit signals include, e.g., pilot signals on a plurality of alternative transmit beams, data signals directed to a second wireless communications device on a currently selected beam, a beam acknowledgment signal directed to the second wireless communications device, and a beam identification signal in a wideband signal directed to the second wireless communications device.

In some embodiments, wireless receiver 1838 is configured to: receive first beam prioritization information from a second wireless communications device, receive a beam confirmation signal from the second wireless communications device and receive a beam change signal from the second wireless communications device. In some embodiments, the wireless transmitter 1840 is configured to: transmit to the second wireless communications device using a highest priority beam indicated by the first beam prioritization information, transmitting to the second wireless communications device using a new beam, e.g., indicated in a received beam change signal, continue to transmit to the second wireless communications device using the same beam, e.g., based on a received beam confirmation signal, send a beam change acknowledgment signal to the second wireless communications device indicating successful receipt of the beam change signal, transmit a beam identification signal to the second wireless communications device using a wideband beam, e.g., in response to a wideband signaling timer having expired, and transmit data to the second wireless communications device on the beam identified by the beam identification signal following transmission of the beam identification signal.

Memory 1812 includes an assembly of component 1814, e.g., an assembly of software components, and data/information 1816. Data/information 1816 includes UE device information corresponding to a plurality of user equipment devices (UE device 1 information 1817, . . . , UE device N information 1819). In one exemplary embodiment UE device 1 is a second wireless communications device. UE device 1 information 1817 includes a received base station transmit beam priority information 1821, e.g., a transmit beam priority list which has been generated by UE device 1 and communicated to base station 1800. UE device N information 1819 includes a received base station transmit beam priority information 1923, e.g., a transmit beam priority list which has been generated by UE device N and communicated to base station 1800.

Figure 19:
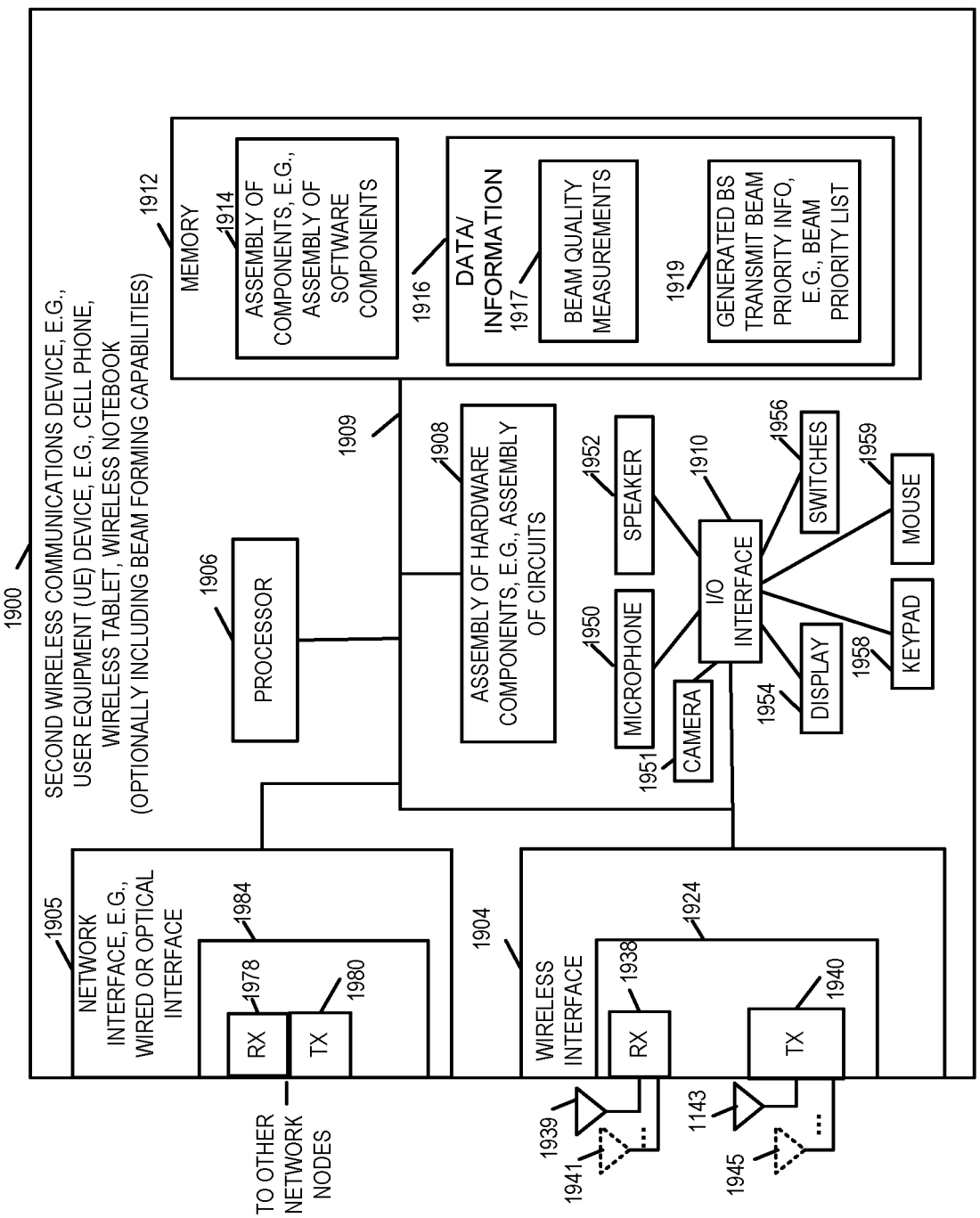
FIG. 19 is a drawing of an exemplary second wireless communications device, e.g., an exemplary user equipment device, in accordance with an exemplary embodiment.

FIG. 19 is a drawing of an exemplary second wireless communications device 1900, e.g., an exemplary user equipment (UE) device in accordance with an exemplary embodiment. UE device 1900 is, e.g., a cell phone such as a smart phone, wireless table or wireless notebook. UE device 1900, in some embodiments, includes beam forming capabilities. In some embodiments, exemplary UE device 1900 is a second wireless communications device, e.g., the second wireless communications device implementing the method of flowchart 1500 of FIG. 15. Exemplary UE device 1900 includes a wireless interface 1904, a processor 1906, e.g., a CPU, an assembly of hardware components 1908, e.g., an assembly of circuits, and I/O interface 1910 and memory 1912 coupled together via a bus 1909 over which the various elements may interchange data and information. UE device 1900 further includes a microphone 1950, camera 1951, speaker 1952, a display 1953, e.g., a touch screen display, switches 1956, keypad 1958 and mouse 1959 coupled to I/O interface 1910, via which the various I/O devices (1950, 1951, 1952, 1954, 1956, 1958, 1959) may communicate with other elements (1904, 1906, 1908, 1912) of the base station. Network interface 1905 includes a receiver 1978 and a transmitter 1980. In some embodiments, receiver 1978 and transmitter 1980 are part of a transceiver 1984. Wireless interface 1904 includes a wireless receiver 1938 and a wireless transmitter 1940. In some embodiments, receiver 1938 and transmitter 1940 are part of a transceiver 1924. In various embodiments, wireless interface 1904 includes a plurality of wireless receivers and a plurality of wireless transmitters. Wireless receiver 1938 is coupled to one or more receive antennas (receive antenna 1 1939, . . . , receive antenna M 1941), via which UE device 1900 can receive wireless signal from other wireless communications devices including a first wireless communications device, e.g., a base station such as BS 1800. Received signals include, e.g., pilot signals received on a plurality of first wireless communications device transmit beams, signals, e.g., data signals, transmitted by the first wireless communications device on a selected transmit beam, e.g., a highest priority transmit beam or an alternative beam to which transmission has been switched in accordance with beam changing protocol rules and the stored beam priority list, a beam change confirmation signal from the first wireless communications device, and a wideband beam signal including information indicating a beam, e.g., a currently selected beam which is one of the alternative beams on the beam priority list, to be used for transmissions to the second wireless communications device. Wireless transmitter 1940 is coupled to one or more wireless transmit antennas (transmit antenna 1 1943, . . . , transmit antenna N 1945) via which the UE device 1900 can transmit signals to other wireless communications device including a first wireless communications device, e.g., a base station such as BS 1800. Transmit signals include, e.g., beam priority information, e.g., second wireless communications device generated first wireless communications device transmit beam priority list, a beam confirmation indicator signal, a beam change signal, and a radio reconnection request signal.

In some embodiments, wireless receiver 1938 is configured to: receive signals, e.g., pilot signals form a first wireless communications device, e.g., a base station which uses multiple beams for transmission, said signals being transmitted by the first wireless communications device on a plurality of different beams, receive signals transmitted by the first wireless communications device on the highest priority beam indicated in communicated beam priority information, receive a signal from the first wireless communications device on a second beam, said second beam being different from said highest priority beam, receive a beam change confirmation signal directed to the second wireless communications device, receive data signals directed to the second wireless communications device, receive a signal in a wideband beam from the first wireless communications device indicating a beam which will be used by the first wireless communications device to transmit to the second wireless communications device.

In some embodiments, wireless transmitter 1940 is configured to: transmit to the first wireless communications device beam priority information, transmit a beam confirmation indicator indicating that the currently selected beam, e.g., the highest priority beam, is to continue to be used, e.g., in response to checking determining that a generated channel quality indicator is above a channel quality threshold, and communicate to the first wireless communications device a beam change signal indicating that the first wireless communications device should switch to using a second beam for communications with the second wireless communications device, said second beam being a different beam, e.g., a next lowest priority beam or a previously used beam, than the beam being currently used, e.g., the highest priority beam, by the first wireless communications device. In some such embodiments, the wireless transmitter 1940 is further configured to: send a radio reconnection request to the first wireless communications device, e.g., in response to determining that after setting of the RRC timer, a signal from the first wireless communications device has not been received by the expiration of the RRC timer.

Memory 1912 includes an assembly of components 1914, e.g., an assembly of software components, and data/information 1916. Data/information 1916 includes beam quality measurements 1917 and generated base station (BS) transmit beam priority information, e.g., a generated transmit beam priority list based on the beam quality measurements.

Figure 20A:
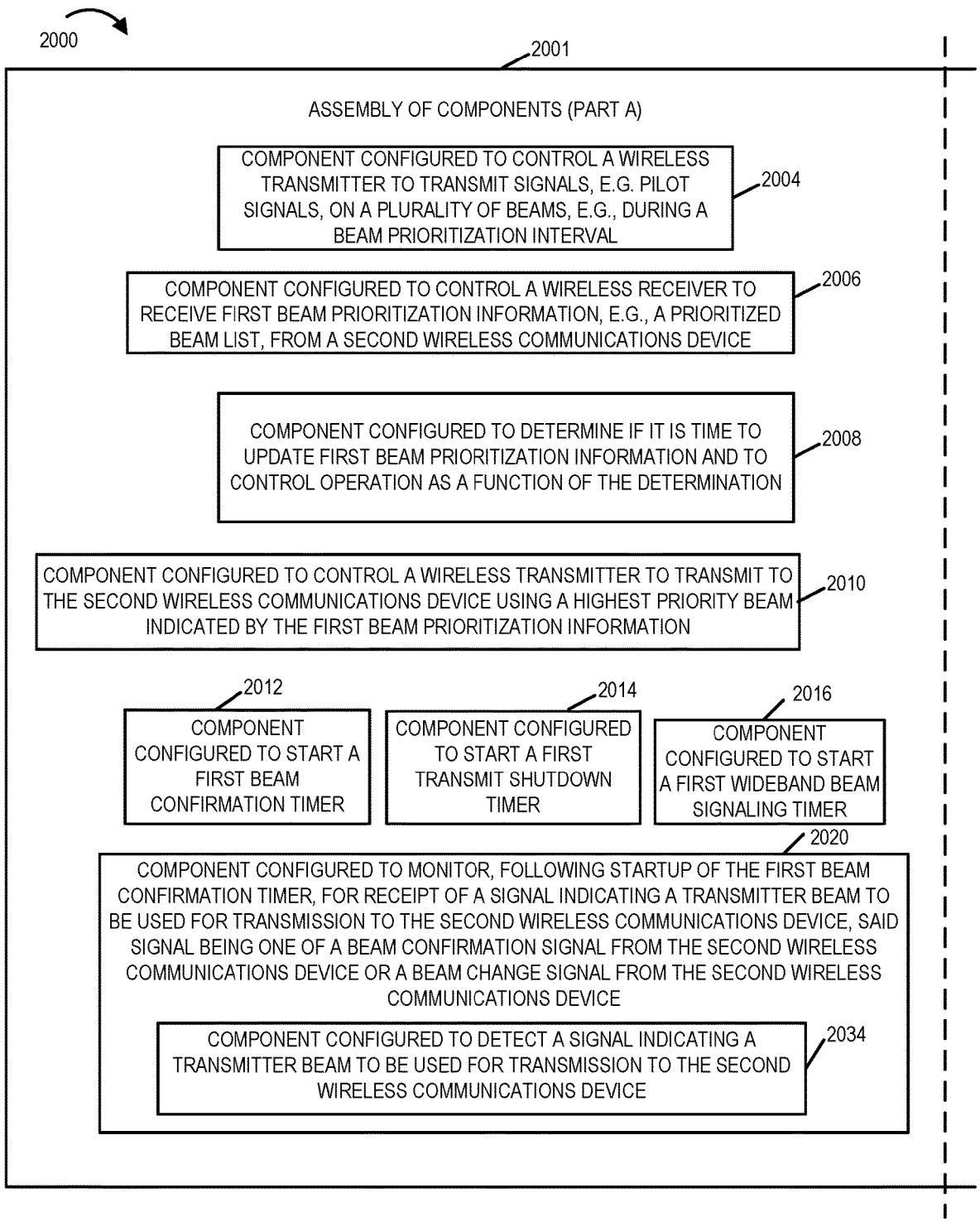
FIG. 20A is a drawing of a first part of an exemplary assembly of components which may be included in an exemplary first wireless communications device, e.g., a base station, in accordance with an exemplary embodiment.
Figure 20B:
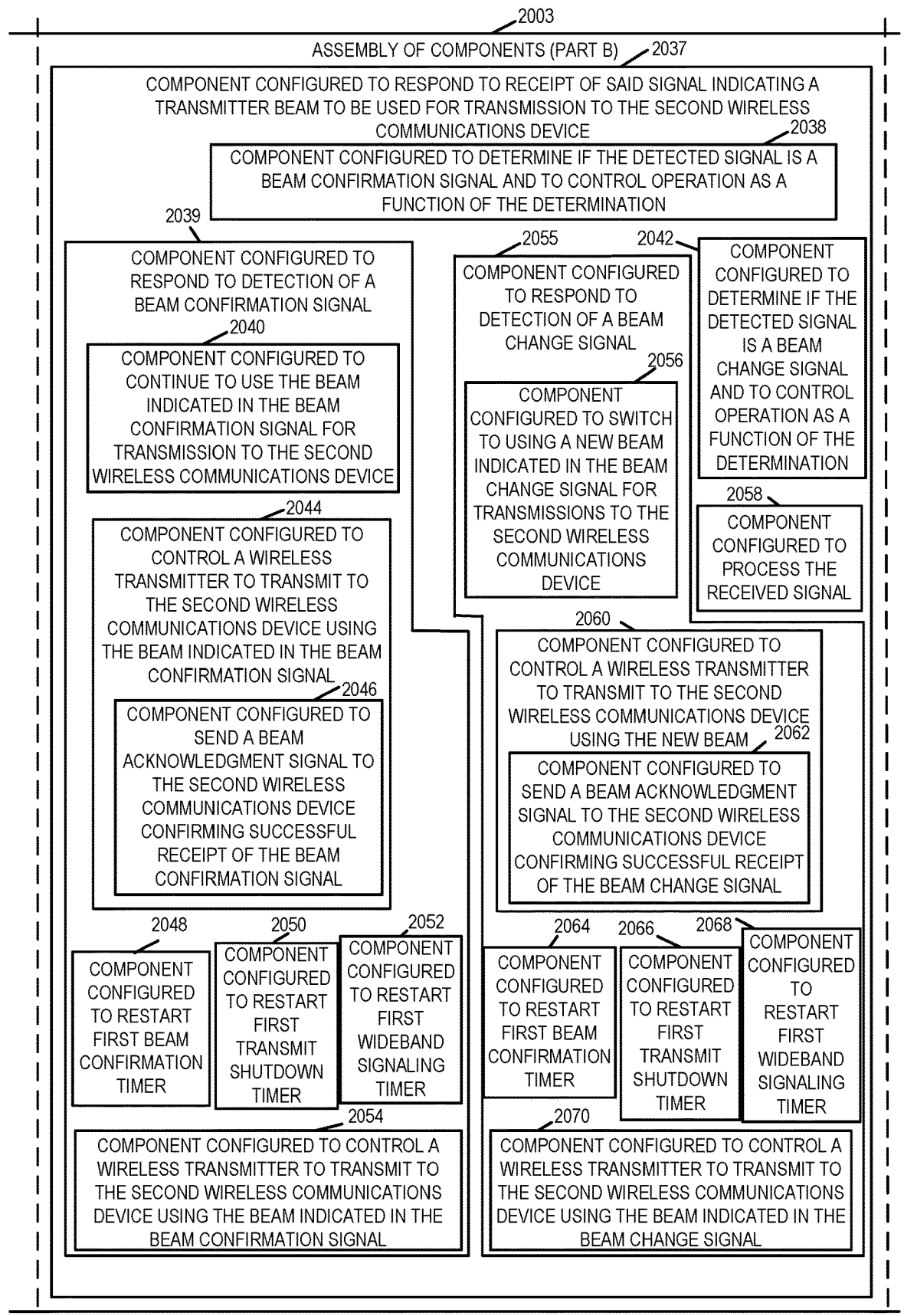
FIG. 20B is a drawing of a second part of an exemplary assembly of components which may be included in an exemplary first wireless communications device, e.g., a base station, in accordance with an exemplary embodiment.
Figure 20C:
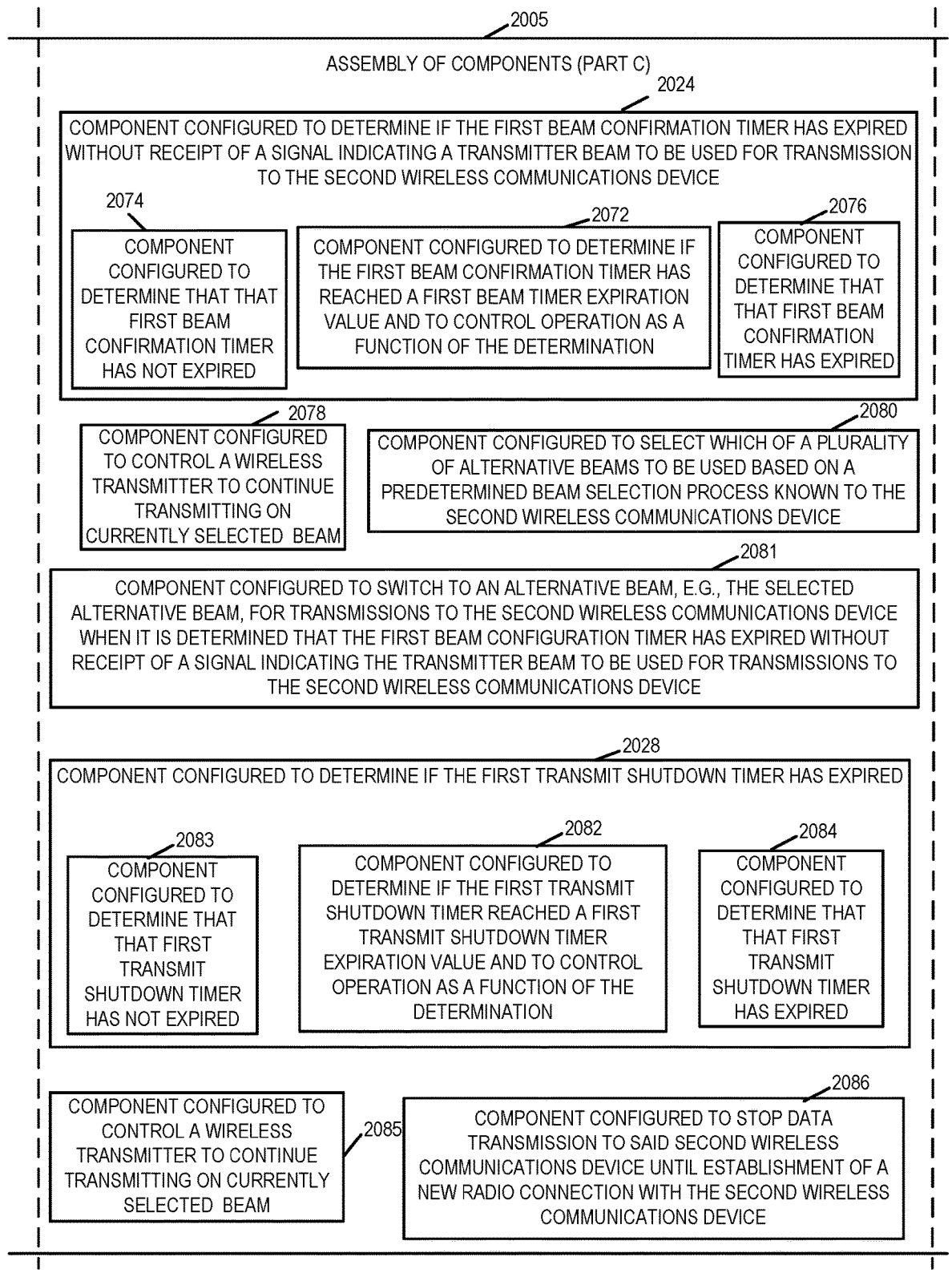
FIG. 20C is a drawing of a third part of an exemplary assembly of components which may be included in an exemplary first wireless communications device, e.g., a base station, in accordance with an exemplary embodiment.
Figures 20, 20D:
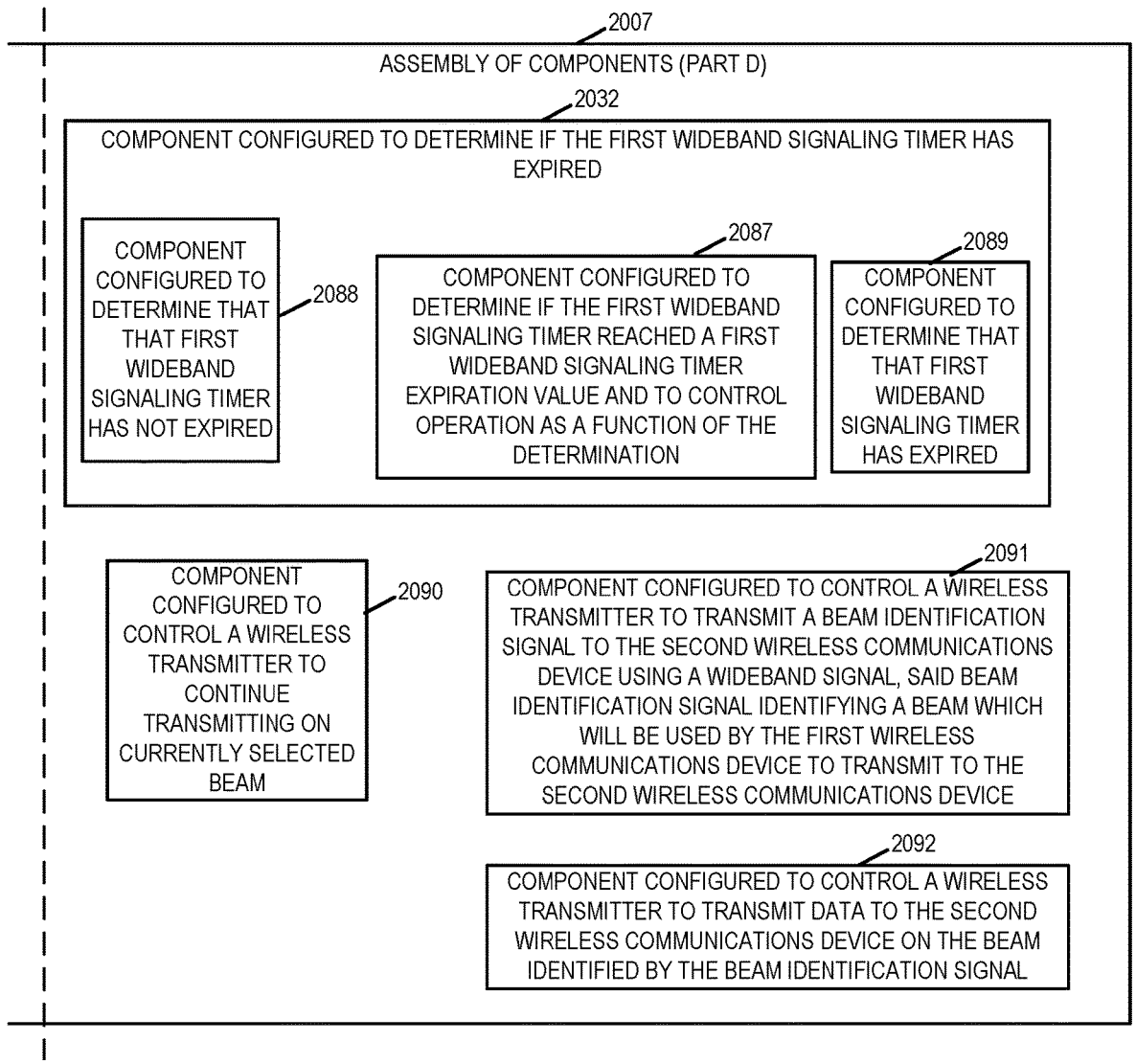
FIG. 20D is a drawing of a fourth part of an exemplary assembly of components which may be included in an exemplary first wireless communications device, e.g., a base station, in accordance with an exemplary embodiment.
FIG. 20 comprises the combination of FIG. 20A, FIG. 20B, FIG. 20C and FIG. 20D.

FIG. 20 is a drawing of an exemplary assembly of components 2000 which may be included in an exemplary first wireless communications device, e.g., exemplary base station 1800 of FIG. 18, in accordance with an exemplary embodiment. The components in the assembly of components 2000 can, and in some embodiments are, implemented fully in hardware within a processor, e.g., processor 1806, e.g., as individual circuits. The components in the assembly of components 2000 can, and in some embodiments are, implemented fully in hardware within the assembly of hardware components 1808, e.g., as individual circuits corresponding to the different components. In other embodiments some of the components are implemented, e.g., as circuits, within processor 1806 with other components being implemented, e.g., as circuits within assembly of components 1808, external to and coupled to the processor 1806. As should be appreciated the level of integration of components on the processor and/or with some components being external to the processor may be one of design choice. Alternatively, rather than being implemented as circuits, all or some of the components may be implemented in software and stored in the memory 1812 of the base station 1800, with the components controlling operation of base station 1800 to implement the functions corresponding to the components when the components are executed by a processor e.g., processor 1806. In some such embodiments, the assembly of components 2000 is included in the memory 1812 as assembly of software components 1814. In still other embodiments, various components in assembly of components 2000 are implemented as a combination of hardware and software, e.g., with another circuit external to the processor providing input to the processor which then under software control operates to perform a portion of a component's function.

When implemented in software the components include code, which when executed by a processor, e.g., processor 1806, configure the processor to implement the function corresponding to the component. In embodiments where the assembly of components 2000 is stored in the memory 1812, the memory 1812 is a computer program product comprising a computer readable medium comprising code, e.g., individual code for each component, for causing at least one computer, e.g., processor 1806, to implement the functions to which the components correspond.

Completely hardware based or completely software based components may be used. However, it should be appreciated that any combination of software and hardware, e.g., circuit implemented components may be used to implement the functions. As should be appreciated, the components illustrated in FIG. 20 control and/or configure the base station 1800 or elements therein such as the processor 1806, to perform the functions of corresponding steps illustrated and/or described in the method of one or more of the flowcharts, signaling diagrams and/or described with respect to any of the Figures. Thus the assembly of components 2000 includes various components that perform functions of corresponding one or more described and/or illustrated steps of an exemplary method, e.g., one or more steps of the method of flowchart 1400 of FIG. 14.

FIG. 20, comprising the combination of FIG. 20A, FIG. 20B, FIG. 20C and FIG. 20, is a drawing of an exemplary assembly of components 2000, comprising the combination of Part A 2001, Part B 2003, Part C 2003 and Part D 2005, in accordance with an exemplary embodiment. Assembly of components 2000 is included in an exemplary first wireless communications device, e.g., a base station including beam forming capabilities.

Assembly of components 2000 includes a component 2004 configured to control a wireless transmitter to transmit signals, e.g., pilot signals, on a plurality of beams, e.g., during a beam prioritization interval, a component 2006 configured to control a wireless receiver to receive first beam prioritization information, e.g., a prioritized beam list, from a second wireless communications device, e.g., during a beam information synchronization time period, and a component 2008 configured to determine if it is tome to update first beam prioritization information and to control operation as a function of the determination. In some embodiments, a generated prioritized list of beams is updated on a recurring time basis. In various embodiments, the updated list is used by the first and second wireless communications devices in making beam switching decisions, e.g., during a subsequent data communications interval which follows the beam information synchronization time period.

Assembly of components 2000 further includes a component 2010 configured to control a wireless transmitter to transmit to the second wireless communications device using a highest priority beam indicated by the first beam prioritization information, a component 2012 configured to start a first beam confirmation timer, a component 2014 configured to start a first transmit shutdown timer, and a component 2016 configured to start a first wideband beam signaling timer. Assembly of components 2000 further includes a component 2020 configured to monitor, following startup of the first beam confirmation timer, for receipt of a signal indicating a transmitter beam to be used for transmission to the second wireless communications device, said signal being one or a beam confirmation signal from the second wireless communications device or a beam change signal from the second wireless communications device. Component 2020 includes a component 2024 configured to detect a signal indicating a transmitter beam to be used for transmission to the second wireless communications device, said signal being one or a beam confirmation signal from the second wireless communications device or a beam change signal from the second wireless communications device.

Assembly of components 2000 further includes a component 2037 configured to respond to receipt of said signal indicating a transmitter beam to be used for transmission to the second wireless communications device. Component 2037 includes a component 2038 configured to determine if the detected signal is beam confirmation signal to control operation as a function of the determination, a component 2039 configured to respond to detection of a beam confirmation signal, a component 2042 configured to determine if the detected signal is a beam change signal and to control operation as a function of the determination, a component 2055 configured to respond to detection of a beam change signal, and a component configured to process the received signal. Component 2039 includes a component 2040 configured to use the beam indicated in the beam confirmation signal for transmission to the second wireless communications device, and a component 2044 configured to control a wireless transmitter to transmit to the second wireless communications device using the beam indicated in the beam confirmation signal. In some embodiments, component 2044 includes a component 2046 configured to control the wireless transmitter to send a beam acknowledgment signal to the second wireless communications device confirming successful receipt of the beam confirmation signal. Component 2039 further includes a component 2048 configured to restart the first beam confirmation timer, a component 2050 configured to restart the first transmit shutdown timer, a component 2052 configured to restart the first wideband signaling timer, and a component 2054 configured to control a wireless transmitter to transmit to the second wireless communications device using the beam indicated in the beam confirmation signal.

Component 2055 includes a component 2056 configured to switch to using a new beam indicated in the beam change signal for transmission to the second wireless communications device, and a component 2060 configured to control a wireless transmitter to transmit to the second wireless communications device using the new beam. Component 2060 includes a component 2062 configured to control a wireless transmitter to send a beam acknowledgement signal to the second wireless communications device confirming successful receipt of the beam change signal. Component 2055 further includes a component 2064 configured to restart the first beam confirmation timer, a component 2066 configured to restart the first transmit shutdown timer, a component 2068 configured to restart the first wideband signaling timer, and a component 2070 configured to control a wireless transmitter to transmit to the second wireless communications device using the beam indicated in the beam change signal.

Assembly of components 2000 further includes a component 2024 configured to determine if the first beam confirmation timer has expired without receipt of a signal indicating a transmission beam to be used for transmission to the second wireless communications device. Component 2024 includes a component 2072 configured to determine if the first beam confirmation timer has reached a first beam confirmation timer expiration value and to control operation as a function of the determination, a component 2074 configured to determine that the first beam confirmation timer has not expired, e.g., in response to a determination that the first beam confirmation time has not reached to the first beam confirmation timer expiration value, and a component 2076 configured to determine that the first beam confirmation timer has expired, e.g., in response to a determination that the first beam confirmation timer has reached the first beam confirmation timer expiration value. Assembly of components 2000 further includes a component 2078 configured to control a wireless transmitter to continue transmitting on the currently selected beam, e.g., in response to a determination that the first beam confirmation timer has not expired, a component 2080 configured to select which of a plurality of alternative beam to be used based on a predetermined beam selection process known to the second wireless communications device, e.g., in response to a determination that the first beam confirmation timer has expired, and a component 2081 configured to switch to an alternative beam, e.g., the second alternative beam, for transmission to the second wireless communications device when it is determined that the first beam conformation timer has expired without receipt of a signal indicating the transmitter beam to be used for transmissions to the second wireless communications device. In some embodiments, the beam to which the switch is made is one of the next priority beam indicated by the first beam prioritization information (e.g., next lowest priority beam) or a beam previously used for communicating with the second communications device.

Assembly of components 2000 further includes a component 2028 configured to determine if the first transmit shutdown timer has expired. Component 2028 includes a component 2082 configured to determine if the first transmit shutdown timer has reached a first transmit shutdown timer expiration value and to control operation as a function of the determination, a component 2083 configured to determine that the first transmit shutdown timer has not expired, e.g., in response to a determination that the first transmit shutdown timer has not reached the first transmit shutdown timer expiration value, and a component 2084 configured to determine that the first transmit shutdown timer has expired, e.g., in response to a determination that the first transmit shutdown timer has reached the first transmit shutdown timer expiration value. Assembly of components 2000 further includes a component 2085 configured to control a wireless transmitter to continue transmitting on the currently selected beam, e.g., in response to a determination the first transmit shutdown has not expired, and a component 2086 configured to stop data transmission to second wireless communications device until establishment of a new radio connection with the second wireless communications device, e.g., in response to a determination that the first transmit shutdown time has expired.

Assembly of components 2000 further includes a component 2032 configured to determine if the first wideband signaling timer has expired. Component 2032 includes a component 2087 configured to determine if the first wideband signaling timer has reached a first wideband signaling timer expiration value and to control operation as a function of the determination, a component 2088 configured to determine that the first wideband signaling timer has not expired, e.g., in response to a determination that the first wideband signaling timer has reached the first wideband signaling timer expiration value, and a component 2089 configured to determine that the first wideband signaling timer has expired, e.g., in response to a determination that the first wideband signaling timer has reached the first wideband signaling timer expiration value. Assembly of components 2000 further includes a component 2090 configured to control a wireless transmitter to continue transmitting on the currently selected beam in response to a determination that the first wideband signaling timer has not expired, and a component 2091 configured to control a wireless transmitter to transmit a beam identification signal to the second wireless communications device using a wideband signal, said beam identification signal identifying a beam which will be used by the first wireless communications device to transmit to the second wireless communications device, e.g. in response to a determination that the first wideband signaling timer has expired, and a component 2092 configured to control a wireless transmitter to transmit data to the second wireless communications device on the beam identified by the beam identification signal. In some embodiments, said wideband beam is a beam which spans an area covered by multiple different beams indicated in said first beam prioritization information and which uses the same frequency band used by the beams listed in the first beam prioritization information. In some such embodiments, the wideband beam covers the area of at least the last beam used to communicate with the second wireless communications device and two physically adjacent beams included in the first beam prioritization information (e.g., a left and right beam).

In one exemplary embodiments components 2006 is included as part of a wireless receiver controller, which is a hardware device, which controls a wireless receiver, e.g., wireless receiver 1838 of first wireless communications device 1800. In one exemplary embodiments components (2004, 2010, 2044, 2046, 2054, 2060, 2062, 2070, 2078, 2085, 2090, 2091, 2092) are included as part of a wireless transmitter controller, which is a hardware device, which controls a wireless transmitter, e.g., wireless transmitter 1840 of first wireless communications device 1800.

Figure 21A:
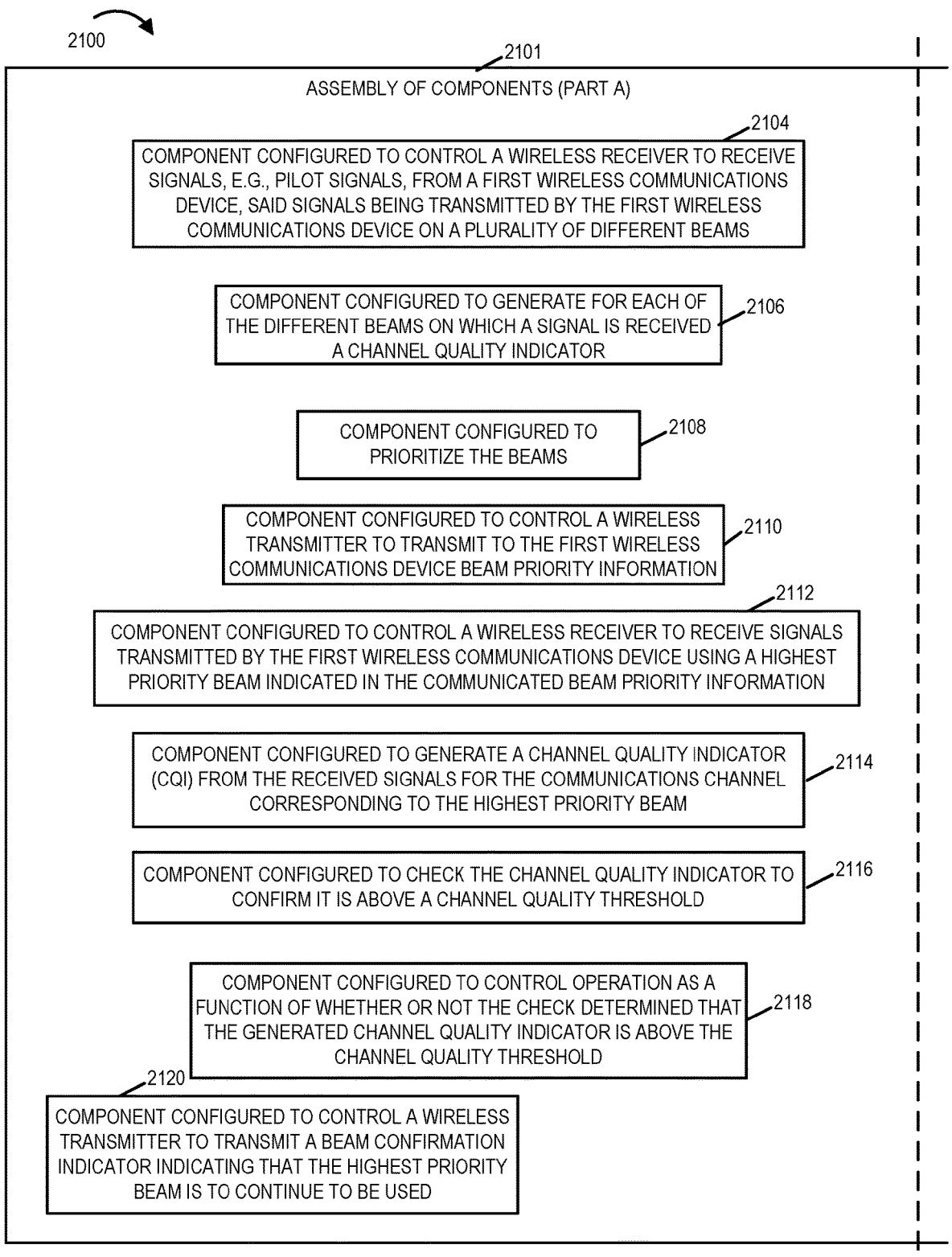
FIG. 21A is a drawing of a first part of an exemplary assembly of components which may be included in an exemplary second wireless communications device, e.g., a user equipment device, in accordance with an exemplary embodiment.
Figure 21B:
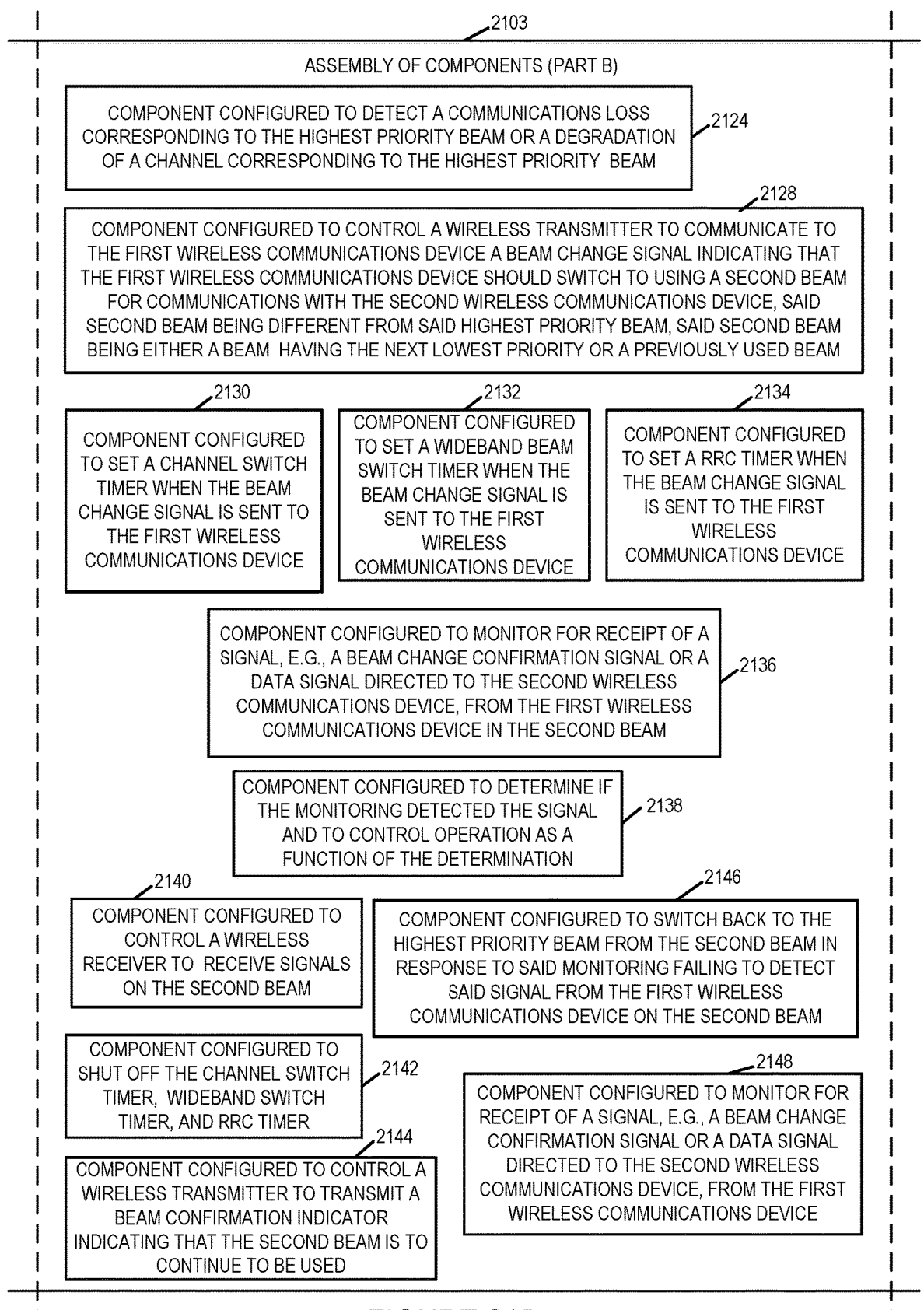
FIG. 21B is a drawing of a second part of an exemplary assembly of components which may be included in an exemplary second wireless communications device, e.g., a user equipment device, in accordance with an exemplary embodiment.
Figures 21, 21C:
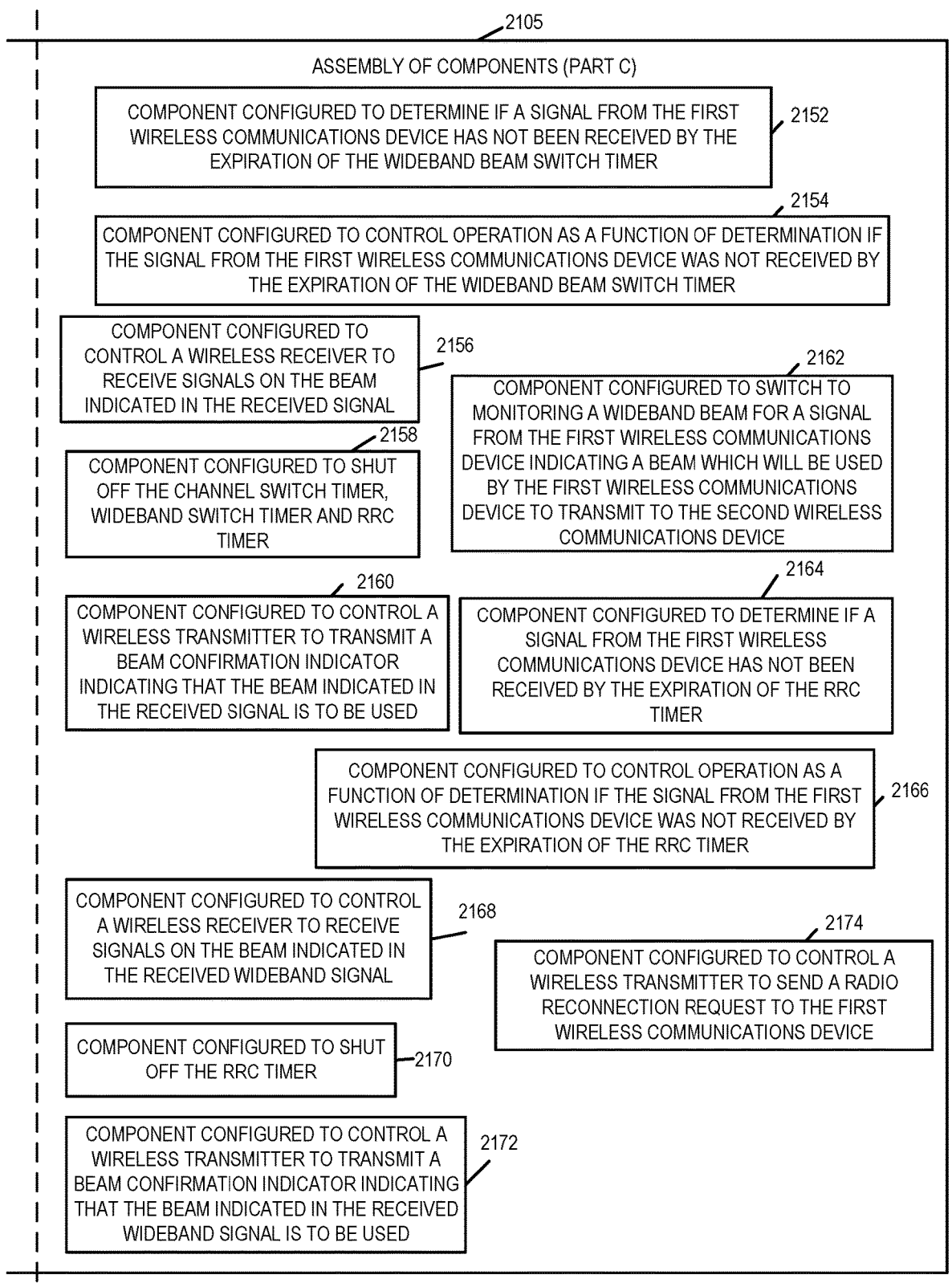
FIG. 21C is a drawing of a third part of an exemplary assembly of components which may be included in an exemplary second wireless communications device, e.g., a user equipment device, in accordance with an exemplary embodiment.
FIG. 21 comprises the combination of FIG. 21A, FIG. 21B and FIG. 21C.

FIG. 21 is a drawing of an exemplary assembly of components 2100 which may be included in an exemplary second wireless communications device, e.g., exemplary user equipment device, 1900 of FIG. 19, in accordance with an exemplary embodiment. The components in the assembly of components 2100 can, and in some embodiments are, implemented fully in hardware within a processor, e.g., processor 1906, e.g., as individual circuits. The components in the assembly of components 2100 can, and in some embodiments are, implemented fully in hardware within the assembly of hardware components 1908, e.g., as individual circuits corresponding to the different components. In other embodiments some of the components are implemented, e.g., as circuits, within processor 1906 with other components being implemented, e.g., as circuits within assembly of components 1908, external to and coupled to the processor 1906. As should be appreciated the level of integration of components on the processor and/or with some components being external to the processor may be one of design choice. Alternatively, rather than being implemented as circuits, all or some of the components may be implemented in software and stored in the memory 1912 of the UE device 1900, with the components controlling operation of UE device 1900 to implement the functions corresponding to the components when the components are executed by a processor e.g., processor 1906. In some such embodiments, the assembly of components 2100 is included in the memory 1912 as assembly of software components 1914. In still other embodiments, various components in assembly of components 2100 are implemented as a combination of hardware and software, e.g., with another circuit external to the processor providing input to the processor which then under software control operates to perform a portion of a component's function.

When implemented in software the components include code, which when executed by a processor, e.g., processor 1906, configure the processor to implement the function corresponding to the component. In embodiments where the assembly of components 2100 is stored in the memory 1912, the memory 1912 is a computer program product comprising a computer readable medium comprising code, e.g., individual code for each component, for causing at least one computer, e.g., processor 1906, to implement the functions to which the components correspond.

Completely hardware based or completely software based components may be used. However, it should be appreciated that any combination of software and hardware, e.g., circuit implemented components may be used to implement the functions. As should be appreciated, the components illustrated in FIG. 21 control and/or configure the UE device 1900 or elements therein such as the processor 1906, to perform the functions of corresponding steps illustrated and/or described in the method of one or more of the flowcharts, signaling diagrams and/or described with respect to any of the Figures. Thus the assembly of components 2100 includes various components that perform functions of corresponding one or more described and/or illustrated steps of an exemplary method, e.g., one or more steps of the method of flowchart 1500 of FIG. 15.

FIG. 21, comprising the combination of FIG. 21A, FIG. 21B and FIG. 21C, is a drawing of an exemplary assembly of components 2100, comprising the combination of Part A 2101, Part B 2103 and Part C 2103, in accordance with an exemplary embodiment. Assembly of components 2100 is included in an exemplary second wireless communications device, e.g., a user equipment device. Assembly of components 2100 includes a component 2104 configured to control a wireless receiver to receive signals, e.g., pilot signals, from a first wireless communications device, said signals being transmitted by the first wireless communications device on a plurality of different beams, a component 2106 configured to generate for each of the different beams on which a signal is received a channel quality indicator, a component 2108 configured to prioritize the beams, and a component 2110 configured to control a wireless transmitter to transmit to the first wireless communications device beam priority information, e.g., a generated transmit beam priority list. Component 2108 prioritizes the beams based on the generated channel quality indicators corresponding to the different beams. In some embodiments, component 2108 prioritizes the beams based on the generated channel quality indicators corresponding to multiple beam prioritization time intervals, e.g., with channel quality indicators from a more recent beam prioritization interval being weighed greater than channel quality indicators from an older beam prioritization interval. In some embodiments, component 2108 generates a transmit beam priority list. In some embodiments, e.g., an embodiment, in which the second wireless communications device supports receive beam forming, component 2108 generates a prioritized list of transmit/receive beam pairs.

Assembly of components 2100 further includes a component 2110 configured to control a wireless transmitter to transmit to the first wireless communications device beam priority information, e.g., a generated beam priority list identifying the determined, e.g., second wireless communication's device determined, priority of different alternative beams that may be used to transmit from the first wireless communications device to the second wireless communications device. Assembly of components 2100 further includes a component 2112 configured to control a wireless receiver to receive signals transmitted by the first wireless communications device using a highest priority beam indicated in the communicated beam priority information, a component 2114 configured to generate a channel quality indicator (CQI) from the received signals for the communications channel corresponding to the highest priority beam, a component 2116 configured to check the channel quality indicator to confirm that the channel quality indicator is above a channel quality threshold, and a component 2118 configured to control operation as a function of whether or not the check determined that the generated channel quality indicator is above the channel quality threshold. Assembly of components 2100 further includes a component 2120 configured to control a wireless transmitter to transmit a beam confirmation indicator indicating that the highest priority beam is to continue to be used, e.g., in response to a determination that the generated channel quality indicator is above the channel quality threshold. In some embodiments, component 2120 controls a wireless transmitter to transmit a confirmation indicator at least once during a predetermined monitoring time interval when the channel quality of the currently used beam remains above the predetermined threshold. In some such embodiments, the transmission is periodic, e.g., with a time interval between successive beam confirmation indicator signal transmissions of T0.

Assembly of components 2100 further includes a component 2124 configured to detect a communications loss corresponding to the highest priority beam or a degradation of a channel corresponding to the higher priority beam, a component 2128 configured to control a wireless transmitter to communicate to the first wireless communications device a beam change signal indicating that the first wireless communications device should switch to using a second beam for communications with the second wireless communications device, said second beam being different from said highest priority beam, said second beam being either a beam having the next lowest priority or being a previously used beam, e.g., in response to a detection by component 2124. Assembly of components 2100 further includes a component 2130 configured to set a channel switch timer when the beam change signal is sent to the first wireless communications device, a component 2132 configured to set a wideband beam switch timer when the beam change signal is sent to the first wireless communications device, and a component 2134 configured to set a RRC timer when the beam change signal is sent to the first wireless communications device.

Assembly of components 2100 further includes a component 2136 configured to monitor for receipt of a signal, e.g., a beam change confirmation signal or a data signal directed to the second wireless communications device, from the first wireless communications device in the second beam, a component 2138 configured to determine if the monitoring of component 2136 detected the signal and to control operation as a function of the determination. Assembly of components 2100 further includes a component 2140 configured to control a wireless receiver to receive signals on the second beam, a component 2142 configured to shut off the channel switch timer, wideband switch timer, and RRC timer, e.g., in response to the detected signal in the second beam, and a component 2144 configured to control a wireless transmitter to transmit a beam confirmation indicator indicating that the second beam is to continue to be used, e.g., in response to detected signals in the second beam exceeding a channel quality threshold level. Assembly of components 2100 further includes a component 2146 configured to switch back to the highest priority beam from the second beam in response to said monitoring failing to detect said signal from the first wireless communications device on the second beam, e.g., by the expiration of the channel switch timer, and a component 2138 configured to monitor for receipt of a signal, e.g., a beam change confirmation signal or a data signal directed to the second wireless communications device from the first wireless communications device.

Assembly of components 2100 further includes a component 2152 configured to determine if a signal from the first wireless communications device has not been received by the expiration of the wideband switch timer and a component 2154 configured to control operation as a function of the determination if the signal from the first wireless communications device has not been received by the expiration of the wideband beam switch timer. Assembly of components 2100 further includes a component 2156 configured to control a wireless receiver to receive signals on the beam indicated in or by indicated by the received signal, e.g., when a beam change confirmation signal or a data signal directed to the second communications device from the first wireless communications device has been received by the second wireless communications device before the expiration of the wideband switch timer, a component 2168 configured to shut off the channel switch timer, wideband switch timer and RRC timer, e.g., in response to the received signal detected by the monitoring of step 1548, and a component 2160 configured to control a wireless transmitter to transmit a beam confirmation indicator indicating that the beam indicated in the received signal is to be used.

Assembly of component 2100 further includes a component 2162 configured to switch to monitoring a wideband beam for a signal from the first wireless communications device indicating a beam which will be used by the first wireless communications device to transmit to the second wireless communications device, a component 2164 configured to determine if a signal from the first wireless communications device has not been received by the expiration of the RRC timer, and a component 2166 configured to control operation as a function of the determination if the signal from the first wireless communications device was not received by the expiration of the RRC timer. Assembly of components 2100 further includes a component 2168 configured to control a wireless receiver to receive signals on the beam indicated in the received wideband beam signal, a component 2170 configured to shut off the RRC timer, e.g., in response to a determination that the signal from the first wireless communications device was received before the expiration of the RRC timer, and a component 2172 configured to control a wireless transmitter to transmit a beam confirmation indicator indicating that the beam indicated in the received wideband beam signal is to be used. Assembly of components 2100 further includes a component 2174 configured to control a wireless transmitter to send a radio reconnection request, e.g., a radio resource control (RRC) message used to request radio reconnection, to the first wireless communications device, e.g., in response to a determination, e.g., by component 2164, that the RRC timer expired without the second wireless communications device receiving the signal from the first wireless communications device.

In some embodiments, said first beam confirmation timer has a first duration Tc, said first beam shutdown timer has a second duration Ts, and said first wideband beam signaling timer has a third duration Twbi; and TC<Twbi<TS.

In one exemplary embodiments components (2104, 2112, 2140, 2156, 2168) are included as part of a wireless receiver controller, which is a hardware device, which controls a wireless receiver, e.g., wireless receiver 1938 of second wireless communications device 1900. In one exemplary embodiments components (2110, 2120, 2128, 2144, 2160, 2172, 2174) are included as part of a wireless transmitter controller, which is a hardware device, which controls a wireless transmitter, e.g., wireless transmitter 1940 of second wireless communications device 1900.

Figure 22:
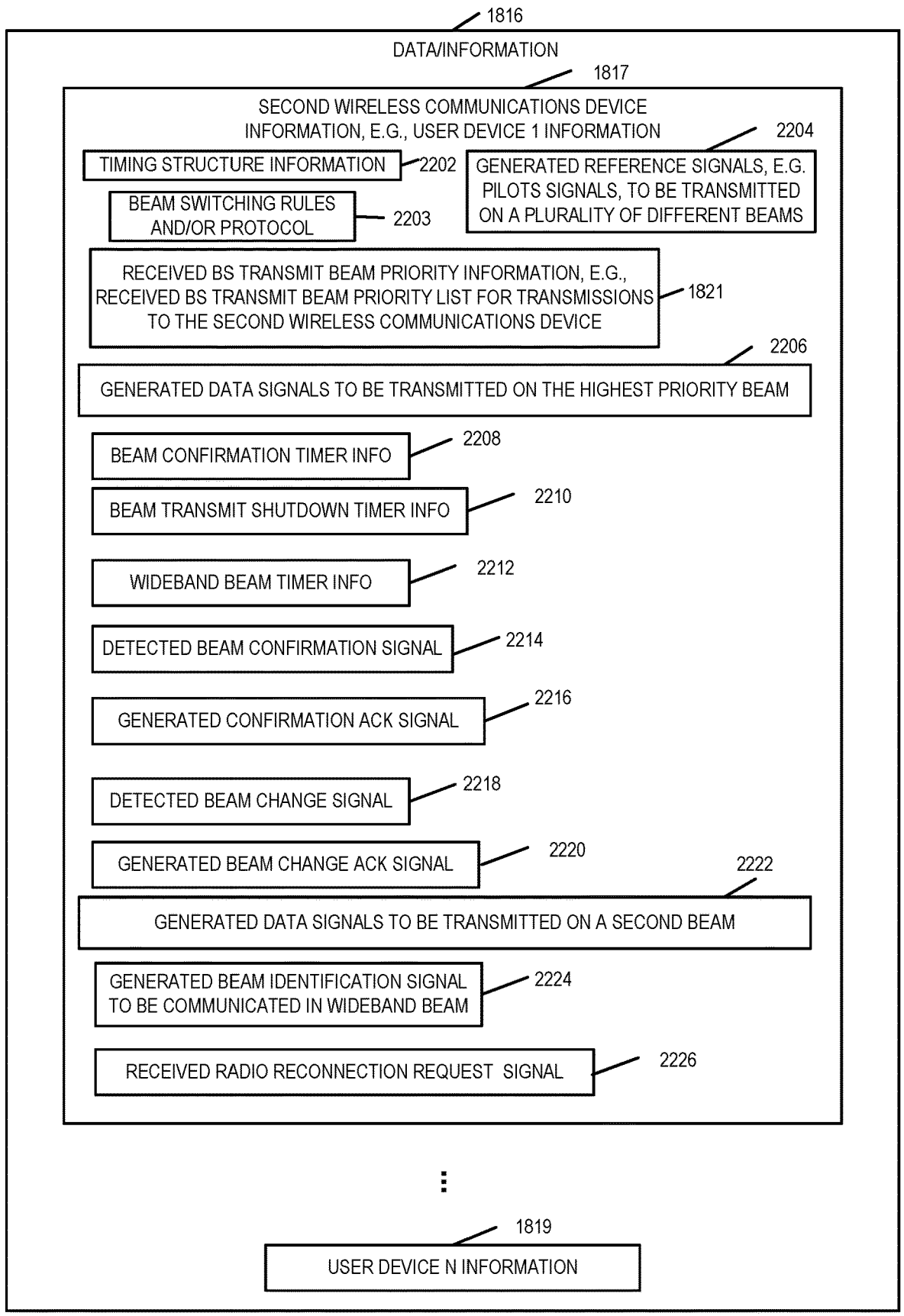
FIG. 22 is a drawing of exemplary data/information which may be included in a first wireless communications device, e.g., a base station supporting beam forming, in accordance with an exemplary embodiment.

FIG. 22 is a drawing of exemplary data/information 1816 which may be included in a first wireless communications device, e.g., exemplary first wireless communications device 1800 of FIG. 18, e.g., a base station supporting beam forming, in accordance with an exemplary embodiment. Data/information 1816 includes a plurality of sets of data/information corresponding to other wireless communications devices to which the first communications device transmits (second wireless communications device, e.g., user device 1 data/information 1817, . . . , user device N data/information 1817). Second wireless communications device data/information 1817 includes timing structure information 2202, beam switching rules and/or protocol 2203, generated reference signals 2204, e.g., pilot signals to be transmitted on a plurality of different beams, received base station transmit beam priority information, e.g., a received base station transmit beam priority list for transmissions to the second wireless communications device 1821, generated data signals to be transmitted to the second wireless communications device on the highest priority beam 2206, beam confirmation timer information 2208, e.g., current status of the beam confirmation timer and a beam confirmation timer expiration time value, beam transmit shutdown timer information 2210, e.g., current status of the beam transmit shutdown timer and a beam transmit timer expiration value, and wideband beam timer information 2212, e.g., current status of the wideband beam timer and a wideband beam timer expiration value. Second wireless communications device data/information 1817 further includes a detected beam confirmation signal from the second wireless communications device 2214, a generated confirmation acknowledgment signal 2216, a detected beam change signal from the second wireless communications device 2218, a generated beam change acknowledgment signal 2220, generated data signals to be transmitted on a second beam 2222, a generated beam identification signal to be communicated in a wideband beam to the second wireless communications device 2224, and a received radio reconnection request signal from the second wireless communications device.

Figure 23:
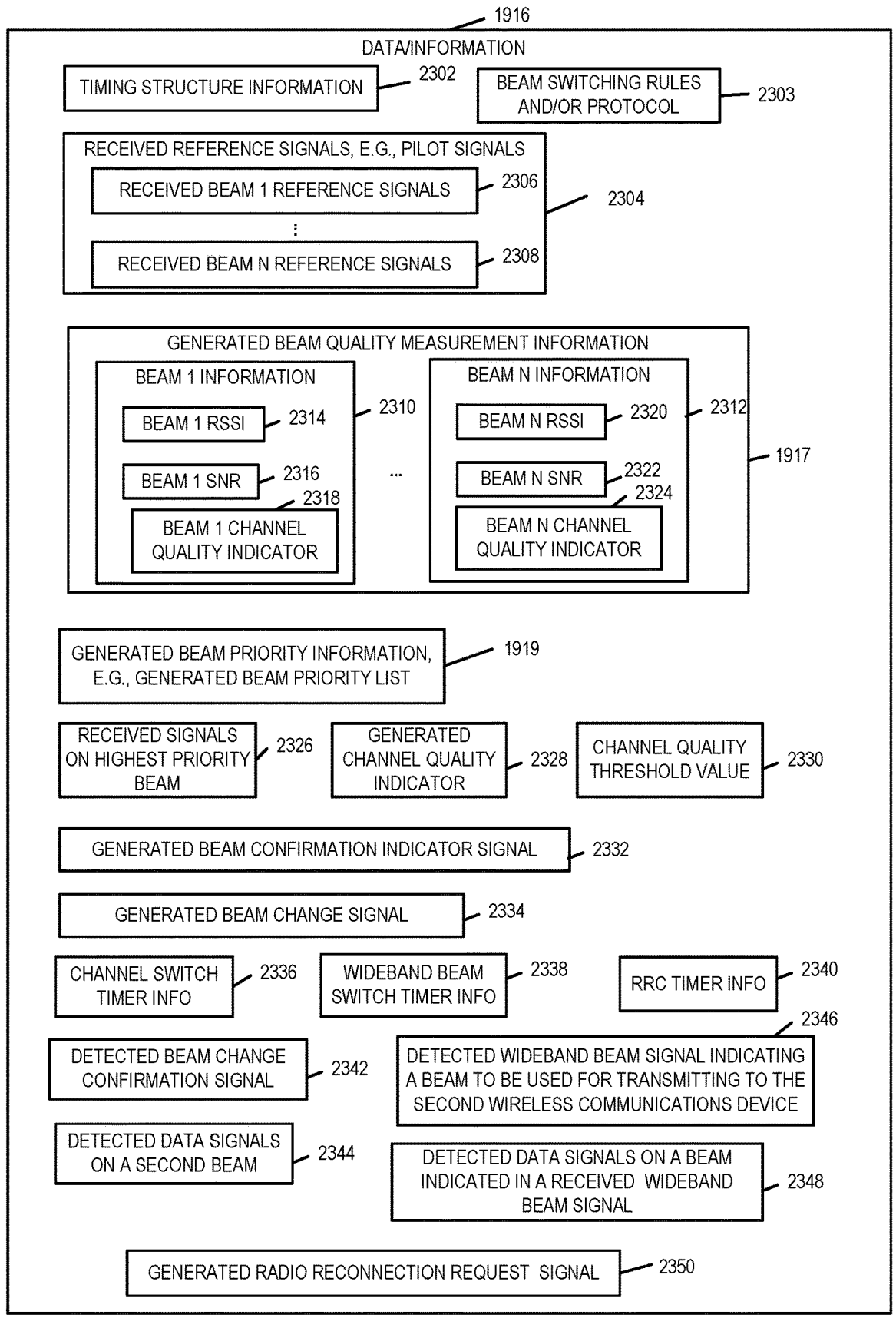
FIG. 23 is a drawing of exemplary data/information which may be included in a second wireless communications device, e.g., a user equipment device, in accordance with an exemplary embodiment.

FIG. 23 is a drawing of exemplary data/information 1916, which may be included in a second wireless communications device, e.g., second wireless communications device 1900 of FIG. 19, e.g., a user equipment device, in accordance with an exemplary embodiment. Data/information 1916 includes timing structure information 2302, beam switching rules and/or protocol 2303, received reference signals, e.g., pilot signals corresponding to a plurality of different beams 2304, generated beam quality measurement information 1917, and generated beam priority information, e.g., a generated beam priority list 1919. Received beam 1 reference signals 2304 includes received reference signals corresponding to a plurality of different alternative transmit beams from the first wireless communications device (received beam 1 reference signals 2306, . . . , received beam N reference signals 2308). Generated beam quality measurement information 1917 includes beam quality measurement information corresponding to the plurality of alternative beams from which reference signals were received (beam 1 information 2310, . . . , beam N information 2312. Beam 1 information 2310 includes a beam 1 RSSI 2314, a beam 1 SNR 2316, an a beam 1 channel quality indicator 2318 generated from the beam 1 RSSI and/or beam 1 SNR. Beam N information 2312 includes a beam N RSSI 2320, a beam N SNR 2322, an a beam N channel quality indicator 2324 generated from the beam N RSSI and/or beam N SNR. The generated beam priority information 1919, e.g., a prioritized list of first wireless communications device transmit beams for transmission from the first wireless communications device to the second wireless communications device, is, in some embodiments, generated based on the generated beam quality indicators (2318, . . . , 2324). The generated beam priority information 1919 is transmitted to the first wireless communications device.

Data/information 1916 further includes received signals directed to the second wireless communications device on the highest priority beam indicated in generated beam priority information 2326, a generated channel quality indicator 2328 based on the received signals 2326, and a channel quality threshold value 2330, e.g., a test limit used to evaluate if signals received on the currently in use beam are of acceptable quality, a generated beam confirmation signal 2334, e.g., a signal sent, e.g., periodically, to indicate that a currently in use beam is being received and is of acceptable quality, and a generated beam change signal 2334, e.g., a signal indicating that the second wireless communications device wants the first wireless communications device to transmit to the second wireless communications device on a new, e.g., different, beam which is indicated in the beam change signal. Data/information 1916 further includes channel switch timer information 2336, e.g., channel switch timer status and information indicating the duration of the channel switch timer, wideband switch timer information 2338, e.g., information indicating the status of the wideband switch timer and information indicating the duration of the wideband switch timer, and RRC timer information 2340, e.g., information indicating the status of the RRC timer and information indicating the duration of the RRC timer. Data/information 1916 further includes a detected beam change confirmation signal 2342, detected data signals on a second beam 2344, e.g., detected signals on a beam requested in a previously transmitted beam change signal, a detected wideband beam signal indicating a beam to be used for transmitting to the second wireless communications device 2346, detected signals on a beam indicated in a received wideband beam signal, and a generated radio reconnection request signals 2350.

Multiple lists of sets of exemplary numbered embodiments are included below. The embodiment numbering used in each list refers to that particular set.

List of First Set of Exemplary Numbered Method Embodiments

Method Embodiment 1 A method of operating a first wireless communications device (e.g. a device, such as a base station, supporting an active antenna system capable of forming and/or using a plurality of different antenna beam patterns), the method comprising: receiving (1406) first beam prioritization information (e.g. a prioritized beam list) from a second wireless communications device (e.g., first UE to which the BS transmits where the UE may be a mobile device such as a cell phone or a fixed device such as a personal computer or other device at a customer premise); transmit (1410) to the second wireless communications device using a highest priority beam indicated by the first beam prioritization information; starting (1412) a first beam confirmation timer; determining (1424) if the first beam confirmation timer has expired without receipt of a signal, (e.g., a beam confirmation signal or a beam change signal) indicating a transmitter beam to be used for transmission to the second wireless communications device, having been received from the second wireless communications device; and switching (1481) to an alternative beam for transmissions to the second wireless communications device when it is determined that the first beam confirmation timer has expired without receipt of a signal indicating the transmitter beam to be used for transmission to the second wireless communications device.

Method Embodiment 2 The method of Method Embodiment 1, wherein the beam to which the switch is made is one of the next priority beam indicated by the first beam prioritization information (e.g., next lowest priority beam) or a beam previously used for communicating with the second communications device.

Method Embodiment 3 The method of Method Embodiment 2, further comprising: selecting (1480) which of a plurality of possible alternative beams to used based on a predetermined beam selection process known to the second wireless communications device (e.g., if there was a good previous beam known to the BS and UE use the last good beam otherwise switch to the next highest priority beam indicated in the first beam prioritization information).

Method Embodiment 4 The method of Method Embodiment 1, further comprising: monitoring (1420), following starting of the first beam confirmation timer, for receipt of said signal indicating a transmitter beam to be used for transmission to the second wireless communications device, said signal being one of a beam confirmation signal from the second wireless communications device or a beam change signal from the second wireless communications device; and responding (1437) to receipt of said signal indicating a transmitter beam to be used for transmission to the second wireless communications device by restarting (1448 or 1464) the first beam confirmation timer.

Method Embodiment 5 The method of Method Embodiment 4, wherein responding (1437) to receipt of said signal indicating a transmitter beam to be use for transmission to the second wireless communications device further includes: performing one of: i) responding (1455) to detection of a beam change signal from the second wireless communications device by switching (1456) to using the a new beam indicated in the received beam change signal for transmissions to the second wireless communications device and transmitting to the second wireless communications device using the new beam; or ii) responding (1439) to detection of a beam confirmation signal from the second wireless communications device by continuing (1440) to use the beam indicated in the beam confirmation signal for transmission to the second wireless communications device.

Method Embodiment 6 The method of Method Embodiment 5, wherein responding (1437) to receipt of said signal indicating a transmitter beam to be use for transmission to the second wireless communications device further includes: sending a beam acknowledgement signal (1446 or 1462) to the second wireless communications device confirming successful receipt of the signal indicating the beam to be used for communicating to the second wireless communications device (e.g., on the beam indicated in the received signal which will be a new beam if a beam change was received or the old beam if simply a beam confirmation was received).

Method Embodiment 7 The method of Method Embodiment 5, further comprising; starting (1414, 1450, 1466) a first transmit shutdown timer each time said first beam confirmation timer is started; and determining (1428) if the first transmit shutdown timer has expired (e.g., without said signal indicating a transmitter beam to be used for transmission to the second wireless communications device having been received); and stopping (1486) data transmission to said second wireless communications device until establishment of a new radio connection with the second wireless communications device.

Method Embodiment 8 The method of Method Embodiment 7, further comprising: starting (1416, 1452, 1468) a first wideband beam signaling timer each time said first beam confirmation timer is started; determining (1432) if the first wideband signaling timer has expired (e.g., without said signal indicating a transmitter beam to be used for transmission to the second wireless communications device having been received) and in response the first wideband signaling timer having expired (1489), transmitting (1491)a beam identification signal to the second communications device using a wideband beam, said beam identification signal identifying (e.g., indicating) a beam which will be used by the first wireless communications device to transmit to the second wireless communications device.

Method Embodiment 9 The method of Method Embodiment 8, wherein said wideband beam is a beam which spans an area covered by multiple different beams indicated in said first beam prioritization information and which uses the same frequency band used by the beams listed in the first beam prioritization information.

Method Embodiment 10 The method of Method Embodiment 9, wherein the wideband beam covers the area of at least the last beam used to communicate with the second wireless communications device and two physically adjacent beams included in the first beam prioritization information (e.g., a left and right beam).

Method Embodiment 11 The method of Method Embodiment 8, further comprising: following transmission of the beam identification signal to the second wireless communications device, transmitting (1492) data to the second wireless communications device on the beam identified by said beam identifier signal.

Method Embodiment 12 The method of Method Embodiment 11, wherein said first beam confirmation timer has a first duration Tc, said first beam shutdown timer has a second duration Ts and where said first wideband beam signaling timer has a third duration Twbi; and where TC<Twbi<TS.

List of First Set of Exemplary Numbered Apparatus Embodiments

Apparatus Embodiment 1 A first wireless communications device (1800) (e.g. a device, such as a base station, supporting an active antenna system capable of forming and/or using a plurality of different antenna beam patterns), the first wireless communications device comprising: a processor (1806) configured to: control a wireless receiver (1938) to receive (1406) first beam prioritization information (e.g. a prioritized beam list) from a second wireless communications device (1900) (e.g., first UE to which the BS transmits where the UE may be a mobile device such as a cell phone or a fixed device such as a personal computer or other device at a customer premise); control a wireless transmitter (1840) to transmit (1410) to the second wireless communications device using a highest priority beam indicated by the first beam prioritization information; start (1412) a first beam confirmation timer; determine (1424) if the first beam confirmation timer has expired without receipt of a signal, (e.g., a beam confirmation signal or a beam change signal) indicating a transmitter beam to be used for transmission to the second wireless communications device, having been received from the second wireless communications device; and switch (1481) to an alternative beam for transmissions to the second wireless communications device when it is determined that the first beam confirmation timer has expired without receipt of a signal indicating the transmitter beam to be used for transmission to the second wireless communications device.

Apparatus Embodiment 2 The first wireless communications device (1800) of Apparatus Embodiment 1, wherein the beam to which the switch is made is one of the next priority beam indicated by the first beam prioritization information (e.g., next lowest priority beam) or a beam previously used for communicating with the second communications device (1900).

Apparatus Embodiment 3 The first wireless communications device (1800) of Apparatus Embodiment 2, wherein said processor (1806) is further configured to: select (1480) which of a plurality of possible alternative beams to used based on a predetermined beam selection process known to the second wireless communications device (e.g., if there was a good previous beam known to the BS and UE use the last good beam otherwise switch to the next highest priority beam indicated in the first beam prioritization information).

Apparatus Embodiment 4 The first wireless communications device (1800) of Apparatus Embodiment 1, wherein said processor (1806) is further configured to: monitor (1420), following starting of the first beam confirmation timer, for receipt of said signal indicating a transmitter beam to be used for transmission to the second wireless communications device, said signal being one of a beam confirmation signal from the second wireless communications device or a beam change signal from the second wireless communications device; and respond (1437) to receipt of said signal indicating a transmitter beam to be used for transmission to the second wireless communications device by restarting (1448 or 1464) the first beam confirmation timer.

Apparatus Embodiment 5 The first wireless communications device (1800) of Apparatus Embodiment 4, said processor (1806) is configured to control the first wireless communications device (1800) to perform one of: i) responding (1455) to detection of a beam change signal from the second wireless communications device by switching (1456) to using the a new beam indicated in the received beam change signal for transmissions to the second wireless communications device and transmitting to the second wireless communications device using the new beam; or ii) responding (1439) to detection of a beam confirmation signal from the second wireless communications device by continuing (1440) to use the beam indicated in the beam confirmation signal for transmission to the second wireless communications device, as part of being configured to respond (1437) to receipt of said signal indicating a transmitter beam to be use for transmission to the second wireless communications device further includes:

Apparatus Embodiment 6 The first wireless communications device (1800) of Apparatus Embodiment 5, wherein said processor (1806) is configured to: send a beam acknowledgement signal (1446 or 1462) to the second wireless communications device confirming successful receipt of the signal indicating the beam to be used for communicating to the second wireless communications device (e.g., on beam indicated in the received signal which will be a new beam if a beam change was received or the old beam if simply a beam confirmation was received), as part of being configured to respond (1437) to receipt of said signal indicating a transmitter beam to be use for transmission to the second wireless communications device.

Apparatus Embodiment 7 The first wireless communications device (1800) of Apparatus Embodiment 5, wherein said processor (1806) is further configured to: start (1414, 1450, 1466) a first transmit shutdown timer each time said first beam confirmation timer is started; and determine (1428) if the first transmit shutdown timer has expired (e.g., without said signal indicating a transmitter beam to be used for transmission to the second wireless communications device having been received); and stop (1486) data transmission to said second wireless communications device until establishment of a new radio connection with the second wireless communications device.

Apparatus Embodiment 8 The first wireless communications device (1800) of Apparatus Embodiment 7, wherein said processor (1806) is further configured to: start (1416, 1452, 1468) a first wideband beam signaling timer each time said first beam confirmation timer is started; determine (1432) if the first wideband signaling timer has expired (e.g., without said signal indicating a transmitter beam to be used for transmission to the second wireless communications device having been received) and in response the first wideband signaling timer having expired (1489), control said transmitter (1840) to transmit (1491) a beam identification signal to the second communications device using a wideband beam, said beam identification signal identifying (e.g., indicating) a beam which will be used by the first wireless communications device to transmit to the second wireless communications device.

Apparatus Embodiment 9 The first wireless communications device (1800) of Apparatus Embodiment 8, wherein said wideband beam is a beam which spans an area covered by multiple different beams indicated in said first beam prioritization information and which uses the same frequency band used by the beams listed in the first beam prioritization information.

Apparatus Embodiment 10 The first wireless communications device (1800) of Apparatus Embodiment 9, wherein the wideband beam covers the area of at least the last beam used to communicate with the second wireless communications device and two physically adjacent beams included in the first beam prioritization information (e.g., a left and right beam).

Apparatus Embodiment 11 The first wireless communications device (1800) of Apparatus Embodiment 8, wherein said processor (1806) is further configured to: control said transmitter (1840) to transmit (1492), following transmission of the beam identification signal to the second wireless communications device, data to the second wireless communications device on the beam identified by said beam identifier signal.

Apparatus Embodiment 12 The first wireless communications device (1800) of Apparatus Embodiment 11, wherein said first beam confirmation timer has a first duration Tc, said first beam shutdown timer has a second duration Ts and wherein said first wideband beam signaling timer has a third duration Twbi; and wherein TC<Twbi<TS.

First Set of Exemplary Computer Readable Medium Embodiments

Computer Readable Medium Embodiment 1 A non-transitory computer readable medium including computer executable instructions which when executed by a processor of a first wireless communications device (e.g. a device, such as a base station, supporting an active antenna system capable of forming and/or using a plurality of different antenna beam patterns) cause the first wireless communications device to perform the steps of: receiving (1406) first beam prioritization information (e.g. a prioritized beam list) from a second wireless communications device (e.g., first UE to which the BS transmits where the UE may be a mobile device such as a cell phone or a fixed device such as a personal computer or other device at a customer premise); transmit (1410) to the second wireless communications device using a highest priority beam indicated by the first beam prioritization information; starting (1412) a first beam confirmation timer; determining (1424) if the first beam confirmation timer has expired without receipt of a signal, (e.g., a beam confirmation signal or a beam change signal) indicating a transmitter beam to be used for transmission to the second wireless communications device, having been received from the second wireless communications device; and switching (1481) to an alternative beam for transmissions to the second wireless communications device when it is determined that the first beam confirmation timer has expired without receipt of a signal indicating the transmitter to beam to be used for transmission to the second wireless communications device.

In some embodiments, for a receiver device three timers are used all of which are set upon the receiver device sending a beam change command. In some such embodiments, the three timers are: (1) a switch back (SB) timer, (2) a wide beam switch (WBS) timer, and (3) an RRC timer. The switch back timer, which is set upon sending a beam change, is used to control switching, e.g., back to previous beam from which switch was made or to another beam. The wide beam switch timer is used to trigger a switch to wide beam to detect beam change signal from transmitter device. The RRC timer is used to trigger radio reconnection after loss of communication with transmitter device, e.g., due to a switch to a new beam that the transmitter was unsuccessful in changing to. In some such embodiment, the SB timer<WBS timer<RRC timer.

List of Second Set of Exemplary Numbered Method Embodiments

Method Embodiment 1 A method of operating a second wireless communications device in communications with a first wireless communications device which uses multiple beams for transmission, the method comprising: receiving (1504) signals (e.g., pilot signals) from the first wireless communications device, said signals being transmitted by the first wireless communications device on a plurality different beams; generating (1506) for each of the different beams on which a signal is received, a channel quality indicator (e.g., CQI in the form of an RSSI or SNR); prioritizing (1508) the beams; and transmitting (1510) to the first wireless communications device beam priority information (e.g., a ranked list showing the second wireless communications device's priority ordering of beams from which signals were received).

Method Embodiment 2 The method of Method Embodiment 1, further comprising: receiving (1512) signals transmitted by the first wireless communications device using a highest priority beam indicated in the communicated beam priority information; generating (1514) a channel quality indicator (CQI) from the received signals for the communications channel corresponding to the highest priority beam; checking (1516) the channel quality indicator to confirm it is above a channel quality threshold; and transmitting (1520) a beam confirmation indicator indicating that the highest priority beam is to continue to be used in response to said checking determining that the generated channel quality indicator is above said channel quality threshold.

Method Embodiment 3 The method of Method Embodiment 2, further comprising: detecting (1524) a communications loss corresponding to the highest priority beam (e.g., failure to receive signals on the beam as may be indicated by a complete failure or packet loss) or a degradation of a channel corresponding to the highest priority beam (e.g., as indicated by an additional CQI generated from another received signal or a low SNR of the communications channel corresponding to the highest priority beam); and communicating (1528) to the first wireless communications device a beam change signal indicating the first wireless communications device should switch to using of a second beam for communications with the second wireless communications device, said second beam being a different beam than said highest priority beam, said second beam being either a beam having the next lowest priority or a previously used beam.

Method Embodiment 4 The method of Method Embodiment 3, further comprising: setting (1530) a channel switch timer when the beam change signal is sent to the first wireless communications device; monitoring (1536) for the receipt of a signal from the first wireless communications device on said second beam; and switching (1546) back to the highest priority beam from said second beam in response to said monitoring failing to detect said signal from the first wireless communications device on said second beam.

Method Embodiment 5. The method of Method Embodiment 4, wherein said signal from the first wireless communications device on said second beam for which said monitoring is performed is one of a beam change confirmation signal or a data signal directed to the second wireless communications device.

Method Embodiment 6 The method of Method Embodiment 4, further comprising: setting (1532) a wideband beam switch timer when the beam change signal is sent to the first wireless communications device; determining (1552) if, after setting of the of the wideband beam switch timer, a signal from the first communications device has not been received by expiration of the wideband beam switch timer; and in response to determining that, after setting of the wideband beam switch timer, a signal from the wireless first communications device has not been received by expiration of the wideband beam switch timer, switching (1562) to monitoring a wideband beam for a signal from the first wireless communications device indicating a beam which will be used by the first wireless communications device to transmit to the second wireless communications device.

Method Embodiment 7 The method of Method Embodiment 6, further comprising: setting (1534) a RRC timer when the beam change signal is sent to the first wireless communications device; determining (1564) if, after setting of the RRC timer, a signal from the first wireless communications device has not been received by expiration of the RRC timer; and in response to determining that, after setting of the RRC timer, a signal from the first communications device has not been received by expiration of the RRC timer, sending (1574) a radio reconnection request to the first wireless communications device.

List of Second Set of Exemplary Numbered Apparatus Embodiments

Apparatus Embodiment 1 A second wireless communications device (1900) in communications with a first wireless communications device (1800), which uses multiple beams for transmission, the second wireless communications device comprising: a processor (1906) configured to: control a wireless receiver (1938) to receive (1504) signals (e.g., pilot signals) from the first wireless communications device, said signals being transmitted by the first wireless communications device on a plurality different beams; generate (1506) for each of the different beams on which a signal is received, a channel quality indicator (e.g., CQI in the form of an RSSI or SNR); prioritize (1508) the beams; and control a wireless transmitter (1940) to transmit (1510) to the first wireless communications device beam priority information (e.g., a ranked list showing the second wireless communications device's priority ordering of beams from which signals were received).

Apparatus Embodiment 2 The second wireless communications device (1900) of Apparatus Embodiment 1, wherein said processor (1906) is further configured to: control said wireless receiver (1938) to receive (1512) signals transmitted by the first wireless communications device using a highest priority beam indicated in the communicated beam priority information; generate (1514) a channel quality indicator (CQI) from the received signals for the communications channel corresponding to the highest priority beam; check (1516) the channel quality indicator to confirm it is above a channel quality threshold; and control said wireless transmitter (1940) to transmit (1520) a beam confirmation indicator indicating that the highest priority beam is to continue to be used in response to said checking determining that the generated channel quality indicator is above said channel quality threshold.

Apparatus Embodiment 3 The second wireless communications device (1900) of Apparatus Embodiment 2, wherein said processor (1906) is further configured to: detect (1524) a communications loss corresponding to the highest priority beam (e.g., failure to receive signals on the beam as may be indicated by a complete failure or packet loss) or a degradation of a channel corresponding to the highest priority beam (e.g., as indicated by an additional CQI generated from another received signal or a low SNR of the communications channel corresponding to the highest priority beam); and communicate (1528) to the first wireless communications device a beam change signal indicating the first wireless communications device should switch to using of a second beam for communications with the second wireless communications device, said second beam being a different beam than said highest priority beam, said second beam being either a beam having the next lowest priority or a previously used beam.

Apparatus Embodiment 4 The second wireless communications device (1900) of Apparatus Embodiment 3, wherein said processor (1906) is further configured to: set (1530) a channel switch timer when the beam change signal is sent to the first wireless communications device; monitor (1536) for the receipt of a signal from the first wireless communications device on said second beam; and switch (1546) back to the highest priority beam from said second beam in response to said monitoring failing to detect said signal from the first wireless communications device on said second beam.

Apparatus Embodiment 5 The second wireless communications device (1900) of Apparatus Embodiment 4, wherein said signal from the first wireless communications device on said second beam for which said monitoring is performed is one of a beam change confirmation signal or a data signal directed to the second wireless communications device.

Apparatus Embodiment 6 The second wireless communications device (1900) of Apparatus Embodiment 4, wherein said processor (1906) is further configured to: set (1532) a wideband beam switch timer when the beam change signal is sent to the first wireless communications device; determine (1552) if, after setting of the of the wideband beam switch timer, a signal from the first communications device has not been received by expiration of the wideband beam switch timer; and in response to determining that, after setting of the wideband beam switch timer, a signal from the wireless first communications device has not been received by expiration of the wideband beam switch timer, switch (1562) to monitoring a wideband beam for a signal from the first wireless communications device indicating a beam which will be used by the first wireless communications device to transmit to the second wireless communications device.

Apparatus Embodiment 7 The second wireless communications device (1900) of Apparatus Embodiment 6, wherein said processor (1906) is further configured to: set (1534) a RRC timer when the beam change signal is sent to the first wireless communications device; determine (1564) if, after setting of the RRC timer, a signal from the first wireless communications device has not been received by expiration of the RRC timer; and in response to determining that, after setting of the RRC timer, a signal from the first communications device has not been received by expiration of the RRC timer, send (1574) a radio reconnection request to the first wireless communications device.

Second Set of Exemplary Computer Readable Medium Embodiments

Computer Readable Medium Embodiment 1 A non-transitory computer readable medium including computer executable instructions which when executed by a processor of a second wireless communications device in communications with a first wireless communications device, which uses multiple beams for transmission, cause the second wireless communications device to perform the steps of: receiving (1504) signals (e.g., pilot signals) from the first wireless communications device, said signals being transmitted by the first wireless communications device on a plurality different beams; generating (1506) for each of the different beams on which a signal is received, a channel quality indicator (e.g., CQI in the form of an RSSI or SNR); prioritizing (1508) the beams; and transmitting (1510) to the first wireless communications device beam priority information (e.g., a ranked list showing the second wireless communications device's priority ordering of beams from which signals were received).

Numerous variations and embodiments are possible.

For the network to maintain service to the user, changes in the best beam should be acknowledged between a UE (user equipment device) and BTS (base station transmitter system). If the changes in the preferred beam as indicated by a beam ID, as notified to the BS by the UE, are not acknowledged, the UE will likely expect the BTS to send the data on the new beam while the BTS sends data on the old beam which the UE is no longer listening to due to the UE switching to the new beam is signaled to the BS. This can result in a disruption to the synchronization of beam utilization between the BS and UE and loss of service to the UE subject to such loss of beam synchronization.

Two approaches to improve handling of changes in the preferred beam, e.g., as indicated by a Beam ID, and preserving of service are described below and in various places in the preceding description. The actual labels for the timers and beams mentioned in the solutions below may be modified at implementation. The Radio Unit (RU) in the base station and/or UE may be an Active Antenna System (AAS) and have direct control of the beam status in the link, e.g., which of a plurality of beams is used at a given time for transmit purposes.

One feature is directed to beam selection timing robustness. In one exemplary embodiment link status is maintained by the introduction of a Beam ID list (or matrix) and a set of timers.

The approach may be, and sometimes is, implemented as follows:
1. Define a known Beam ID matrix (or list) in the BTS and UE based on the previous beam changes in the connection and/or other beam information.
2. Synchronize the Beam ID Matrix between BTS and UE by communicating beam preference information at a defined periodicity
3. Set a periodic Beam ID confirmation timer—t0 where (t0<RLC timeout)
4. If the Beam change information is lost in the UL then,
   1. operate the BTS to continue to send DL transmissions to the UE on the last known preferred beam, as indicated by a Beam ID, for a configurable time length—t1 (where T1 does not exceed a RLC (Radio Layer Connection) timeout)
   2. operate the UE to switch back to last known beam in use for downlink transmission after not receiving a beam change response from the BS within a given time frame t2 of the UE initiating, e.g., signaling, a beam change (t2<T1, and t2<RLC timeout)
   3. If no new Beam ID has been received from UE after t0 expires, then BTS will move to the next most commonly used beam ID, e.g., the next highest priority beam in the beam list associated with the UE, based on Beam ID Matrix and which beam was in use at the time communication with the UE was lost
   4. Within the same t0 expiry and if no beam ID information has been exchanged between BTS and UE, the UE will also switch to next highest priority beam in the beam ID matrix
   5. In some embodiments the process involves traversing the Beam ID matrix provided the traversing is within the RLC timeout bound until Beam selection is complete
   6. If no beam ID is selected before the RLC timeout, then the RLC timeout will occur resulting in a radio link failure and the link reestablishment process will begin.

The process can be, and sometimes is, reversed when Uplink Beam forming is introduced on the CPE.

The above process can be used alone or in combination with an "anchor beam" approach to facilitating beam synchronization.

In a second beam management approach which can be used alone or in combination with the first approach a wide beam referred to as an 'Anchor Beam' is used to maintain synchronization when there are changes in which underlying narrow beam which is to be used. In this second approach a wide-angle "anchor" beam (A-Beam) is used that enables the UE and BTS to fall back and refer the link status and new Beam ID communicated on the anchor beam when the underlying beam changes go unacknowledged, e.g., due to a communication failure.

The solution requires both a HW implementation and underlying timers that will be implemented in the SW.

In this second approach:
1. A wide angle anchor beam is used transmit from the same device, e.g., using the same antenna used to transmit the individual narrow beams and/or another antenna with a wider beam pattern
2. The half power beam width of the anchor beam is greater than the angle of the narrow beams used for normal data communications and serves the area of multiple narrow beams (e.g. if the beam width of a narrow beam is 50, then the wide angle anchor beam would have a half power beam width of 450) with the anchor beam effectively serving as a control channel beam that allows the exchange of beam information
3. When changes to a serving beam are lost, e.g., due to a failure to successfully communicate beam change information, and no beam information is exchanged between UE and BTS (base station transmission system) for a time indicated by a timer tb (where tb<RLC Timeout) then:
4. The CPE will use the A-Beam to retrieve the new Beam ID from the RU (or AAS)
5. If the beam change status is lost in the downlink for a time period indicated by a timer tru (where tru<RLC timeout), then the radio unit of the BTS will use the A-Beam to reestablish synchronization with the UE (e.g., which may be a customer premise equipment CPE), e.g., by specifying the beam to be used, and communicate selection of the best beam to the CPE 6. If no beam ID is selected and communicated to the UE before the RLC timeout, then the RLC timeout will occur resulting in a radio link failure and the link reestablishment process will begin.

The techniques of various embodiments may be implemented using software, hardware and/or a combination of software and hardware. Various embodiments are directed to apparatus, e.g., wireless communications devices such as base stations and user equipment devices, user devices, servers, customer premises equipment (CPE) devices, vehicles, cable systems, network nodes, gateways, cable headend/hubsites, network monitoring node/servers, cluster controllers, cloud nodes, production nodes, cloud services servers and/or network equipment devices. Various embodiments are also directed to methods, e.g., method of controlling and/or operating wireless communications devices such as base stations and UE devices, user devices, CPE devices, vehicles, gateways, servers, cable networks, cloud networks, nodes, servers, cloud service servers, customer premises equipment devices, controllers, network monitoring nodes/servers and/or cable or network equipment devices. Various embodiments are also directed to machine, e.g., computer, readable medium, e.g., ROM, RAM, CDs, hard discs, etc., which include machine readable instructions for controlling a machine to implement one or more steps of a method. The computer readable medium is, e.g., non-transitory computer readable medium.

It is understood that the specific order or hierarchy of steps in the processes and methods disclosed is an example of exemplary approaches. Based upon design preferences, it is understood that the specific order or hierarchy of steps in the processes and methods may be rearranged while remaining within the scope of the present disclosure. The accompanying method claims present elements of the various steps in a sample order, and are not meant to be limited to the specific order or hierarchy presented. In some embodiments, one or more processors are used to carry out one or more steps of the each of the described methods.

In various embodiments each of the steps or elements of a method are implemented using one or more processors. In some embodiments, each of elements are steps are implemented using hardware circuitry.

In various embodiments nodes and/or elements described herein are implemented using one or more components to perform the steps corresponding to one or more methods, for example, message reception, signal processing, sending, comparing, determining and/or transmission steps. Thus, in some embodiments various features are implemented using components or in some embodiments logic such as for example logic circuits. Such components may be implemented using software, hardware or a combination of software and hardware. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more nodes. Accordingly, among other things, various embodiments are directed to a machine-readable medium, e.g., a non-transitory computer readable medium, including machine executable instructions for causing a machine, e.g., processor and associated hardware, to perform one or more of the steps of the above-described method(s). Some embodiments are directed to a device, e.g., a controller, including a processor configured to implement one, multiple or all of the steps of one or more methods of the invention.

In some embodiments, the processor or processors, e.g., CPUs, of one or more devices, e.g., communications nodes such as controllers are configured to perform the steps of the methods described as being performed by the communications nodes, e.g., controllers. The configuration of the processor may be achieved by using one or more components, e.g., software components, to control processor configuration and/or by including hardware in the processor, e.g., hardware components, to perform the recited steps and/or control processor configuration. Accordingly, some but not all embodiments are directed to a device, e.g., communications node such as a cluster controller including, with a processor which includes a component corresponding to each of the steps of the various described methods performed by the device in which the processor is included. In some but not all embodiments a device, e.g., communications node such as a controller, includes a controller corresponding to each of the steps of the various described methods performed by the device in which the processor is included. The components may be implemented using software and/or hardware.

Some embodiments are directed to a computer program product comprising a computer-readable medium, e.g., a non-transitory computer-readable medium, comprising code for causing a computer, or multiple computers, to implement various functions, steps, acts and/or operations, e.g. one or more steps described above. Depending on the embodiment, the computer program product can, and sometimes does, include different code for each step to be performed. Thus, the computer program product may, and sometimes does, include code for each individual step of a method, e.g., a method of controlling a controller or node. The code may be in the form of machine, e.g., computer, executable instructions stored on a computer-readable medium, e.g., a non-transitory computer-readable medium, such as a RAM (Random Access Memory), ROM (Read Only Memory) or other type of storage device. In addition to being directed to a computer program product, some embodiments are directed to a processor configured to implement one or more of the various functions, steps, acts and/or operations of one or more methods described above. Accordingly, some embodiments are directed to a processor, e.g., CPU, configured to implement some or all of the steps of the methods described herein. The processor may be for use in, e.g., a communications device such as wireless communications device such as a base station or UE device, a controller or other device described in the present application. In some embodiments components are implemented as hardware devices in such embodiments the components are hardware components. In other embodiments components may be implemented as software, e.g., a set of processor or computer executable instructions. Depending on the embodiment the components may be all hardware components, all software components, a combination of hardware and/or software or in some embodiments some components are hardware components while other components are software components.

Numerous additional variations on the methods and apparatus of the various embodiments described above will be apparent to those skilled in the art in view of the above description. Such variations are to be considered within the scope. Numerous additional embodiments, within the scope of the present invention, will be apparent to those of ordinary skill in the art in view of the above description and the claims which follow. Such variations are to be considered within the scope of the invention.

What is claimed is:

1. A method of operating a second wireless communications device in communications with a first wireless communications device which uses multiple beams for transmission, the method comprising:
   transmitting, from the second wireless communications device, a beam change signal to the first wireless communications device indicating the first wireless communications device is to switch to using a second beam indicated in the beam change signal for communications with the second wireless communications device;
   setting a wideband beam switch timer when the beam change signal is sent to the first wireless communications device;
   monitoring, at the second wireless communications device, for receipt of a signal from the first wireless communications device on said second beam;
   determining if, after setting of the wideband beam switch timer, a signal from the first communications device has not been received by expiration of the wideband beam switch timer; and
   in response to determining that, after setting of the wideband beam switch timer, a signal from the wireless first communications device has not been received by expiration of the wideband beam switch timer, switching to monitoring a wideband beam for a signal from the first wireless communications device indicating a beam which will be used by the first wireless communications device to transmit to the second wireless communications device.

2. The method of claim 1, further comprising:
   setting, at the second wireless communications device, a channel switch timer when the beam change signal is sent to the first wireless communications device; and
   switching back to a previous beam from said second beam in response to said monitoring failing to detect said signal from the first wireless communications device on said second beam by the time said channel switch timer expires.

3. The method of claim 2, wherein said signal from the first wireless communications device on said second beam for which said monitoring is performed is one of a beam change confirmation signal or a data signal directed to the second wireless communications device.

4. The method of claim 1, further comprising:
   setting a second timer when the beam change signal is sent to the first wireless communications device; and
   determining if, after setting of the second timer, a signal from the first wireless communications device has not been received by expiration of the second timer.

5. The method of claim 4, further comprising:
   sending a radio reconnection request to the first wireless communications device in response to determining that, after setting of the second timer, a signal from the first communications device has not been received by expiration of the second timer.

6. A second wireless communications device in communications with a first wireless communications device, which uses multiple beams for transmission, the second wireless communications device comprising:
   a transmitter; and
   a processor configured to control the second wireless communications device to:
      transmit a beam change signal to the first wireless communications device indicating the first wireless communications device should switch to using a second beam for communications with the second wireless communications device;
      set a wideband beam switch timer when the beam change signal is sent to the first wireless communications device;
      monitor for receipt of a signal from the first wireless communications device on said second beam;
      determine if, after setting of the wideband beam switch timer, a signal from the first communications device has not been received by expiration of the wideband beam switch timer; and
      switch to monitoring a wideband beam for a signal from the first wireless communications device indicating a beam which will be used by the first wireless communications device to transmit to the second wireless communications device in response to determining that, after setting of the wideband beam switch timer, a signal from the wireless first communications device has not been received by expiration of the wideband beam switch timer.

7. The second wireless communications device of claim 6, wherein the processor is further configured to control the second wireless communications device to:
   set a channel switch timer when the beam change signal is sent to the first wireless communications device; and
   switch back to a previous beam from said second beam in response to said monitoring failing to detect said signal from the first wireless communications device on said second beam by the time said channel switch timer expires.

8. The second wireless communications device of claim 7, wherein said signal from the first wireless communications device on said second beam for which said monitoring is performed is one of a beam change confirmation signal or a data signal directed to the second wireless communications device.

9. The second wireless communications device of claim 6, wherein the processor is further configured to control the second wireless communications device to:
   set a second timer when the beam change signal is sent to the first wireless communications device; and
   determine if, after setting of the second timer, a signal from the first wireless communications device has not been received by expiration of the second timer.

10. The second wireless communications device of claim 9, wherein the processor is further configured to control the second wireless communications device to:
    send a radio reconnection request to the first wireless communications device in response to determining that, after setting of the second timer, a signal from the first communications device has not been received by expiration of the second timer.

11. The second wireless communications device of claim 6, wherein the beam change signal commands the first wireless communications device to switch to the second beam.

12. The method of claim 1, wherein the beam change signal commands the first wireless communications device to switch to the second beam.

13. A non-transitory computer readable medium including computer executable instructions which when executed by a processor of a second wireless communications device, in communications with a first wireless communications device, which uses multiple beams for transmission, cause the second wireless communications device to perform the steps of:

transmitting a beam change signal to the first wireless communications device indicating the first wireless communications device should switch to using a second beam for communications with the second wireless communications device;

setting a wideband beam switch timer when the beam change signal is sent to the first wireless communications device;

monitoring for receipt of a signal from the first wireless communications device on said second beam;

determining if, after setting of the wideband beam switch timer, a signal from the first communications device has not been received by expiration of the wideband beam switch timer; and switching to monitoring a wideband beam for a signal from the first wireless communications device indicating a beam which will be used by the first wireless communications device to transmit to the second wireless communications device in response to determining that, after setting of the wideband beam switch timer, a signal from the wireless first communications device has not been received by expiration of the wideband beam switch timer.

14. The non-transitory computer readable medium of claim 13, further comprising instructions which when executed by the processor of the second wireless communications device cause the second wireless communications device to perform the steps of:

setting a channel switch timer when the beam change signal is sent to the first wireless communications device; and switching back to a previous beam from said second beam in response to said monitoring failing to detect said signal from the first wireless communications device on said second beam by the time said channel switch timer expires.

15. The non-transitory computer readable medium of claim 13, wherein said signal from the first wireless communications device on said second beam for which said monitoring is performed is one of a beam change confirmation signal or a data signal directed to the second wireless communications device.

16. The non-transitory computer readable medium of claim 13, wherein the beam change signal commands the first wireless communications device to switch to the second beam.

\* \* \* \* \*